United States Patent
Azuma

(10) Patent No.: US 7,800,681 B2
(45) Date of Patent: *Sep. 21, 2010

(54) IMAGE PICKUP DEVICE CAPTURING A PLURALITY OF IMAGES THAT HAVE DIFFERENT VIEWING ANGLES

(75) Inventor: Motoo Azuma, Saitama-ken (JP)

(73) Assignee: Olympus Corporation, Tokyo (JP)

( * ) Notice: Subject to any disclaimer, the term of this patent is extended or adjusted under 35 U.S.C. 154(b) by 327 days.

This patent is subject to a terminal disclaimer.

(21) Appl. No.: 12/003,295

(22) Filed: Dec. 21, 2007

(65) Prior Publication Data

US 2008/0129846 A1 Jun. 5, 2008

Related U.S. Application Data

(63) Continuation of application No. 11/446,355, filed on Jun. 5, 2006.

(30) Foreign Application Priority Data

| Jun. 7, 2005 | (JP) | ............................... 2005-166923 |
| Jun. 7, 2005 | (JP) | ............................... 2005-166924 |
| Jun. 7, 2005 | (JP) | ............................... 2005-166925 |
| Jun. 7, 2005 | (JP) | ............................... 2005-166926 |

(51) Int. Cl.
*G02B 13/16* (2006.01)
*G02B 3/00* (2006.01)
*G06K 9/40* (2006.01)
*H04N 5/232* (2006.01)

(52) U.S. Cl. ............... 348/335; 348/211.8; 348/211.9; 359/662; 382/275

(58) Field of Classification Search ............... 348/36, 348/39, 143, 211.8, 211.9, 312, 313, 335; 359/662; 382/275
See application file for complete search history.

(56) References Cited

U.S. PATENT DOCUMENTS

| 5,818,527 A | * | 10/1998 | Yamaguchi et al. | ......... 348/335 |
| 5,923,425 A | | 7/1999 | Dewa et al. | |
| 6,389,179 B1 | * | 5/2002 | Katayama et al. | ........... 382/284 |

(Continued)

FOREIGN PATENT DOCUMENTS

JP 2-122773 A 5/1990

(Continued)

OTHER PUBLICATIONS

Japanese Office Action dated May 18, 2010, issued in corresponding Japanese Patent Application No. 2005-166924.

(Continued)

*Primary Examiner*—Sinh Tran
*Assistant Examiner*—Selam Gebriel
(74) *Attorney, Agent, or Firm*—Westerman, Hattori, Daniels & Adrian, LLP

(57) ABSTRACT

An image pickup device may include an optical system having a distortion that captures a distortion-containing optical image, a conversion unit that converts the distortion-containing optical image into distortion-containing image data, a storage unit that stores the distortion-containing image data and additional data related to a distortion of the distortion-containing image data, and a distortion correction unit that corrects the distortion of the distortion-containing image data with reference to the additional data.

12 Claims, 30 Drawing Sheets

U.S. PATENT DOCUMENTS

| | | | |
|---|---|---|---|
| 6,538,691 B1 * | 3/2003 | Macy et al. | 348/222.1 |
| 6,873,358 B1 | 3/2005 | Shimizu | |
| 7,076,086 B2 * | 7/2006 | Miyake et al. | 382/112 |
| 7,260,271 B2 * | 8/2007 | Funamoto | 382/275 |
| 2002/0039139 A1 | 4/2002 | Hsu et al. | |
| 2003/0218683 A1 * | 11/2003 | Kurase | 348/335 |
| 2004/0017491 A1 | 1/2004 | Stavely | |
| 2004/0179100 A1 | 9/2004 | Ueyama | |
| 2004/0239800 A1 | 12/2004 | Yamano et al. | |
| 2004/0252201 A1 | 12/2004 | Meitav et al. | |
| 2005/0053307 A1 * | 3/2005 | Nose et al. | 382/275 |
| 2006/0110050 A1 * | 5/2006 | Aoyama et al. | 382/232 |
| 2007/0109399 A1 * | 5/2007 | Sekimoto et al. | 348/36 |

FOREIGN PATENT DOCUMENTS

| | | |
|---|---|---|
| JP | 6-165012 A | 6/1994 |
| JP | 9-9121 A | 1/1997 |
| JP | 10-233950 A | 9/1998 |
| JP | 11-196319 A | 7/1999 |
| JP | 11-225306 A | 8/1999 |
| JP | 11-266387 A | 9/1999 |
| JP | 2001-57630 A | 2/2001 |
| JP | 2001-197348 A | 7/2001 |
| JP | 2001-208961 A | 8/2001 |
| JP | 2003-102020 A | 4/2003 |
| JP | 2004-13804 A | 1/2004 |
| JP | 2004-40432 A | 2/2004 |
| JP | 2004-201203 A | 7/2004 |
| JP | 2004-260710 A | 9/2004 |
| JP | 2004-297314 A | 10/2004 |

OTHER PUBLICATIONS

Japanese Office Action dated May 18, 2010, issued in corresponding Japanese Patent Application No. 2005-166925.

Japanese Office Action dated May 18, 2010, issued in corresponding Japanese Patent Application No. 2005-166926.

* cited by examiner

CYLINDRICAL DISTORTION

COAXIAL DISTORTION

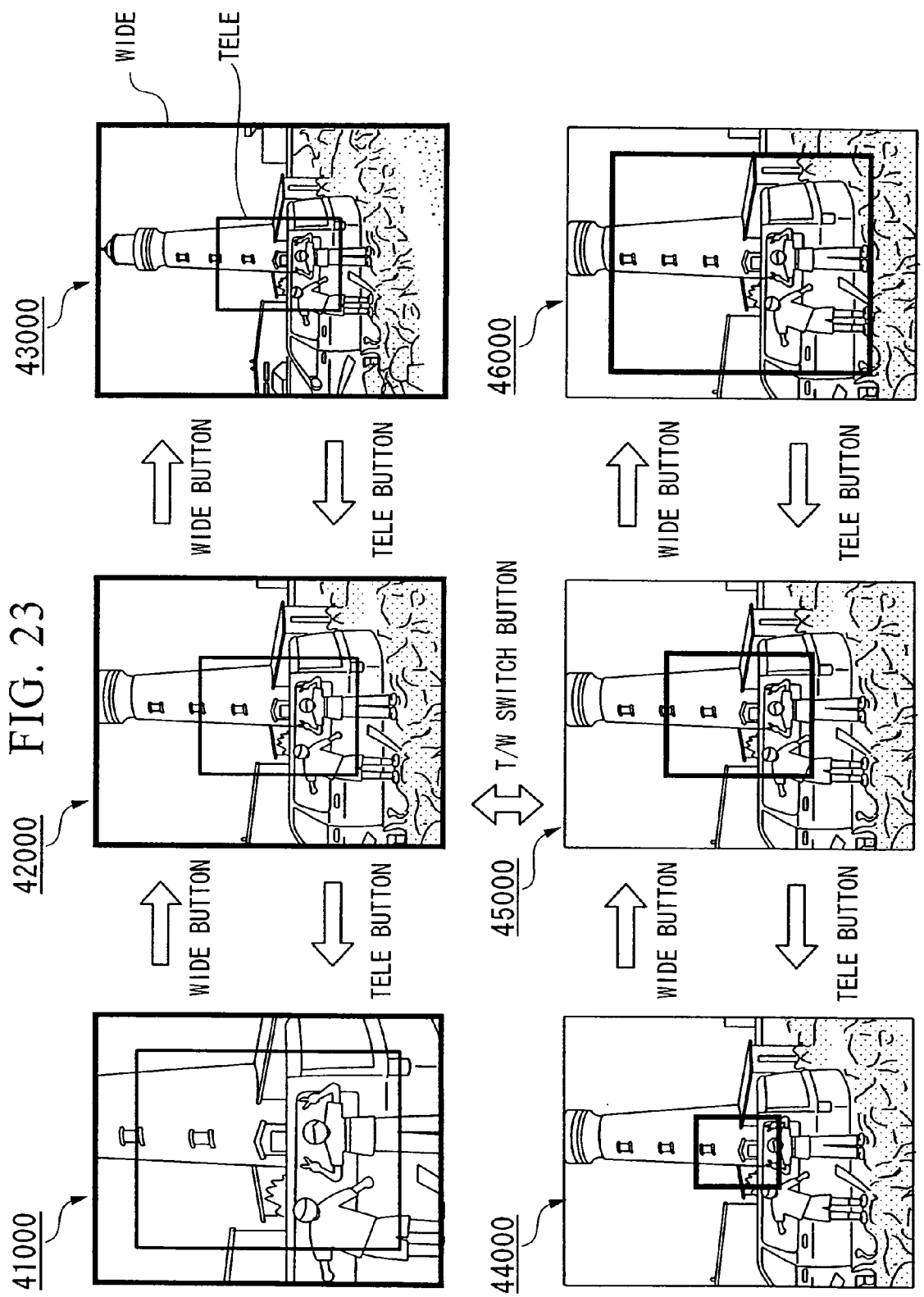

IMAGE PICKUP DEVICE CAPTURING A PLURALITY OF IMAGES THAT HAVE DIFFERENT VIEWING ANGLES

CROSS-REFERENCE TO RELATED APPLICATIONS

This application is a Continuation application of U.S. application Ser. No. 11/446,355, filed Jun. 5, 2006, which claims benefit of Japanese Application No. 2005-166923, Japanese Application No. 2005-166924 and Japanese Application No. 2005-166925, filed in Japan on Jun. 7, 2005, the contents of which are incorporated herein by reference.

BACKGROUND OF THE INVENTION

1. Field of the Invention

The present invention generally relates to an image pickup device. More specifically, the present invention relates to an image pickup device suitable for capturing concurrently a plurality of images that are different in angle of view.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Image input apparatuses such as a video camera and a digital camera have widely used a zooming function that adjust a focal distance of lenses for magnification and reduction of an image of an object. The adjustment of the focal distance is made in accordance with a distance to the object and/or an angle of view of the object. Typical types of the zooming function may be classified into an optical zooming and an electronic zooming. The optical zooming can be realized by moving lenses mechanically. The electronic zooming is to electronically magnify the image of the object, wherein a portion of an image that has been outputted from an image sensor is utilized and new pixels are interpolated between the existent pixels.

Japanese Unexamined Patent Application, First Publication, No. 10-233950 discloses a conventional technique for inputting electronically zoomed image. FIG. 31 is a view illustrating a conventional technique for inputting electronically zoomed image. As shown in FIG. 31, an optical system is provided, which has a fixed focal distance. The optical system is used for input of an image of an object. The optical system has a function of compressing a peripheral region of the input image. A light receiving element is further provided, which is adapted to receive the image from the optical system. The light receiving element has a generally uniform density of pixels. The image received by the light receiving element has a distortion. This distortion image is corrected and transformed to generate a zoomed image with the same resolution in an active region thereof. Such optical system can be utilized to obtain an image that has a center portion with less deterioration of quality and a peripheral portion with substantive deterioration of quality for both wide angle image and telescopic narrow angle image.

SUMMARY OF THE INVENTION

In accordance with a first aspect of the present invention, an image pickup device may comprise: an optical system having a distortion characteristic, the optical system capturing an optical image of an object, the distortion characteristic magnifying a center portion of the optical image and reducing a peripheral portion of the optical image; an image sensor that converts the optical image into image data; a pixel defect correction unit that performs a pixel defect correction of the image data; a first white balance correction unit that performs a first white balance correction of the image data, the first white balance correction being made at a first level accuracy; an image compression unit that compress the image data that has been subjected to the pixel defect correction and the first white balance correction to generate compressed image data; an image storage that stores the compressed image data; an image decompression unit that obtains, from the image storage, the compressed image data, the image decompression unit decompressing the compressed image data to generate decompressed image data; a second white balance correction unit that performs a second white balance correction of the decompressed image data, the second white balance correction being made at a second accuracy level that is higher than the first accuracy level; and a distortion correction unit that performs a distortion correction of a selected portion of the decompressed image data; the selected portion being defined by an angle of view, the angle of view being defined externally.

Preferably, the image pickup device may further comprise: a shading correction unit that performs a shading correction of the image data to generate shading corrected image data, and the image compression unit may compress the shading corrected image data.

Preferably, the image storage may store the compressed image data in association with distortion data, the distortion data being related to the distortion characteristic, and the distortion correction unit may perform the distortion correction with reference to the distortion data.

Preferably, the image pickup device may further comprise: a first memory that stores a correspondence between the distortion characteristic and a first index that designates the distortion characteristic, and the image storage may store the compressed image data in association with the first index.

Preferably, the image storage may store the compressed image data in association with shading data, the shading data being related to a shading of the image data. A shading correction unit may obtain the compressed image data in association with the shading data from the image storage. The shading correction unit may perform a shading correction of the image data with reference to the shading data to generate shading-corrected image data.

Preferably, the image pickup device may further comprise: a second memory that stores at least a pair of a parameter and a second index that designates the parameter. The parameter is to be used by the shading correction unit to perform the shading correction. The image storage may store the compressed image data in association with the second index.

Preferably, the image storage may store the shading-corrected image data in association with a first marker representing that the shading correction has been made.

Preferably, the image storage may store the image data in association with distortion data. The distortion data is related to the distortion characteristic. The distortion correction unit may perform the distortion correction of the shading-corrected image data that is associated with the first marker. The distortion correction is made with reference to the distortion data.

Preferably, the image storage may store the compressed image data in association with first white balance data. The first white balance data is related to the first white balance correction at the first level accuracy. The second white balance correction unit may perform the second white balance correction at the second level accuracy with reference to the first white balance data.

Preferably, the image pickup device may further comprise a third memory that stores a first white balance correction information of the first white balance correction in association with a third index that designates the first white balance correction information. The image storage stores the compressed image data associated with the third index.

Preferably, the image storage may store the white-balance corrected image data in association with a second marker representing that the shading correction has been made by the second white balance correction unit.

Preferably, the image storage may store the compressed image data in association with distortion data. The distortion data is related to the distortion characteristic. The distortion correction unit may perform the distortion correction of the white-balance corrected image data that is associated with the second marker. The distortion correction is made with reference to the distortion data.

In accordance with a second aspect of the present invention, an image pickup device may comprise: an optical system having a distortion characteristic, the optical system capturing an optical image of an object, the distortion characteristic magnifying a center portion of the optical image and reducing a peripheral portion of the optical image; an image sensor that converts the optical image into image data; a frame memory that stores the image data; a frame memory output control unit that reads a first selected portion of the image data out of the frame memory, the first selected portion being defined by an angle of view, the angle of view being externally defined; a first filter unit that applies a first filtering process to a second selected portion of the image data to generate first-filtered image data, the second selected portion being included in the first selected portion, the second selected portion having a first range of distortion that is smaller than a first threshold value; a distortion correction unit that performs a distortion correction of the first-filtered image data to generate distortion-corrected image data; and a second filter unit that applies a second filtering process to a third portion of the distortion-corrected image data to generate second-filtered image data, the second filtering process being different from the first filtering process, the third selected portion having a second range of distortion that is greater than a second threshold value.

Preferably, the image pickup device may further comprise: an image data correction unit. The image data correction unit may further comprises at least one of a pixel defect correction unit that corrects a pixel defect of the image data, a white balance correction unit that corrects a white balance of the image data, and a shading correction unit that corrects a shading of the image data. The frame memory may store the image data that is outputted from the image data correction unit.

Preferably, the image sensor may have a color filter array of Red (R) color filters, Green (G) color filters, and Blue (B) color filters. The image pickup device may further comprise: an RGB synchronization unit that generates color image data for Red (R), Green (G), and Blue (B) from the image data. The color image data is generated for each pixel position of the image sensor. The first filter unit may perform the first filtering process to the color image data.

Preferably, the image pickup device may further comprise: a luminance chrominance conversion unit that converts the second-filtered image data into luminance chrominance signals representing luminance and chrominance; and a compression unit that compresses the luminance chrominance signals.

Preferably, the image pickup device may further comprise: a resize unit that resizes the distortion-corrected image data to generate resized distortion-corrected image data. The second filter unit performs the second filtering process to the resized distortion-corrected image data.

Preferably, the image pickup device may further comprise: a luminance chrominance conversion unit that converts the second-filtered image data into luminance chrominance signals representing luminance and chrominance; and a compression unit that compresses the luminance chrominance signals.

Preferably, the image sensor may have a color filter array of Red (R) color filters, Green (G) color filters, and Blue (B) color filters. The image pickup device may further comprise: a resize unit that resizes the distortion-corrected image data to generate resized distortion-corrected image data; and an RGB synchronization unit that generates color image data for Red (R), Green (G), and Blue (B) from the resized distortion-corrected image data. The color image data is generated for each pixel position of the image sensor. The second filter unit may perform the second filtering process to the color image data.

Preferably, the image pickup device may further comprise: a luminance chrominance conversion unit that converts the second-filtered image data into luminance chrominance signals representing luminance and chrominance; and a compression unit that compresses the luminance chrominance signals.

Preferably, the image sensor may have a color filter array of Red (R) color filters, Green (G) color filters, and Blue (B) color filters. The image pickup device may further comprise: an RGB synchronization unit that generates color image data for Red (R), Green (G), and Blue (B) from the image data, the color image data being generated for each pixel position of the image sensor; and a luminance chrominance conversion unit that converts the color image data into luminance chrominance signals representing luminance and chrominance. The first filter unit may perform the first filtering process to the luminance chrominance signals.

Preferably, the image pickup device may further comprise: a compression unit that compresses the second-filtered image data.

Preferably, the image sensor has a color filter array of Red (R) color filters, Green (G) color filters, and Blue (B) color filters. The image pickup device may further comprise: a resize unit that resizes the distortion-corrected image data to generate resized distortion-corrected image data; an RGB synchronization unit that generates color image data for Red (R), Green (G), and Blue (B) from the image data, the color image data being generated for each pixel position of the resized distortion-corrected image data; and a luminance chrominance conversion unit that converts the color image data into luminance chrominance signals representing luminance and chrominance. The second filter unit may perform the second filtering process to the luminance chrominance signals.

Preferably, the image pickup device may further comprise: a compression unit that compresses the second-filtered image data.

In accordance with a third aspect of the present invention, an image pickup device may comprise: an optical system having a distortion characteristic, the optical system capturing an optical image of an object, the distortion characteristic magnifying a center portion of the optical image and reducing a peripheral portion of the optical image; an image sensor that converts the optical image into image data; an angle-of-view setting unit that sets a first angle of view and a second angle of view for the image data, the first angle of view being different from the second angle of view; a distortion correction unit that performs a first distortion correction of a first selected portion of the image data to generate first-distortion corrected image data, the first selected portion of the image data being defined by the first angle of view, the distortion correction unit that performing a second distortion correction of a second selected portion of the image data to generate second-distortion corrected image data, the second selected portion of the image data being defined by the second angle of view; and a storage unit that stores the first-distortion corrected image data and the second-distortion corrected image data.

Preferably, the angle-of-view setting unit may set the first angle of view and the second angle of view separately.

Preferably, the angle-of-view setting unit may further comprise: a first angle-of-view setting sub-unit that sets the first angle of view; and a second angle-of-view setting sub-unit that sets the second angle of view.

Preferably, the angle-of-view setting unit may further comprise: an angle-of-view switching unit that switches between the first angle of view and the second angle of view; and an angle-of-view switching display unit that displays a result of switch between the first angle of view and the second angle of view.

Preferably, the angle-of-view switching display unit may display the result of switch that is superimposed on the image data.

Preferably, the angle-of-view switching display unit may display the result of switch that is different in position from the image data.

Preferably, the image pickup device may further comprise: an image pickup mode switching unit that switch between at least two of a first image pickup mode, a second image pickup mode, and a third image pickup mode; and an image pickup mode switching display control unit that controls displaying a result of switch among the first image pickup mode, the second image pickup mode, and the third image pickup mode. The first image pickup mode is to pick up a single image at one of the first angle of view and the second angle of view. The second image pickup mode is to pick up images at the first angle of view and the second angle of view simultaneously. The third image pickup mode is to pick up an image at the second angle of view while monitoring the image at the first angle of view.

Preferably, the image pickup mode switching display control unit may display the result of switch that is superimposed on the image data.

Preferably, the image pickup mode switching display control unit may display the result of switch that is different in position from the image data.

Preferably, the image pickup mode switching display control unit may display the image in a color display mode in accordance with the first image pickup mode. The image pickup mode switching display control unit may also display the image in the color display mode and a frame in accordance with the second image pickup mode. The frame is defined by the second angle of view. The image pickup mode switching display control unit may also display a frame-inside portion of the image in the color display mode and a frame-outside portion of the image in a different display mode from the color display mode. The frame-inside portion of the image is inside the frame. The frame-output portion of the image is outside the frame.

Preferably, the image pickup mode switching display control unit may also display the frame-outside portion in one of a monochrome display mode, a luminance-modified display mode, and a chrominance-modified display mode.

Preferably, the image pickup device may further comprise: a display control unit that switches time-periodically between displaying the first distortion-corrected image data and displaying the second distortion-corrected image data.

Preferably, the image pickup device may further comprise: a display control unit that displays a first one of the first distortion-corrected image data and the second distortion-corrected image data for a period of time. The display control unit may also display a second one of the distortion-corrected image data and the second distortion-corrected image data when the angle-of-view switching unit detects a condition for switching between the first distortion-corrected image data and the second distortion-corrected image data.

Preferably, the storage may store the first distortion-corrected image data and the second distortion-corrected image data, both of which are associated with an index. The index presents that the first distortion-corrected image data and the second distortion-corrected image data are originated from a same image.

In accordance with a fourth aspect of the present invention, an image pickup device may comprise: an optical system having a distortion characteristic, the optical system capturing an optical image of an object, the distortion characteristic magnifying a center portion of the optical image and reducing a peripheral portion of the optical image; an image sensor that converts the optical image into image data; a frame memory that stores the image data; a frame memory output control unit that reads a first selected portion of the image data out of the frame memory, the first selected portion being defined by an angle of view, the angle of view being externally defined; a first filter unit that applies a first filtering process to a second selected portion of the image data to generate first-filtered image data, the second selected portion being included in the first selected portion, the second selected portion having a first range of distortion that is smaller than a first threshold value; and a distortion correction unit that performs a distortion correction of the first-filtered image data to generate distortion-corrected image data.

Preferably, the image pickup device may further comprise: a second filter unit that applies a second filtering process to a third portion of the distortion-corrected image data to generate second-filtered image data. The second filtering process is different from the first filtering process. The third selected portion has a second range of distortion that is greater than a second threshold value.

Preferably, the second filter unit may enhance an edge of the third portion of the distortion-corrected image data.

Preferably, the second filter unit may reduce noise of the third portion of the distortion-corrected image data.

Preferably, the image pickup device may further comprise: an image data correction unit. The image data correction unit may comprise at least one of a pixel defect correction unit that corrects a pixel defect of the image data, a white balance correction unit that corrects a white balance of the image data, and a shading correction unit that corrects a shading of the image data. The frame memory may store the image data that is outputted from the image data correction unit.

Preferably, the shading correction unit may correct the shading based on the distortion characteristic and a peripheral darkening characteristic that is caused by a lens frame holding the optical system.

Preferably, the shading correction unit may comprise an optical filter that is placed on an optical axis of the optical system.

Preferably, the shading correction unit may comprise an array of micro lenses provided on the image sensor. Each of the micro lenses is provided for each pixel.

Preferably, the optical system may be held by a lens frame. The lens frame may further hold a storage that stores the distortion characteristic. The distortion correction unit may perform the distortion correction based on the distortion characteristic that has been read out of the storage.

Preferably, the first filter unit may perform a low-pass filtering process to the second selected portion of the image data.

Preferably, the image sensor may change a line-subsampling rate for the image data depending on the distortion characteristic.

Preferably, the image sensor may have a color filter array of Red (R) color filters, Green (G) color filters, and Blue (B) color filters. The image pickup device may further comprise: an RGB synchronization unit that calculates an addition of color image data sets of adjacent pixels to a target pixel to generate different color image data of the target pixel. The adjacent pixels have a color different from a target color of the target pixel. The calculation of the addition is made with weighting the adjacent pixels based on distances of the adjacent pixels to the target pixel. The distances is defined under a condition that the distortion correction has been made.

Preferably, the RGB synchronization unit may calculate the different color image data "DX" of the target pixel "DX" by using one of the following first to third equations:

$$D_{image} = (\text{image data of } D1 \times (T2/(T1+T2))) + (\text{image data of } D2 \times (T1/(T1+T2)))/2 + (\text{image data of } D3 \times (T4/(T3+T4))) + (\text{image data of } D4 \times (T3/(T3+T4)))/2; \quad \text{Equation 1}$$

$$D_{image} = (\text{image data of } D1 \times (T2/(T1+T2))) + (\text{image data of } D2 \times (T1/(T1+T2))); \text{ and} \quad \text{Equation 2}$$

$$D_{image} = (\text{image data of } D3 \times (T4/(T3+T4))) + (\text{image data of } D4 \times (T3/(T3+T4))), \quad \text{Equation 3}$$

where DX is the target pixel, D1 and D2 are adjacent pixels positioned in first-opposing sides of the target pixel DX, D3 and D4 are other adjacent pixels positioned in second-opposing sides of the target pixel DX, T1 is a first distance between the adjacent pixel D1 and the target pixel DX, T2 is a second distance between the adjacent pixel D2 and the target pixel DX, T3 is a third distance between the adjacent pixel D3 and the target pixel DX, and T4 is a fourth distance between the adjacent pixel D4 and the target pixel DX, the first to fourth distances T1, T2, T3 and T4 are defined under a condition that the distortion correction has been made.

Objects, features, aspects, and advantages of the present invention will become apparent to those skilled in the art from the following detailed descriptions taken in conjunction with the accompanying drawings, illustrating the embodiments of the present invention.

BRIEF DESCRIPTION OF THE DRAWINGS

Referring now to the attached drawings which form a part of this original disclosure:

FIG. 23 is a view illustrating first to sixth images that are switched by operating the telescope/wide witching button and adjusting the zooming ratio in either the wide angle and telescope simultaneous pickup mode or the wide monitoring and telescope pickup mode in the camera with the operating unit shown in FIG. 22C;

DETAILED DESCRIPTION OF THE INVENTION

Selected embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
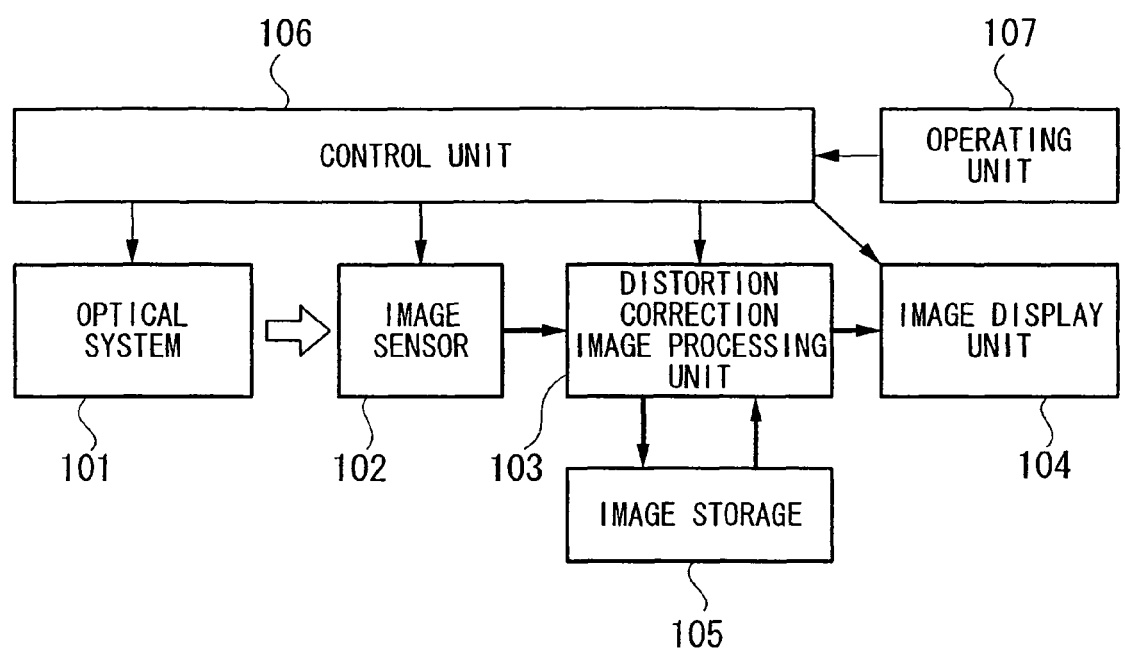
FIG. 1 is a block diagram illustrating an image pickup device in accordance with a first embodiment of the present invention.

FIG. 1 is a block diagram illustrating an image pickup device in accordance with a first embodiment of the present invention. The image pickup device can typically be realized by a digital camera. The image pickup device may include, but is not limited to, an optical system 101, an image sensor 102, a distortion correction image processor 103, an image display 104, an image storage 105, a control unit 106, and an operating unit 107.

The distortion correction image processor 103 may be configured to perform at least one of functions of the following units. The distortion correction image processor 103 may typically include, but are not limited to, an image correction unit, an RGB synchronization unit, a first filter unit, an aberration correction unit, a magnification reduction unit, a second filter unit, a YC conversion unit, an image compression unit, a display conversion unit, and a frame memory. The image correction unit may further include, but is not limited to, a pixel defect correction unit, a white balance correction unit, an image decompression unit, a distortion correction unit, and a shading correction unit. The YC conversion unit is a luminance chrominance conversion unit that converts luminance and chrominance. The magnification reduction unit is a resize unit that resizes the image.

The image storage 105 may be configured to perform at least one function. Typical examples of the function of the image storage 105 may include, but are not limited to, a frame memory, a storage, an image memory, and a table memory.

Figure 29:
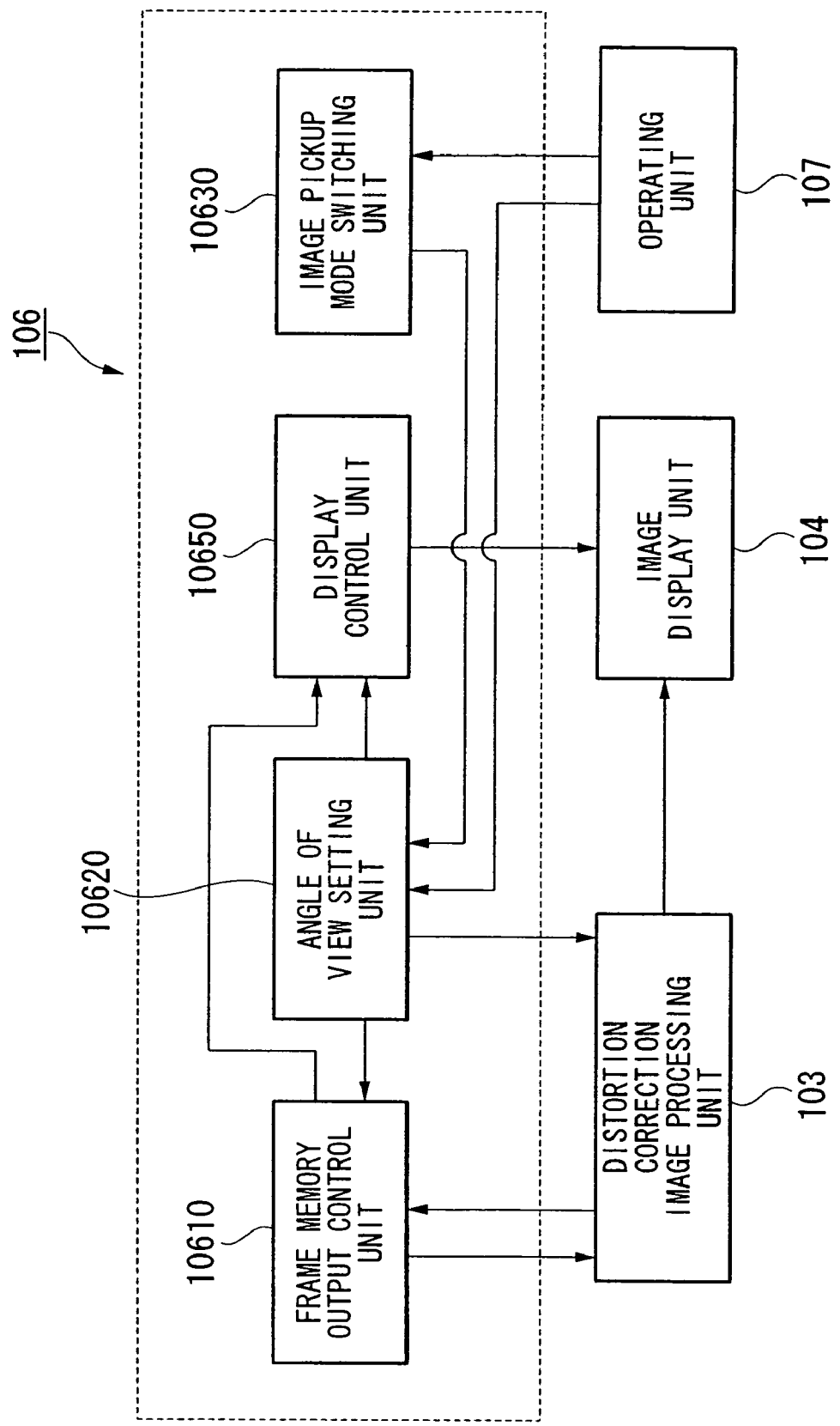
FIG. 29 is a block diagram illustrating an example of a configuration of the control unit included in the image pickup device shown in FIG. 1.
Figure 30:
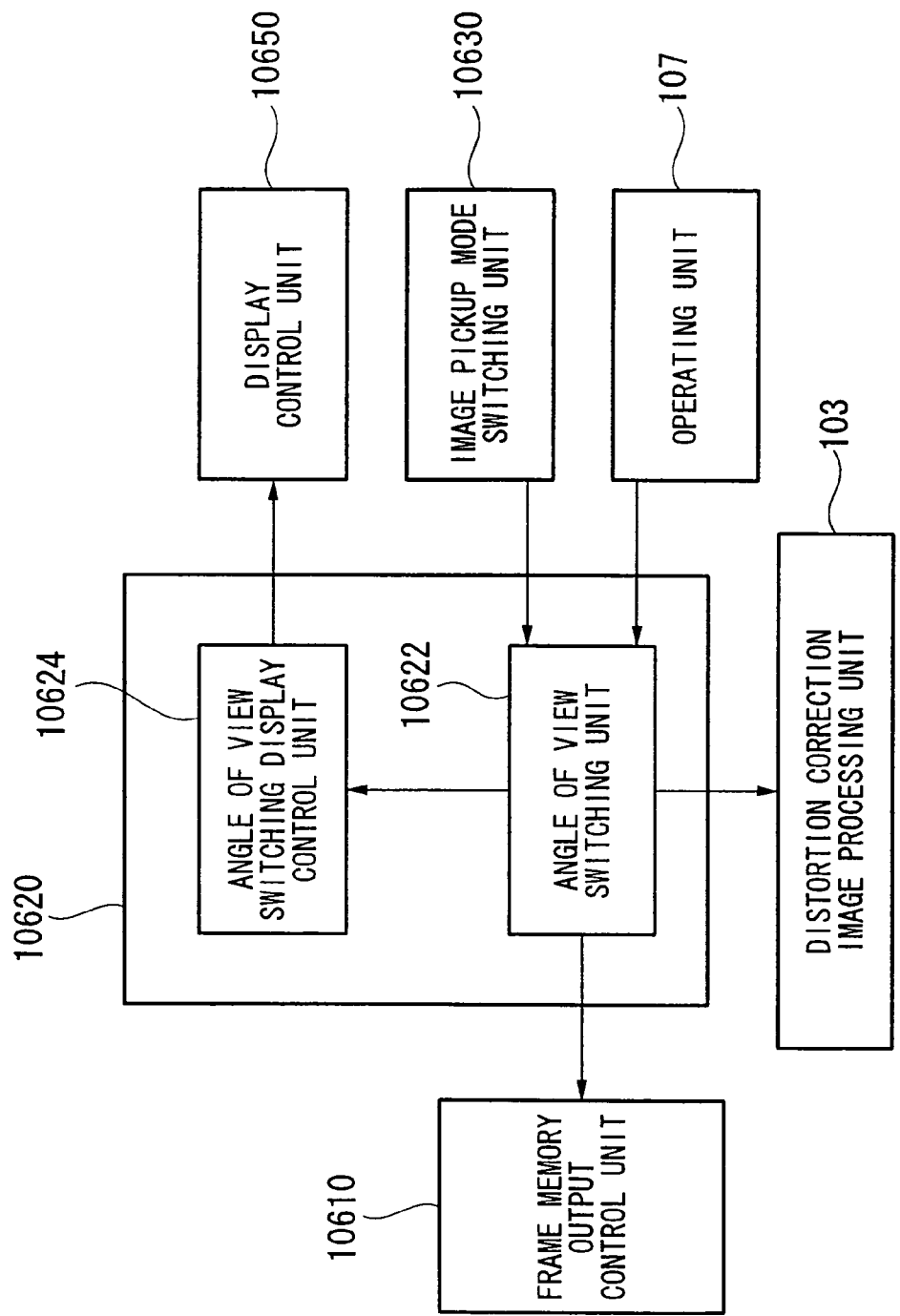
FIG. 30 is a block diagram illustrating an example of a configuration of the angle-of-view setting unit included in the control unit shown in FIG. 29.
Figure 31:
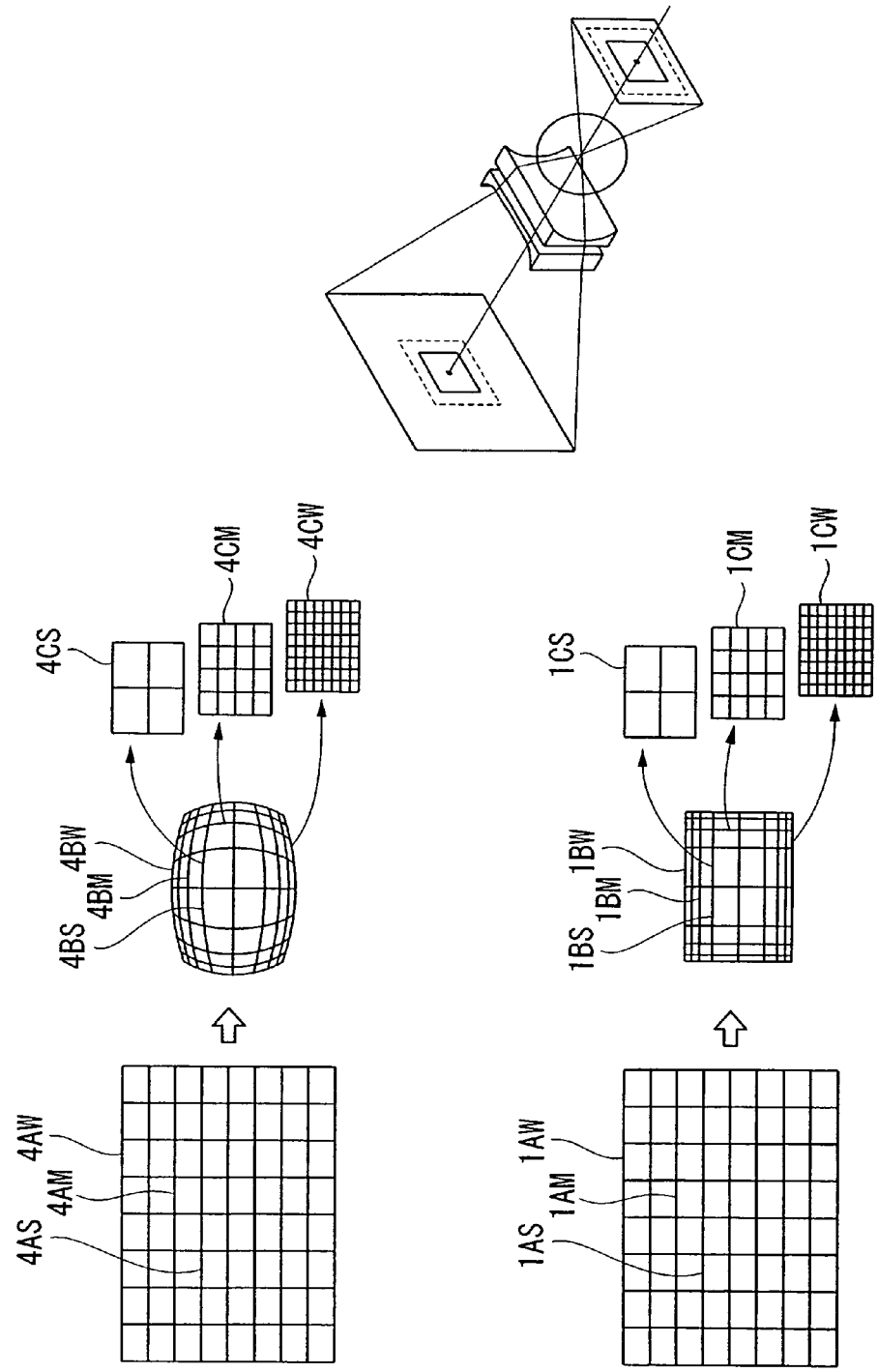
FIG. 31 is a view illustrating a conventional technique for inputting electronically zoomed image.

FIG. 29 is a block diagram illustrating an example of a configuration of the control unit 106 included in the image pickup device shown in FIG. 1. FIG. 30 is a block diagram illustrating an example of a configuration of the angle-of-view setting unit 10620 included in the control unit 106 shown in FIG. 29. As shown in FIGS. 29 and 30, the control unit 106 may typically include, but is not limited to, a frame memory output control unit 10610, an angle-of-view setting unit 10620, an image pickup mode switching unit 10630, and a display control unit 10650. Examples of each of the function units may include hardware and/or software that is constructed and/or programmed to carry out the respective function. Typical examples of the hardware may include, but are not limited to, a device and a circuit.

The image pickup mode switching unit 10630 can be configured to receive instructions that are at least related to an image pickup mode from the operating unit 107. The image pickup mode switching unit 10630 can be configured to switch between at least two of first to third image pickup modes based on the received instructions. The first image pickup mode is to pick up a single image at one of the first angle of view and the second angle of view. The second image pickup mode is to pick up images at both the first angle of view and the second angle of view simultaneously. The third image pickup mode is to pick up an image at the second angle of view while monitoring the image at the first angle of view. The image pickup mode switching unit 10630 can be configured to supply a selected one of the first to third image pickup modes to the angle-of-view setting unit 10620.

The angle-of-view setting unit 10620 can be configured to receive instructions that are at least related to an angle of view from the operating unit 107. The angle-of-view setting unit 10620 can also be configured to receive a selected one of the first to third image pickup modes from the image pickup mode switching unit 10630. The angle-of-view setting unit 10620 can be configured to perform two different functions, for example, an angle-of-view setting function and an image pickup mode switching display control function based on the received instruction and the selected one of the first to third image pickup modes.

The angle-of-view setting function can set a first angle of view and a second angle of view that is different from the first angle of view in accordance with the received instructions and the selected one of the first to third image pickup modes. The angle-of-view setting function can further switch between the first angle of view and the second angle of view in accordance with the received instructions and the selected one of the first to third image pickup modes. The angle-of-view setting function can also set the first angle of view and the second angle of view separately in accordance with the received instructions and the selected one of the first to third image pickup modes. In a case, the angle-of-view setting unit 10620 may further comprise a first angle-of-view setting sub-unit that sets the first angle of view, and a second angle-of-view setting sub-unit that sets the second angle of view.

The image pickup mode switching display control function can make the display control unit 10650 control the image display unit 104 to perform a display in accordance with the received instructions and the selected one of the first to third image pickup modes. For example, the image pickup mode switching display control function can control the display control unit 10650 so that the image display unit 104 displays the image in a color display mode in accordance with the first image pickup mode. The image pickup mode switching display control function can also control the display control unit 10650 to allow the image display unit 104 to display the image in the color display mode and a frame in accordance with the second image pickup mode. The frame is defined by the second angle of view. The image pickup mode switching display control function can also control the display control unit 10650 to allow the image display unit 104 to display a frame-inside portion of the image in the color display mode and a frame-outside portion of the image in a different display mode from the color display mode in accordance with the third image pickup mode. The frame-inside portion of the image is inside the frame. The frame-output portion of the image is outside the frame. The image pickup mode switching display control function can also control the display control unit 10650 to allow the image display unit 104 to display the frame-outside portion in one of a monochrome display mode, a luminance-modified display mode, and a chrominance-modified display mode.

As shown in FIG. 30, the angle-of-view setting unit 10620 may further comprise an angle-of-view switching unit 10622 and an angle-of-view switching display control unit 10624. The angle-of-view switching unit 10622 can be configured to receive instructions from the operating unit 107. The angle-of-view switching unit 10622 can also be configured to receive a selected one of the first to third image pickup modes from the image pickup mode switching unit 10630. The angle-of-view switching unit 10622 can be configured to perform the above-described two different functions, namely, the angle-of-view switching function and the image pickup mode switching display control function. For example, the angle-of-view switching unit 10622 can also be configured to switch between the first angle of view and the second angle of view based on the received instructions and the selected image pickup mode. The angle-of-view switching unit 10622 can also be configured to make the display control unit 10650 control the image display unit 104 to perform a display in accordance with the received instructions and the selected image pickup mode.

The angle-of-view switching display control unit 10624 can be configured to receive an angle-of-view switch signal and a display control signal from the angle-of-view switching unit 10622. The angle-of-view switch signal is generated by the angle-of-view switching function. The display control signal is generated by the image pickup mode switching display control function. The angle-of-view switching display control unit 10624 can be configured to decide whether the result of the angle-of-view switch should be displayed so as to be superimposed on the image data or to be distanced from the image data. The angle-of-view switching display control unit 10624 can be configured to supply a result of decision on display to the display control unit 10650. The display control unit 10650 controls the image display unit 104 to display the image and the result of switch in accordance with the result of decision.

The angle-of-view switching unit 10622 can also be configured to supply the result of angle-of-view switch to the frame memory output control unit 10610. The angle-of-view switching unit 10622 can also be configured to supply the result of angle-of-view switch to the distortion correction image processing unit 103.

The frame memory output control unit 10610 can be configured to receive the result of switch from the angle-of-view switching unit 10622. The frame memory output control unit 10610 can be configured to receive the first angle of view and the second angle of view from the angle-of-view switching unit 10622. The frame memory output control unit 10610 can be configured to recognize the selected one of the first angle of view and the second angle of view. The selected one has been switched or selected by the angle-of-view switching unit 10622. The frame memory output control unit 10610 can be configured to recognize the first angle of view and the second angle of view that have been set by the angle-of-view switching unit 10622. The frame memory output control unit 10610 can be configured to access a frame memory that is included in the distortion correction image processing unit 103 so that the frame memory output control unit 10610 reads a selected portion of the image data. The selected portion is defined by the recognized angle of view. Namely, the selected portion is defined by a portion of the image, the portion being defined by the selected or recognized angle of view. The frame memory output control unit 10610 can be configured to supply the selected portion of the image data to the display control unit 10650. The display control unit 10650 controls the image display unit 104 to display the recognized angle of view and the image defined by the recognized angle of view.

The display control unit 10650 can be configured to receive distortion-corrected image data from the frame memory output control unit 10610. The display control unit 10650 can also be configured to receive, from the frame memory output control unit 10610, first distortion-corrected image data and second distortion-corrected image data. The second distortion-corrected image data is different from the first distortion-corrected image data. The display control unit 10650 can further be configured to switch time-periodically between displaying the first distortion-corrected image data and displaying the second distortion-corrected image data. The display control unit 10650 can also be configured to display a first one of the first distortion-corrected image data and the second distortion-corrected image data for a period of time. If the angle of view switching unit 10622 switches between the first angle of view and the second angle of view during the period of time, then the display control unit 10650 displays a second one of the first distortion-corrected image data and the second distortion-corrected image data.

The optical system 101 has a distortion characteristic that magnifies a center portion of an optical image and reduces a peripheral portion of the optical image. The image sensor 102 can be realized by a photoelectric converter that converts an optical image into an electric signal, wherein the optical image has been supplied through the optical system 101 with the distortion. Typical examples of the photoelectric converter may include, but are not limited to, a CCD or a CMOS sensor.

The distortion correction image processor 103 is adapted to transform an image signal into a transformed signal in a format that needs to display and compress the image. The image signal has been outputted from the image sensor 102. The distortion correction image processor 103 is also adapted to correct an optical distortion. The distortion correction image processor 103 is further adapted to perform image processing to improve the quality of image. The distortion correction image processor 103 is furthermore adapted to compress data for storing the compressed data.

The image display 104 can typically be realized by a liquid crystal display. The image display 104 displays the image taken. The image storage 105 is configured to store data of the image taken. The image storage 105 can typically be realized by a semiconductor memory and a magnetic memory. The controller 106 controls the optical system 101, the image sensor 102, the distortion correction image processor 103 and the image display 104 in accordance with a control program. This control program may be stored in a storage or a storage medium typically a ROM (read only memory). The operating unit 107 can be used to allow an operator to operate the image pickup device. The operating unit 107 may have buttons and switches that correspond to functions and an information display unit.

Figure 2B:
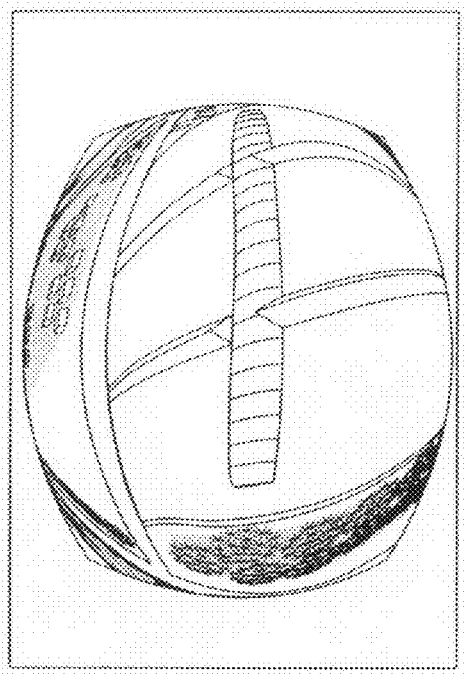
FIG. 2B is a view illustrating an example of an optical image captured by another optical system having another distortion.
Figure 2A:
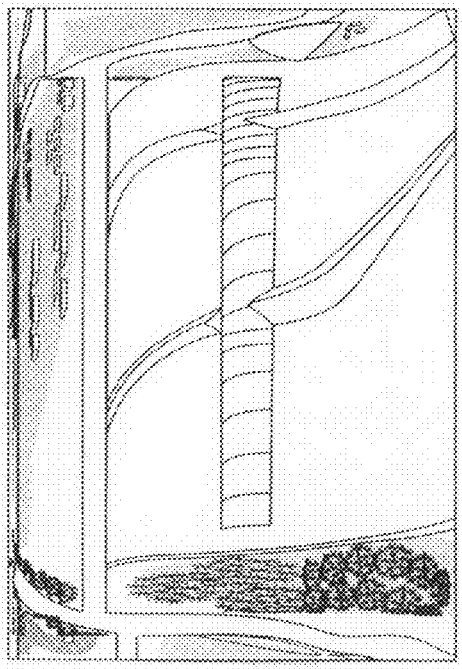
FIG. 2A is a view illustrating an example of an optical image captured by an optical system having a distortion.
Figure 2C:
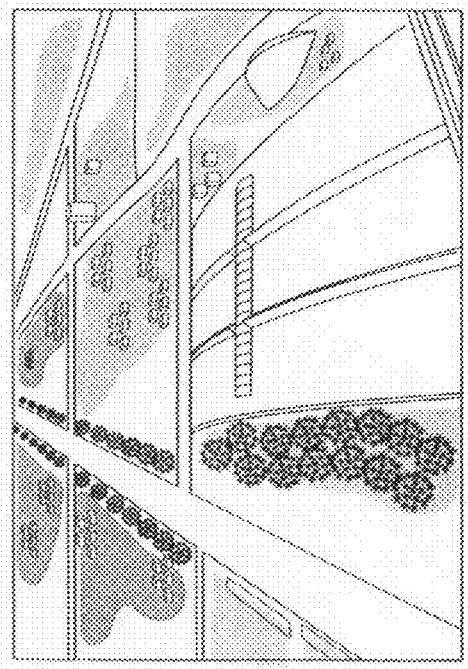
FIG. 2C is a view illustrating an example of an optical image captured by a distortion-free optical system.

FIG. 2A is a view illustrating an example of an optical image captured by an optical system having a distortion. FIG. 2B is a view illustrating an example of an optical image captured by another optical system having another distortion. FIG. 2C is a view illustrating an example of an optical image captured by a distortion-free optical system. FIG. 2A illustrates the example of the optical image captured by the optical system that has a distortion that compresses the optical image. The degree of compression increases as the position on the optical image comes close to the periphery of the optical image. The degree of compression along the vertical axis is independent from that along the horizontal axis. FIG. 2B illustrates the example of the optical image captured by a coaxial optical system that has a barrel distortion that compresses the optical image. The degree of compression increases co-centrically as the distance from the center position of the optical image increases. FIGS. 2A through 2C illustrate the optical images of the same object.

The optical system 101 is configured to have a distortion that magnifies the center portion of the optical image and reduces the peripheral portion of the optical image. The optical system 101 may be configured to have a complex distortion that contains the distortion of FIG. 2A and the distortion of FIG. 2B. In general, the distortion of FIG. 2A may be suitable for correcting the distortion to obtain a higher quality of image as compared to the distortion of FIG. 2B. The following descriptions will be made assuming that the optical system 101 has the distortion of FIG. 2A.

Figure 3B:
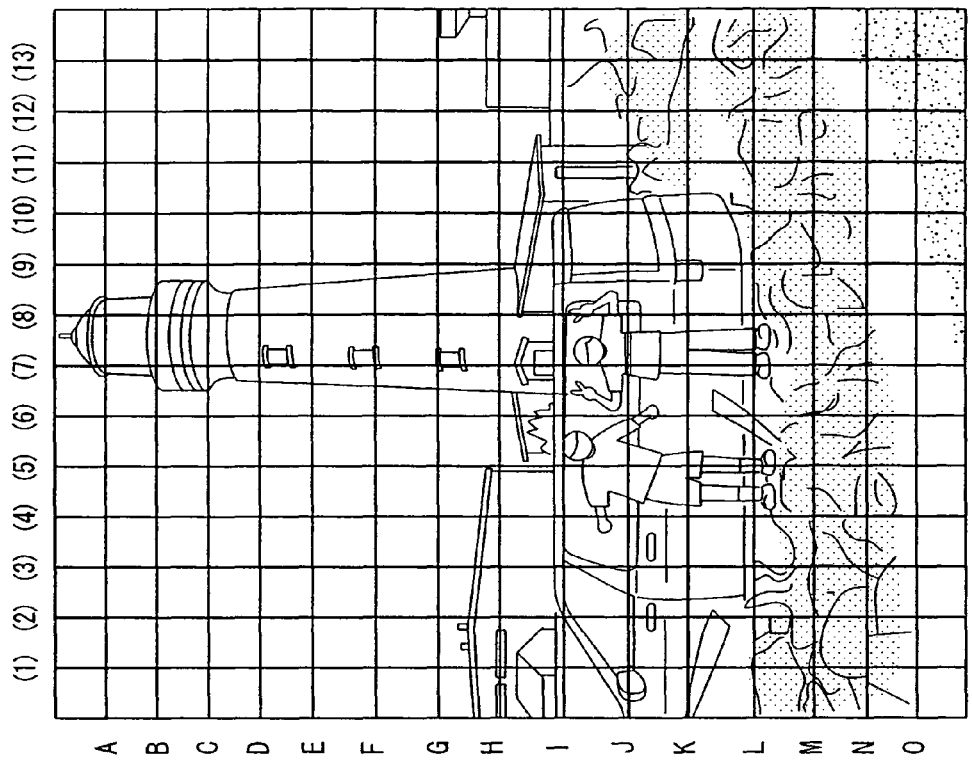
FIG. 3B is a schematic view illustrating an image that is captured by a distortion-free optical system.
Figure 3A:
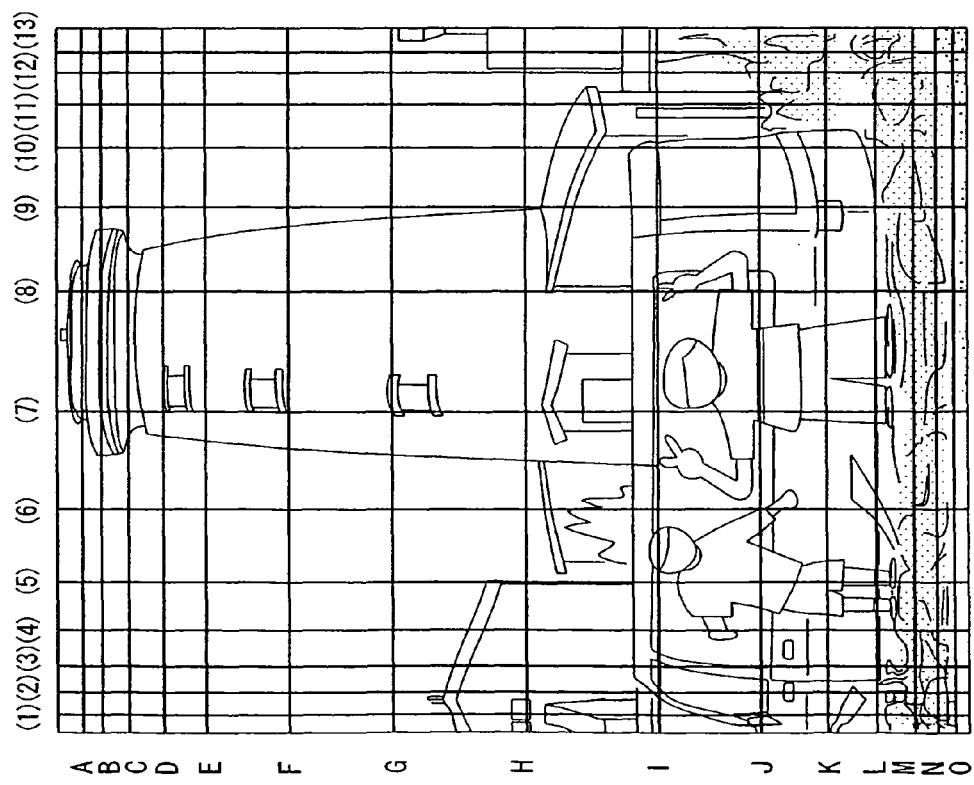
FIG. 3A is a schematic view illustrating an image that is captured by the optical system 101 having the distortion shown in FIG. 2A, wherein the distortion is independent from the vertical and horizontal directions.

FIG. 3A is a schematic view illustrating an image that is captured by the optical system 101 having the distortion shown in FIG. 2A, wherein the distortion is independent from the vertical and horizontal directions. FIG. 3B is a schematic view illustrating an image that is captured by a distortion-free optical system. As similarly to FIG. 2A, FIG. 3A illustrates the example of the optical image captured by the optical system that has a distortion that compresses the optical image. The degree of compression increases as the position on the optical image comes close to the periphery of the optical image. The degree of compression along the vertical axis is independent from that along the horizontal axis. In FIGS. 3A and 3B, (1), - - - (13) represent a first set of coordinate positions on an object, the first set of coordinate positions being aligned in a horizontal direction at a constant pitch on the object, while (A), - - - (O) represent a second set of coordinate positions on the object, the second set of coordinate positions being aligned in a vertical direction at a constant pitch on the object. In FIGS. 3A and 3B, the same portion of the image is positioned at the same coordinate position. For example, the same portion of the image appears at the same coordinate position ((7), H) in FIGS. 3A and 3B.

Figure 4:
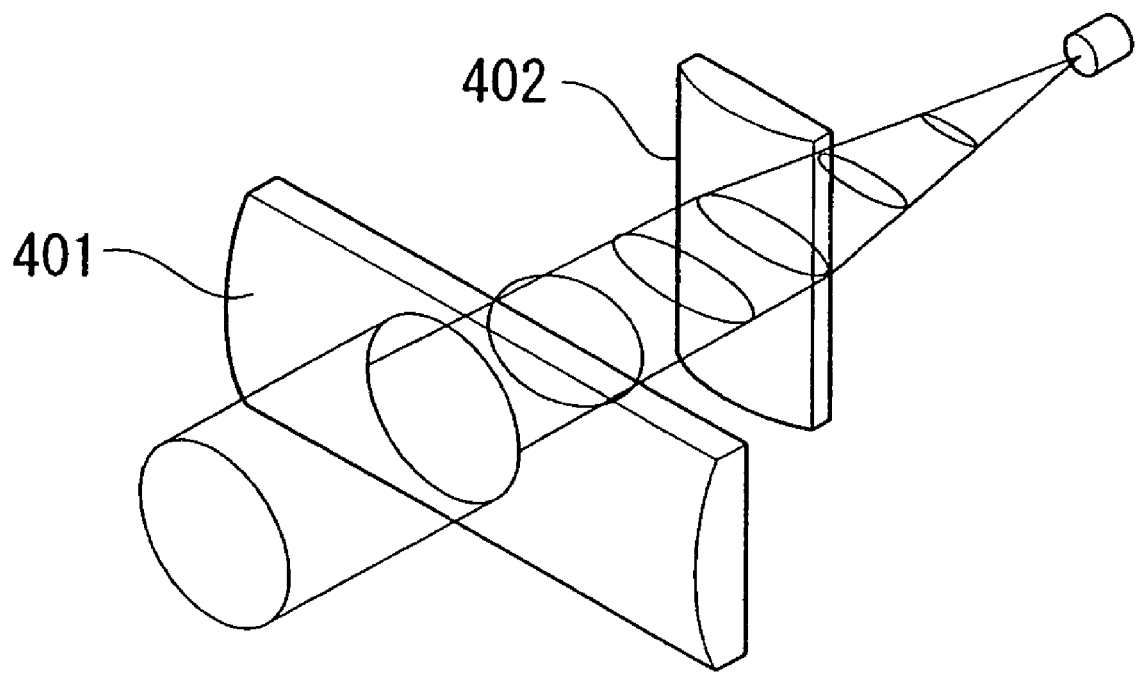
FIG. 4 is a view illustrating a configuration of the optical system with the distortion shown in FIG. 2A.

FIG. 4 is a view illustrating a configuration of the optical system with the distortion shown in FIG. 2A. The optical system with the distortion can be realized by a combination of paired cylindrical lenses 401 and 402. Each of the cylindrical lenses 401 and 402 has a flat surface and a curved surface opposing the flat surface. The curved surface constitutes a part of a side wall of a cylinder. Each of the cylindrical lenses 401 and 402 further has a longitudinal axis that is parallel to a center axis of the cylinder so that the curved surface curves partially surrounding the longitudinal axis. The paired cylindrical lenses 401 and 402 are aligned so that the flat surfaces of the cylindrical lenses 401 and 402 are parallel to each other and the directions of the longitudinal axes of the cylindrical lenses 401 and 402 are different from each other by a right angle.

When the image pickup device captures the view image shown in FIG. 3B, the optical image is transmitted through the optical system 101 with the distortion that enlarges a center portion of the optical image and compresses a peripheral portion thereof so that a distorted optical image is formed on the image sensor 102. This distorted optical image is converted into an electrical signal by the image sensor 102. The image sensor 102 is configured to perform a function that converts an optical image into an electrical signal, but is not limited to a particular configuration. The image sensor 102 may typically have a Bayer array of color filters so as to output sequentially pixel data that contain the color information of the Bayer array. These pixel data are converted into a digital signal by an analog front-end circuit (CDS, PGA, A/D). The digital signal is inputted into the distortion correction image processor 103.

Figure 5:
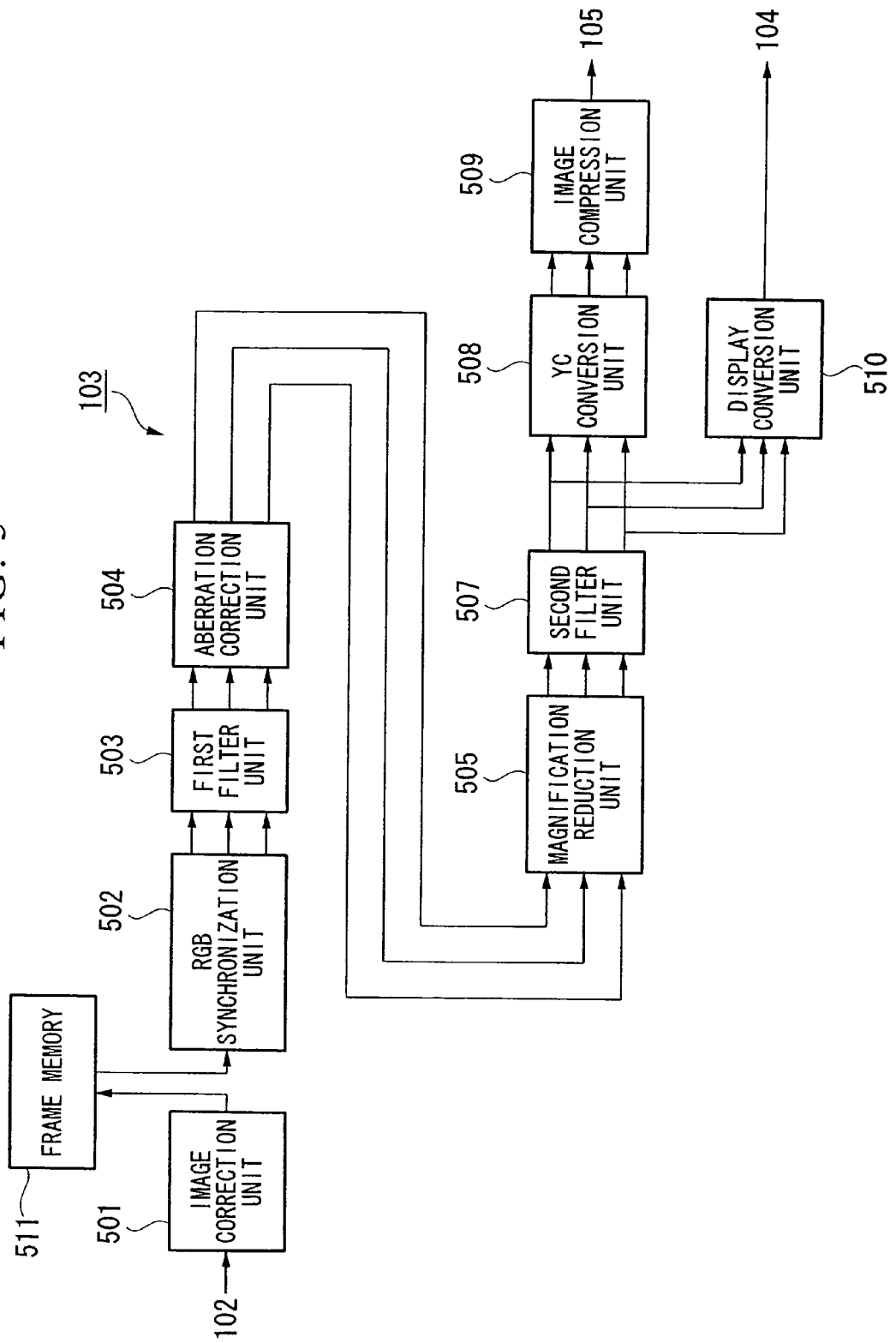
FIG. 5 is a block diagram illustrating an example of a configuration of the distortion correction image processor shown in FIG. 1.

FIG. 5 is a block diagram illustrating an example of a configuration of the distortion correction image processor 103 shown in FIG. 1. The distortion correction image processor 103 may be configured to perform at least one of functions of the following units. The distortion correction image processor 103 may typically include, but are not limited to, an image correction unit 501, an RGB synchronization unit 502, a first filter unit 503, an aberration correction unit 504, a magnification reduction unit 505, a second filter unit 507, a YC conversion unit 508, an image compression unit 509, a display conversion unit 510, and a frame memory 511. The image correction unit 501 may be configured to perform at least one function. Typical examples of the function of the image correction unit 501 may include, but are not limited to, a pixel defect correction function, a white balance correction function, and a shading correction function. Whereas illustrations are omitted in the drawings, the above functions can be realized by function units. Examples of each of the function units may include hardware and/or software that is constructed and/or programmed to carry out the respective function. Typical examples of the hardware may include, but are not limited to, a device and a circuit. The YC conversion unit 508 is a luminance chrominance conversion unit that converts luminance and chrominance. The magnification reduction unit 505 is a resize unit that resizes the image.

The image correction unit 501 is adapted to receive the captured image from the image sensor 102. The image correction unit 501 is adapted to perform, to the received image, a pixel defect correction, a white balance correction, and a shading correction. The shading correction is to correct the quantity of light.

Figure 6A:
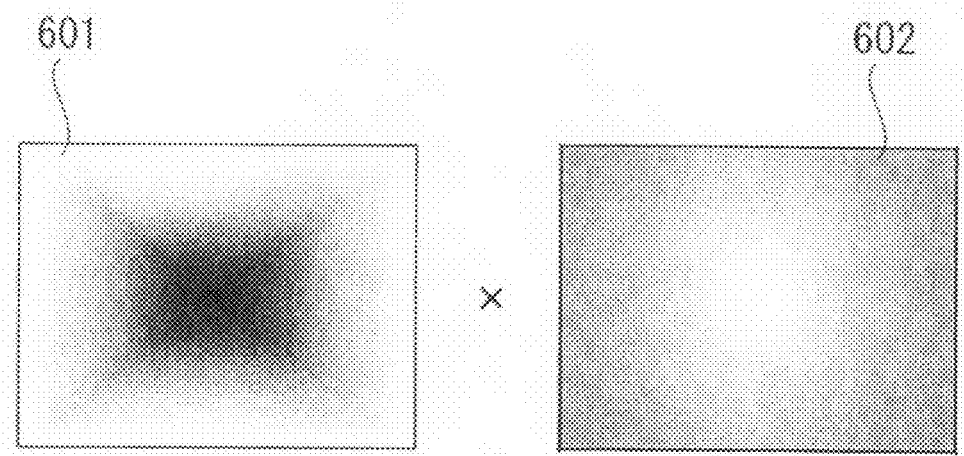
FIG. 6A is a view illustrating brightening and darkening of a peripheral portion of an image captured through an optical system having a cylindrical distortion, the brightening being caused by compression of the peripheral portion, the compression being further caused by the cylindrical distortion, and the darkening being caused by shading the peripheral portion, and the shading being further caused by a lens frame.
Figure 6B:
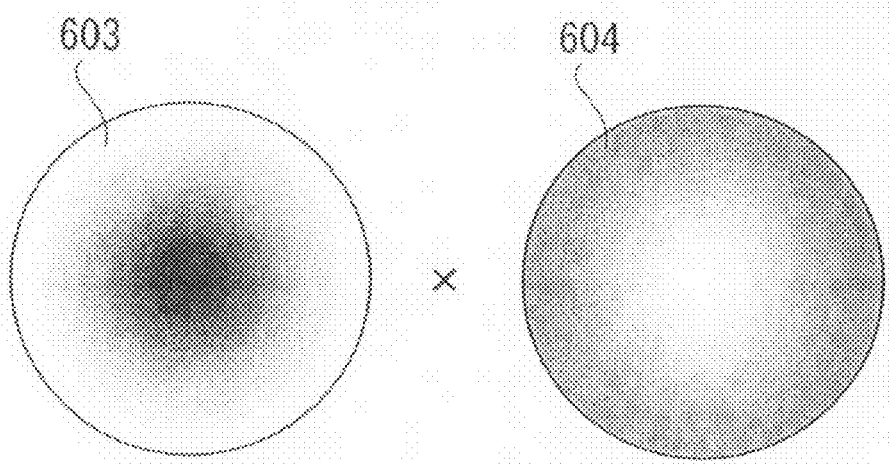
FIG. 6B is a view illustrating brightening and darkening of a peripheral portion of an image captured through another optical system having a coaxial distortion, the brightening being caused by compression of the peripheral portion, the compression being further caused by the coaxial distortion, and the darkening being caused by shading the peripheral portion, and the shading being further caused by a lens frame.

FIG. 6A is a view illustrating brightening and darkening of a peripheral portion of an image captured through an optical system having a cylindrical distortion, the brightening being caused by compression of the peripheral portion, the compression being further caused by the cylindrical distortion, and the darkening being caused by shading the peripheral portion, and the shading being further caused by a lens frame. FIG. 6B is a view illustrating brightening and darkening of a peripheral portion of an image captured through another optical system having a coaxial distortion, the brightening being caused by compression of the peripheral portion, the compression being further caused by the coaxial distortion, and the darkening being caused by shading the peripheral portion, and the shading being further caused by a lens frame. An image 601 of FIG. 6A is captured by the optical system having the cylindrical distortion that compresses a peripheral portion of the image 601. The image 601 has the compressed peripheral portion that has an increased intensity of light or brightening. An image 602 of FIG. 6A is captured by the optical system having the cylindrical distortion that provides a rectangle-shaped lens frame that shades a peripheral portion of the image 602. The image 602 has the shaded peripheral portion that has a decreased intensity of light or darkening. An image 603 of FIG. 6B is captured by the optical system having the coaxial distortion that compresses a peripheral portion of the image 603. The image 603 has the compressed peripheral portion that has an increased intensity of light or brightening. An image 604 of FIG. 6B is captured by the optical system having the coaxial distortion that provides a circle-shaped lens frame that shades a peripheral portion of the image 604. The image 604 has the shaded peripheral portion that has a decreased intensity of light or darkening. The image correction unit 501 may be adapted to perform a shading correction to the captured image by taking into account the brightening and darkening. The image correction unit 501 may include a shading correction unit that is dedicated to perform a shading correction. The shading correction unit may be realized by a shading correction circuit. The shading correction unit may correct the shading based on the distortion characteristic and a peripheral darkening characteristic that is caused by a lens frame holding the optical system. Preferably, the shading correction unit may comprise an optical filter that is placed on an optical axis of the optical system. Preferably, the shading correction unit may comprise an array of micro lenses provided on the image sensor. Each of the micro lenses is provided for each pixel.

Figures 7A, 7B, 7C, 7D:
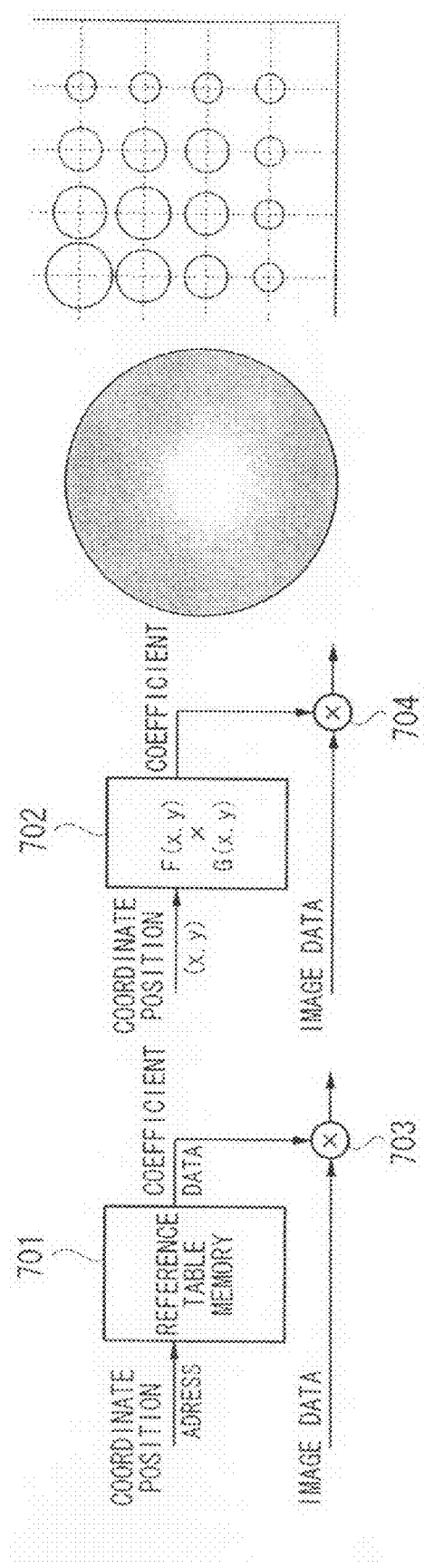
FIG. 7A is a diagram illustrating an example of a configuration of the shading circuit included in the image correction unit shown in FIG. 5.
FIG. 7B is a diagram illustrating another example of the configuration of the shading circuit included in the image correction unit shown in FIG. 5.
FIG. 7C is a view illustrating an optical filter that is provided on an optical axis to correct an optical shading.
FIG. 7D is a view illustrating an array of plural on-chip lenses that are different in size and transmittivity, the array being provided in an image sensor.

FIG. 7A is a diagram illustrating an example of a configuration of the shading circuit included in the image correction unit 501 shown in FIG. 5. FIG. 7B is a diagram illustrating another example of the configuration of the shading circuit included in the image correction unit 501 shown in FIG. 5. FIG. 7C is a view illustrating an optical filter that is provided on an optical axis to correct an optical shading, wherein the optical filter has a proportion of transmittance that cancels a brightening of a peripheral portion and a darkening of the peripheral portion, the brightening being caused by the distortion, and the darkening being caused by shading due to the lens frame. FIG. 7D is a view illustrating an array of plural on-chip lenses that are different in size and transmittivity, the array being provided in the image sensor.

A shading correction circuit shown in FIG. 7A may comprise a multiplier 703 and a reference table memory 701. An address is inputted into the reference table memory 701, the address representing physical coordinate positions of an input image that is supplied from the image sensor 102 shown in FIG. 1. The reference table memory 701 outputs a coefficient of correction as data. The multiplier 703 multiplies the input image data from the image sensor 102 by the coefficient of correction to perform a shading correction to the input image data.

A shading correction circuit 704 shown in FIG. 7B may comprise a multiplier 704 and an arithmetic unit 702. The arithmetic unit 702 is configured as a product of a function $F(x, y)$ and another function $G(x, y)$. The function $F(x, y)$ represents a relationship of the brightening due to the distortion and the physical coordinate positions $(x, y)$. The function $G(x, y)$ represents another relationship of the darkening due to the lens frame and the physical coordinate positions $(x, y)$. An address is inputted into the arithmetic unit 702, the address representing physical coordinate positions of an input image that is supplied from the image sensor 102 shown in FIG. 1. The arithmetic unit 702 outputs another coefficient of correction as an arithmetic result. The multiplier 704 multiplies the input image data from the image sensor 102 by the coefficient of correction to perform a shading correction to the input image data.

Even illustration is omitted, it is possible as a modification for the reference table memory 701 to have a limited capacity for partial coordinate positions, while failing to store remaining coordinate positions. A coefficient of correction of coordinate positions that are not stored in the reference table memory 701 can be calculated by a linear interpolation from available data of proximal coordinate positions that are stored in the reference table memory 701.

The shading correction can also be realized by using the optical system having a distortion in combination with a neutral density filter. The neutral density filter has a transmittivity that is adjusted by taking into account the distortion and the lens frame of the optical system as shown in FIG. 7C. The distortion compresses the peripheral portion of the image thereby increasing the intensity of light or brightening. The lens frame shades the peripheral portion of the image thereby decreasing the intensity of light or darkening.

The shading correction can also be realized by using an array of on-chip lenses of the image sensor as shown in FIG. 7D. The array of on-chip lenses has a variation in aperture ratio. The variation depends on the size and transmittivity of on-chip lenses. The variation is determined based on the brightening and darkening. The brightening is caused by compressing the peripheral portion of the image. The compression is caused by the distortion of the optical image. The darkening is caused by shading the peripheral portion of the image. The shading is caused by the lens frame.

Figure 8:
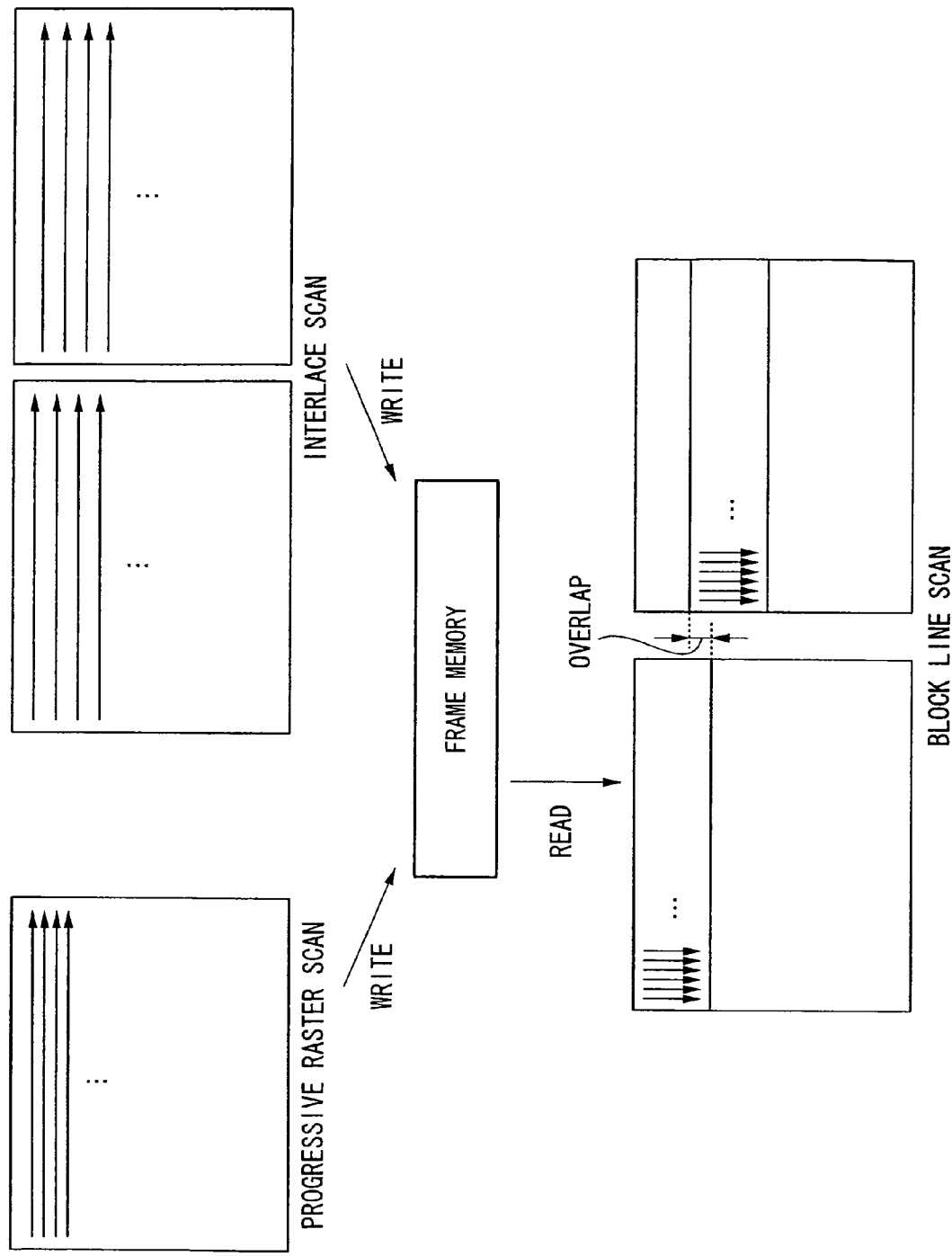
FIG. 8 is a view illustrating rearrangement of image data using the frame memory.

The frame memory 511 stores the corrected image signal that has been corrected by the image correction unit 501. FIG. 8 is a view illustrating rearrangement of image data using the frame memory 511. An array of data outputted from the image sensor is an array for progressive raster scan or interlace scan. The array of data is once stored in the frame memory 511. The array of data is read out of the frame memory 511 with rearrangement of data so that a rearranged array of data is an array for block line scan. The array for block line scan allows continuous spatial image processing without using the frame memory 511. Reading the rearranged array of data is made with partially overlap in multistage spatial image processing. The reason why the image signal is once stored in the frame memory 511 is to rearrange, as shown in FIG. 8, the data array for the progressive raster scan or the interlace scan into the other data array for the block line scan that allows the continuous spatial image processing without using the frame memory 511. The other reason is to allow capturing both a wide angle image and a telescopic image simultaneously.

The RGB synchronization unit 502 is configured to read, from the frame memory 511, a Bayer array of image data that corresponds to an angle of view that is externally designated. The RGB synchronization unit 502 is further configured to generate all color data of RGB for all coordinate positions, the generation being made from the Bayer array of image data by using an interpolation. This synchronization process is performed by an interpolation from the image data of proximal filters of the same colors.

Figure 9B:
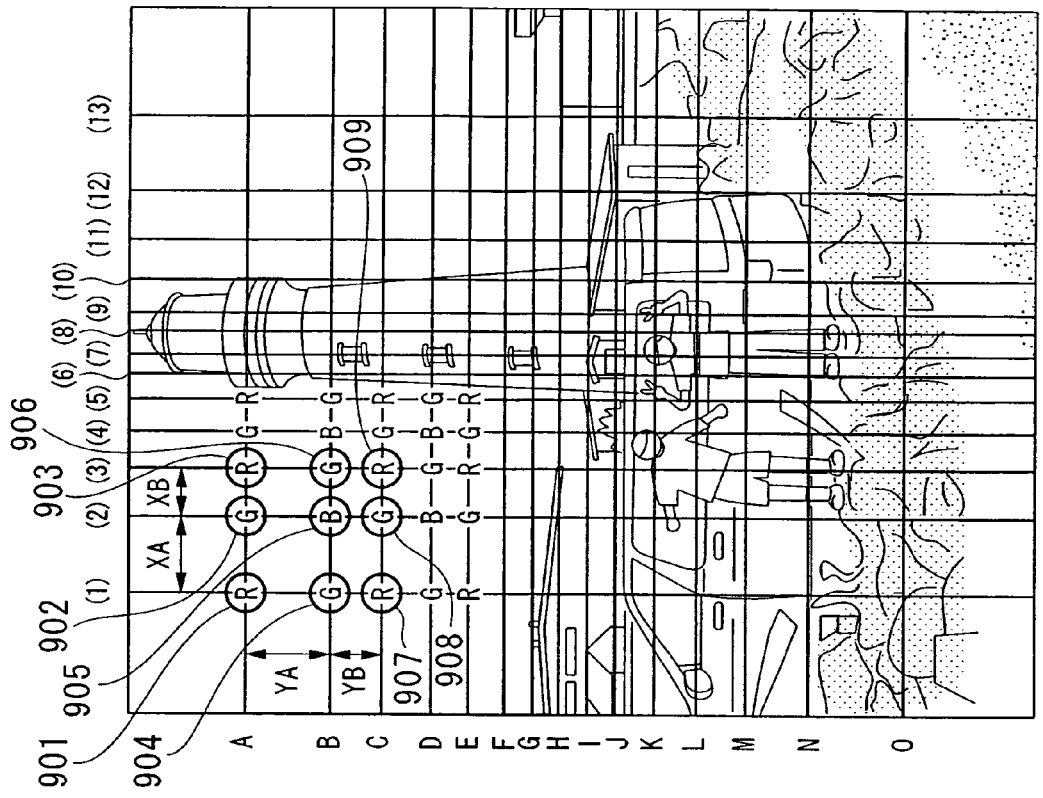
FIG. 9B is a view illustrating a corrected image data that has been obtained by correcting the image data of FIG. 9A by the RGB synchronization unit shown in FIG. 5.
Figure 9A:
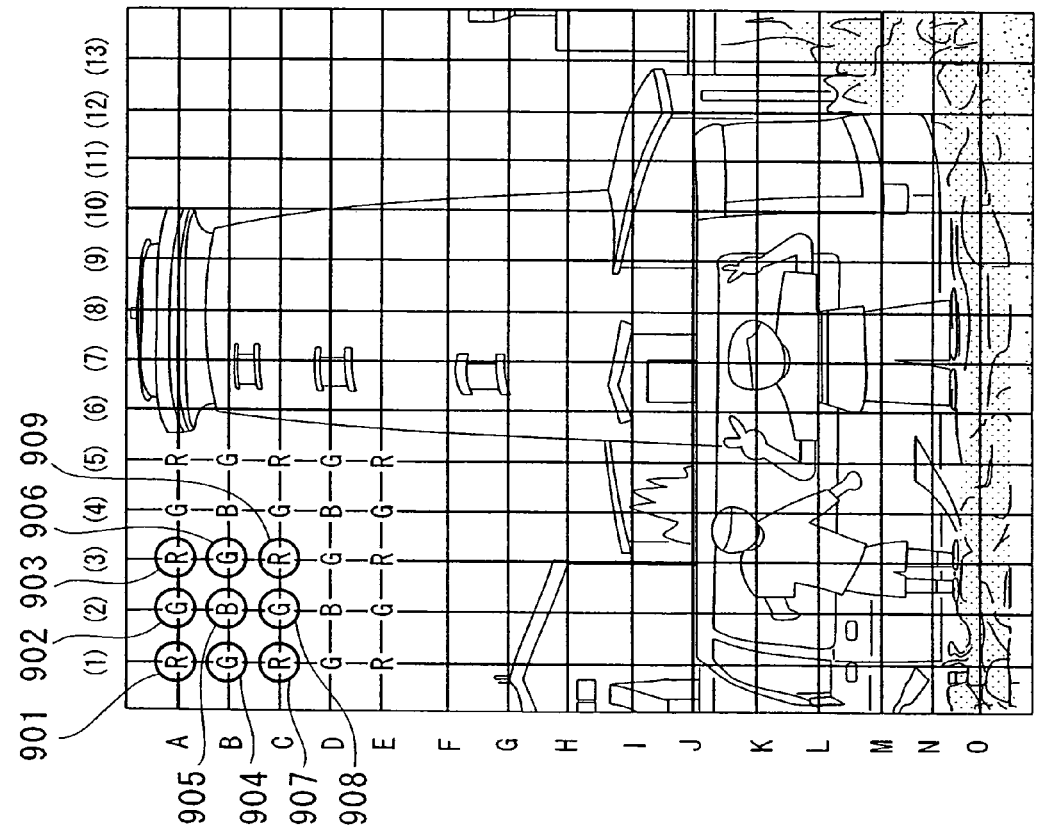
FIG. 9A is a view illustrating an image data that is obtained by uniformly sampling an image that is distorted by an optical distortion.

FIG. 9A is a view illustrating an image data that is obtained by uniformly sampling an image that is distorted by an optical distortion. FIG. 9B is a view illustrating a corrected image data that has been obtained by correcting the image data of FIG. 9A by the RGB synchronization unit 502 shown in FIG. 5. Now attention is made on the red color data. As shown in FIG. 9A, data of a position 902 can be generated by interpolation from data of proximal positions 901 and 903. Data of a position 904 can be generated by interpolation from data of proximal positions 901 and 907. If the optical system is free of any distortion, the interpolation can be made by averaging two pixels. Notwithstanding, the captured image data of Bayer array shown in FIG. 9A is the image data that has been obtained by uniformly sampling the image that is distorted by the optical distortion. Thus, an actual view or the corrected image is as shown in FIG. 9B, wherein the coordinate positions of the obtained image are non-uniform. In FIGS. 9A and 9B, (1), - - - (13) represent a first set of coordinate positions on an object, the first set of coordinate positions being aligned in a horizontal direction at a constant pitch on the object, while (A), - - - (O) represent a second set of coordinate positions on the object, the second set of coordinate positions being aligned in a vertical direction at a constant pitch on the object. In FIGS. 9A and 9B, the same portion of the image is positioned at the same coordinate position. For example, the same portion of the image appears at the same coordinate position ((2), B) in FIGS. 9A and 9B.

Interpolating the captured image at a high quality needs to correct the captured image in accordance with a distance of the actual view or the corrected image. For example, when the pixel color data of the coordinate position 902 is interpolated from the pixel color data of the coordinate position 901 and the pixel color data of the coordinate position 903 shown in FIG. 9A, the red color data of the coordinate position 902 is given by:

$$\text{R-data of the position } 902 =$$
$$(\text{R-data of the position } 901 \times (XB/(XA+XB)) +$$
$$(\text{R-data of the position } 903 \times (XA/(XA+XB)))$$

where "XA" is a distance between the pixel data of the corrected coordinate position 901 and the pixel data of the corrected coordinate position 902 in the corrected image shown in FIG. 9B, and "XB" is another distance between the pixel data of the corrected coordinate position 903 and the pixel data of the corrected coordinate position 902 in the corrected image shown in FIG. 9B.

Also when the pixel color data of the coordinate position 904 is interpolated from the pixel color data of the coordinate position 901 and the pixel color data of the coordinate position 907 shown in FIG. 9A, the red color data of the coordinate position 904 is given by:

$$\text{R-data of the position } 904 =$$
$$(\text{R-data of the position } 901 \times (YB/(YA+YB)) +$$
$$(\text{R-data of the position } 907 \times (YA/(YA+YB)))$$

where "YA" is a distance between the pixel data of the corrected coordinate position 901 and the pixel data of the corrected coordinate position 904 in the corrected image shown in FIG. 9B, and "YB" is another distance between the pixel data of the corrected coordinate position 907 and the pixel data of the corrected coordinate position 904 in the corrected image shown in FIG. 9B.

R-data, B-data and G-data of the other coordinate position can also be generated by the above-described interpolation.

The above-described interpolation is made from the proximal two coordinate positions. G-data can also be generated by another interpolation from proximal four coordinate positions so as to improve the quality of image. The interpolation from proximal four coordinate positions can be made with weighting the data of the proximal four coordinate positions. The weighting is made inversely proportional to a distance of a corrected target coordinate position and a corrected proximal coordinate position.

When the pixel color data of the coordinate position 905 is interpolated from the pixel color data of the coordinate-position 902, the pixel color data of the coordinate position 904, the pixel color data of the coordinate position 906, and the pixel color data of the coordinate position 908 shown in FIG. 9A, the green color data of the coordinate position 905 is given by:

$$\text{G-data of the position } 905 =$$
$$(\text{G-data of the position } 904 \times (XB/(XA+XB)) +$$
$$(\text{G-data of the position } 906 \times (XA/(XA+XB))/2) +$$
$$(\text{G-data of the position } 902 \times (YB/(YA+YB)) +$$
$$(\text{G-data of the position } 908 \times (YA/(YA+YB))/2)$$

where "YA" is a distance between the pixel data of the corrected coordinate position 902 and the pixel data of the corrected coordinate position 905 in the corrected image shown in FIG. 9B, and "YB" is another distance between the pixel data of the corrected coordinate position 908 and the pixel data of the corrected coordinate position 905 in the corrected image shown in FIG. 9B, "XA" is still another distance between the pixel data of the corrected coordinate position 904 and the pixel data of the corrected coordinate position 905 in the corrected image shown in FIG. 9B, and "XB" is yet another distance between the pixel data of the corrected coordinate position 906 and the pixel data of the corrected coordinate position 905 in the corrected image shown in FIG. 9B.

The color data of the coordinate position can also be interpolated from diagonal proximal coordinate positions that are diagonal to the coordinate position. For example, the red color data of the coordinate position 905 can be interpolated from the pixel data of the diagonal proximal coordinate position 901, the pixel data of the diagonal proximal coordinate position 903, the pixel data of the diagonal proximal coordinate position 907, and the pixel data of the diagonal proximal coordinate position 909.

The first filter unit 503 shown in FIG. 5 is configured to receive the RGB-synchronized image data from the RBG synchronization unit 502. The first filter unit 503 is also configured to apply spatial filtering processes to each color signal of the RGB color signals independently. This first filtering process is to prevent the distortion correction from causing that a high frequency component of the image be folded to deteriorate the quality of image when compressing the center portion of the image. The first filter unit 503 acts as a low pass filter. Characteristics of the low pass filter can be adapted in accordance with the angle of view or zooming position.

Figure 10:
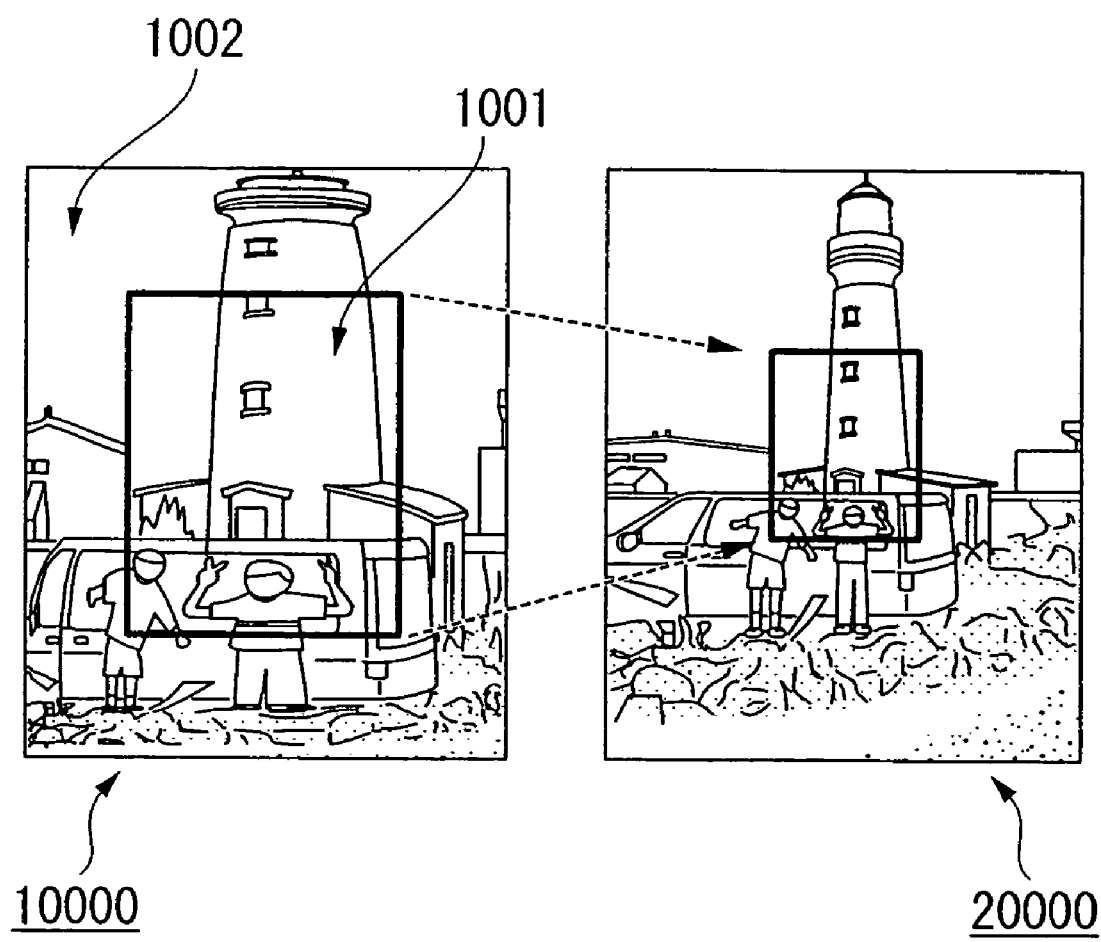
FIG. 10 is a view illustrating an image that has been outputted from the image sensor shown in FIG. 1 and another image that has been obtained by correcting the distortion of the image.

FIG. 10 is a view illustrating an image 10000 that has been outputted from the image sensor 102 shown in FIG. 1 and another image 20000 that has been obtained by correcting the distortion of the image 10000. When the image 10000 outputted from the image sensor 102 is subjected to a distortion-correction process to obtain the image 20000, a reduction process is applied to a portion of the image 10000. Namely, the image 10000 includes a center region 1101 and a peripheral region 1002. The reduction process is applied to the center region 1001 only. A magnification process is applied to the peripheral region 1002.

Figure 11:
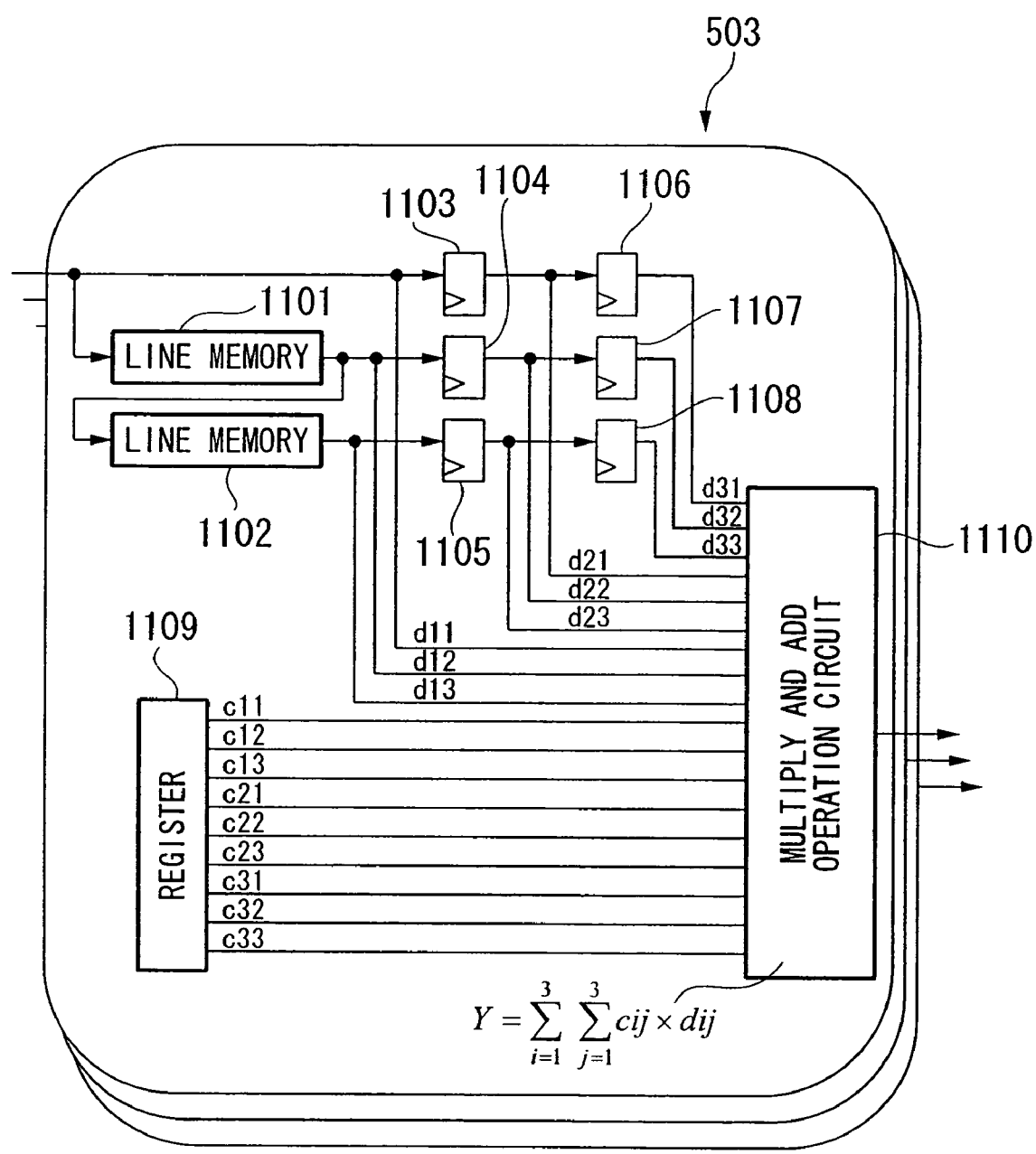
FIG. 11 is a view illustrating an example of a configuration of the first filter unit shown in FIG. 5.

FIG. 11 is a view illustrating an example of a configuration of the first filter unit 503 shown in FIG. 5. As shown in FIG. 11, the first filter unit 503 may be configured as a 3×3 spatial filter. Setting coefficients C11, - - -, C33 permits the 3×3 spatial filter to act as a low pass filter. The coefficients C11, - - -, C33 are stored in a register. The coefficients C11, - - -, C33 need to be changed in accordance with the coordinate positions of the pixels. For example, in accordance with the peripheral region 1002, only the coefficient C22 is set to be "1", the remaining coefficients C11, - - -, C21 are set to be "0" to prevent the filter from being activated. The coefficients of the center region 1001 may depend on the coordinate positions. The coefficients vary in accordance with the reduction rate in order to improve the quality of image. The reduction rate is determined based on the degree of distortion and the angle of view.

The first filter unit 503 shown in FIG. 11 is configured to allow setting all coefficients independently taking into account the effect of distortion. If a deterioration of the quality of image is accepted and the distortion is symmetrical in vertical and horizontal directions, then it is possible as a modification for the first filter unit 503 to have a reduced circuit scale with a reduced number of multipliers. An addition of the pixel data of symmetrical positions in vertical and horizontal directions is operated prior to the multiplication of the common coefficients.

It is also possible that the center region 1001 and the peripheral region 1002 have constant coefficients, respectively, even the quality of image can be deteriorated. A boundary between the center region 1001 and the peripheral region 1002 needs to be gradated. If the distortion is large and the reduction rate of the center region 1001 is large, then a larger circuit scale is necessary for the first filter unit 503. A 4×4 or 5×5 spatial filter is necessary for the first filter unit 503. The configuration of the first filter unit 503 should not be limited to the matrix filter illustrated in this embodiment.

The aberration correction unit 504 is configured to receive the filtered image signals from the first filter unit 503 independently for each of the RGB colors. The filtered image has the center region that has been low-pass-filtered, the center region being compressed by the distortion correction.

Figure 12:
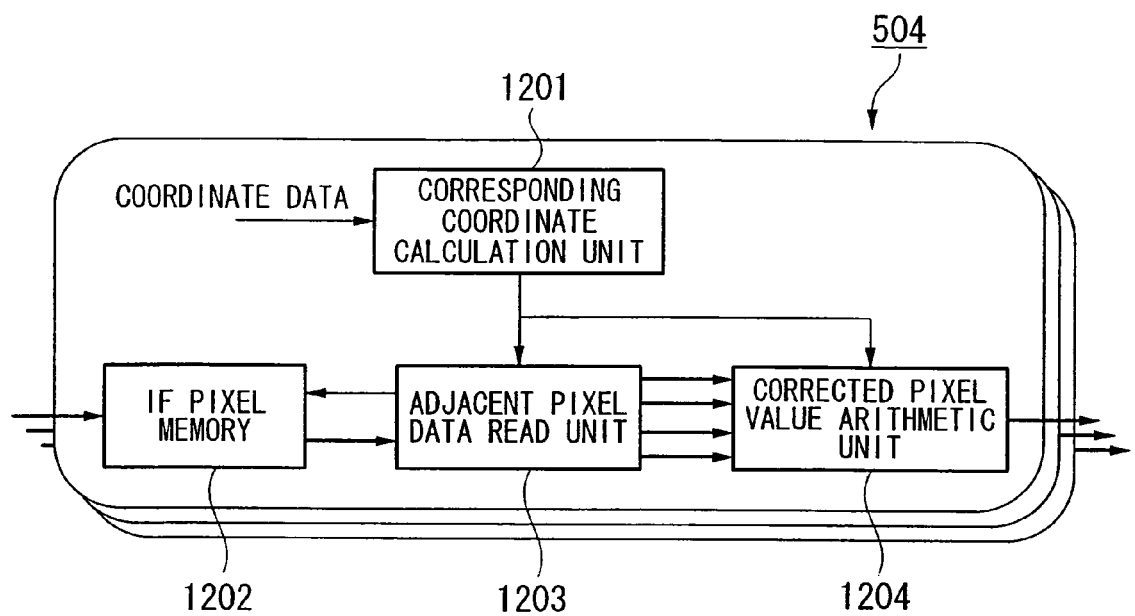
FIG. 12 is a view illustrating an example of a configuration of the aberration correction unit shown in FIG. 5.

FIG. 12 is a view illustrating an example of a configuration of the aberration correction unit 504 shown in FIG. 5. The aberration correction unit 504 may include, but is not limited to, a corresponding coordinate calculation unit 1201, an IF pixel memory 1202, an adjacent pixel data read unit 1203, and a corrected pixel value arithmetic unit 1204. The corresponding coordinate calculation unit 1201 is configured to calculate a coordinate position having a distortion on the image, the calculated coordinate position corresponding to coordinates of the distortion-corrected image data. Namely, the corresponding coordinate calculation unit 1201 is configured to calculate original coordinate values on the original image that has not yet been subjected to optical distortion correction or magnification chromatic aberration correction.

The IF pixel memory 1202 is configured to receive the filtered image data from the first filter unit 503, and to store the filtered image data. The adjacent pixel data read unit 1203 is configured to receive the calculated coordinate position from the corresponding coordinate calculation unit 1201. The adjacent pixel data read unit 1203 is configured to calculate coordinates of adjacent pixel data that have been stored in the IF pixel memory 1202. The calculated coordinates need to obtain pixel data of the target coordinates calculated by the corresponding coordinate calculation unit 1201. The adjacent pixel data read unit 1203 is configured to read, from the IF pixel memory 1202, data of the calculated coordinates. The read data represent the adjacent pixel data. The corrected pixel value arithmetic unit 1204 is configured to receive the calculated coordinate position from the corresponding coordinate calculation unit 1201. The corrected pixel value arithmetic unit 1204 is also configured to receive the adjacent pixel data from the adjacent pixel data read unit 1203. The corrected pixel value arithmetic unit 1204 is further configured to calculate pixel data of the target coordinates, the calculation being made from the adjacent pixel data.

Figures 13A, 13B, 13C:
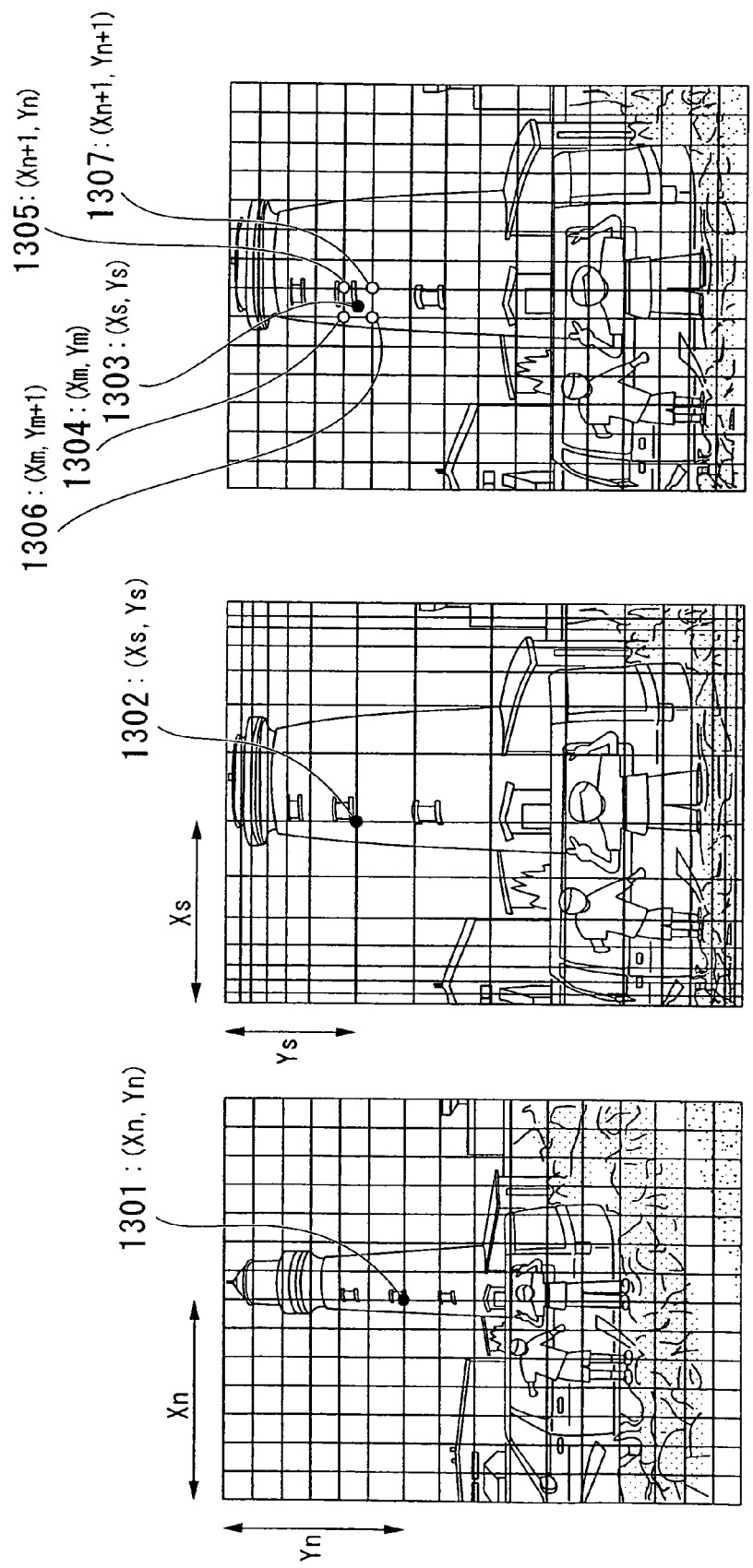
FIG. 13A is a view illustrating a distortion-corrected image.
FIG. 13B is a view illustrating an image on coordinates that are calculated by the corresponding coordinate calculation unit shown in FIG. 12.
FIG. 13C is a view illustrating an image that has been captured by the image sensor 102 shown in FIG. 1.

Distortion correction performed by the aberration correction unit 504 shown in FIG. 12 will be described with reference to FIGS. 13A, 13B, and 13C. FIG. 13A is a view illustrating a distortion-corrected image. The aberration correction unit 504 is directed to obtain pixel data of a crossing point of a grid shown in FIG. 13A. The following descriptions will be made assuming that pixel data of a pixel 1301 positioned at coordinate values (Xn, Yn) is obtained.

The coordinate values (Xn, Yn) are entered into the corresponding coordinate calculation unit 1201. The corresponding coordinate calculation unit 1201 calculates original coordinate values (Xs, Ys) on the original image that has not yet been subjected to optical distortion correction or magnification chromatic aberration correction. When the distortion may be isolated into two one-dimensional distortions in vertical and horizontal axes, respectively, coordinate values on the vertical and horizontal axes can be calculated independently. This calculation depends on lens design. In case of the one-dimensional distortion, the corresponding coordinate calculation unit 1201 can be realized by a simple arithmetic circuit. In another case, the corresponding coordinate calculation unit 1201 can also be realized by using a table memory that stores input coordinates for addresses and output coordinates for data corresponding to the addresses. The original coordinate values (Xs, Ys) can be found in accordance with a broken-line approximation method in combination with making an interpolation method, wherein the number of table memories is limited.

FIG. 13B is a view illustrating an image on coordinates that are calculated by the corresponding coordinate calculation unit 1201 shown in FIG. 12, wherein the image of FIG. 13B corresponds to the image of FIG. 13A. A coordinate position 1302 (Xs, Ys) on the calculated coordinates of FIG. 13B corresponds to the coordinate position 1301 (Xn, Yn). The grid of the coordinates shown in FIG. 13B corresponds to the grid of the coordinates shown in FIG. 13A. In FIG. 13B, the image has such a distortion that the center portion of the image is decompressed while the peripheral portion thereof is compressed. Namely, the calculated coordinate position 1302 is physically displaced from the target coordinate position. The calculated coordinate position 1302 is positioned at the corresponding portion of the image.

FIG. 13C is a view illustrating an image that has been captured by the image sensor 102 shown in FIG. 1. As shown in FIG. 13C, the image has the distortion while the grid of the coordinates is not distorted. This means that the image data at the coordinate position 1303 in FIG. 13C is different from image data of the position of the target pixel. The adjacent pixel data read unit 1203 reads, from the IF pixel memory 1202, data of coordinate positions 1304 (Xm, Ym), 1305 (Xn+1, Yn), 1306 (Xm, Ym+1), and 1307 (Xn+1, Yn+1), wherein those coordinate positions 1304, 1305, 1306, and 1307 are adjacent to the coordinate position 1303. The corrected pixel value arithmetic unit 1204 calculates data of the coordinate position 1303 (Xs, Ys) at the target pixel from the data of the adjacent coordinate positions 1304, 1305, 1306, and 1307, wherein the calculation is made by interpolating the data of the coordinate position 1303 from the data of the adjacent coordinate positions 1304, 1305, 1306, and 1307.

In this embodiment, the data of the target coordinate position is interpolated from data of the adjacent four pixel positions. The interpolation calculation should not be limited to this method. It is possible as a modification to interpolate data of the target coordinate position from the most adjacent pixel position. A cubic interpolation is also available to interpolate data of the target coordinate position from data of sixteen adjacent pixel positions. Any other available interpolations may also be selected.

In accordance with this embodiment, the aberration correction is made to each color of the RGB color signals independently. When the optical system has the magnification chromatic aberration, it is possible as a modification that a degree of correction is adapted for each color. Namely, the aberration correction can be made in combination with the distortion correction. When the magnification chromatic aberration of the optical system is so small as a correction to the magnification chromatic aberration is not needed, the corrected pixel value arithmetic unit 1204 is commonly used to each color. This allows a possible reduction of the circuit scale.

In this embodiment, the optical distortion correction is made independently between in the vertical and horizontal directions. The optical system including a coaxial lens or lenses causes a coaxial distortion. In this case, coordinate values can be found by Y=multinomial. The address can be inputted as the coordinates, and table memories can be used that store corresponding data sets in combination with output coordinates. The original coordinate values can be found in accordance with a broken-line approximation method in combination with making an interpolation method, wherein the number of table memories is limited.

The magnification reduction unit 505 is configured to receive the distortion-corrected image data from the aberration correction unit 504. The magnification reduction unit 505 is also configured to calculate pixel values to be interpolated, the calculation being made in accordance with an interpolation such as a linear interpolation or a cubit interpolation.

Figure 14:
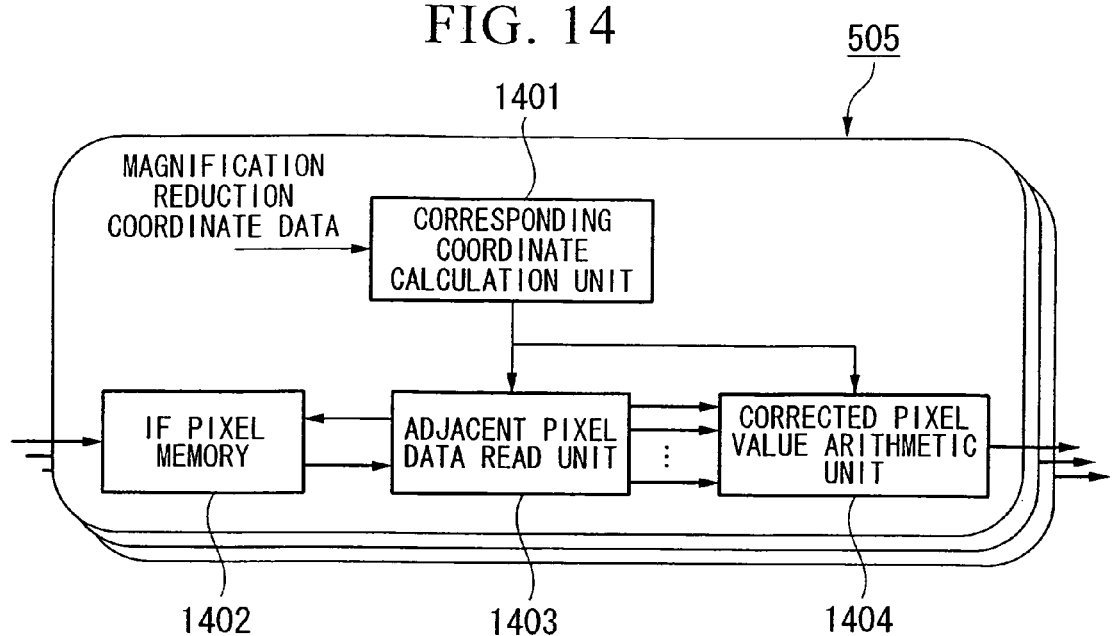
FIG. 14 is a view illustrating an example of a configuration of the magnification reduction unit shown in FIG. 5.

FIG. 14 is a view illustrating an example of a configuration of the magnification reduction unit 505 shown in FIG. 5. The magnification reduction unit 505 may include, but is not limited to, a corresponding coordinate calculation unit 1401, an IF pixel memory 1402, an adjacent pixel data read unit 1403, and a corrected pixel value arithmetic unit 1404. The corresponding coordinate calculation unit 1401 is configured to calculate corresponding coordinate values (Xs, Ys) from the input coordinate values (Xn, Yn). The coordinate values (Xs, Ys) belong to the original image that has not yet been subjected to the magnification and reduction processes. The IF pixel memory 1402 is configured to store the distortion-corrected image data. The adjacent pixel data read unit 1403 reads, from the IF pixel memory 1402, data of pixels adjacent to a target pixel in order to calculate a pixel value of the target coordinate position. The corrected pixel value arithmetic unit 1404 is configured to calculate the pixel value of the target coordinate position from the adjacent pixel data.

Figure 15:
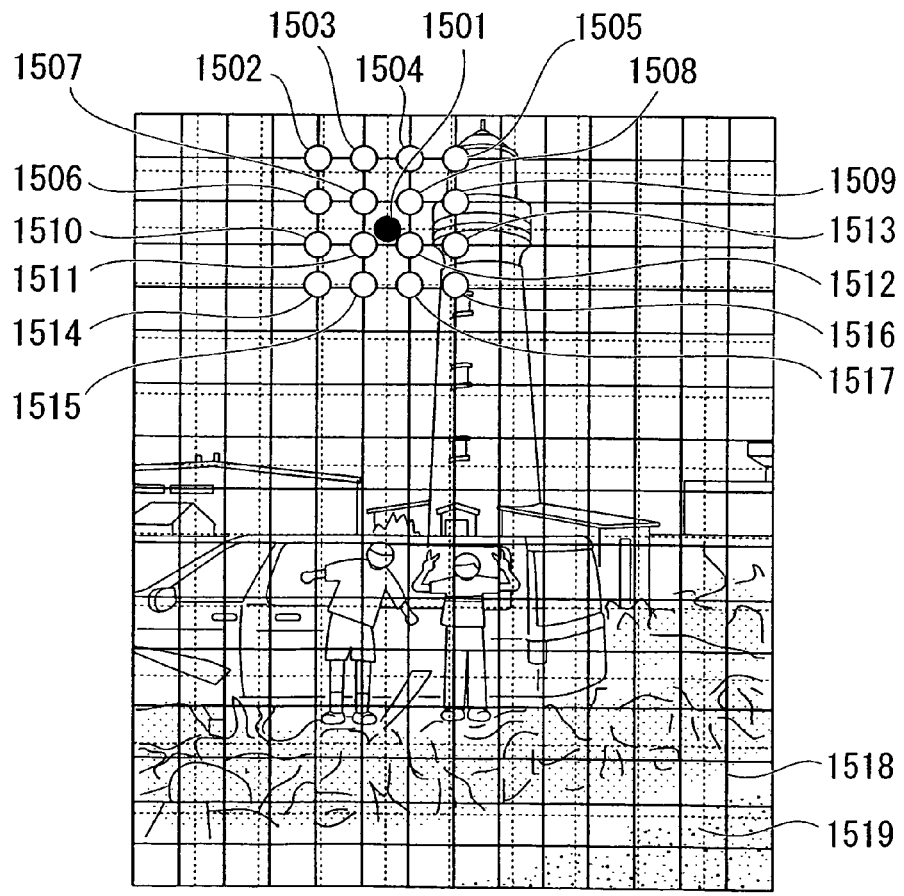
FIG. 15 is a view illustrating an image that has been subjected to the magnification and reduction processes performed by the magnification reduction unit shown in FIG. 14.

FIG. 15 is a view illustrating an image that has been subjected to the magnification and reduction processes. A real line grid 1518 represents positions of pixels, for which the input image data are stored in the IF pixel memory 1402. A broken line grid 1519 represents coordinate positions of pixels that are needed to perform the reduction process. A pixel value of a coordinate position 1501 on the broken line grid 1519 will be found. The coordinate position on the broken line grid 1519 is inputted into the corresponding coordinate calculation unit 1401. The coordinate position is transformed into a transformed coordinate position on the real line grid 1518. This transformed coordinate position is then inputted into the adjacent pixel data read unit 1403. The adjacent pixel data read unit 1403 calculates sixteen coordinate positions of sixteen pixels 1502-1517 that are adjacent to a target pixel 1501, wherein the sixteen coordinate positions of sixteen pixels 1502-1517 are positioned on the real line grid 1518. The adjacent pixel data read unit 1403 reads out sixteen sets of image data of the sixteen adjacent pixels 1502-1517 from the IF pixel memory 1402, the reading operation being made with reference to the calculated sixteen coordinate positions of the sixteen pixels 1502-1517. The adjacent pixel data read unit 1403 supplies the sixteen sets of image data to the corrected pixel value arithmetic unit 1404. The corrected pixel value arithmetic unit 1404 calculates a pixel value of the target pixel 1501, wherein the calculation may be made by a cubit interpolation. The interpolation can be made with reference to the most adjacent pixel. A linier interpolation may also be available with reference to four adjacent pixels. Other interpolations may also be available.

The image data has been resized at a desired size. The resized image data is inputted into the second filter unit 507 shown in FIG. 5. The second filter unit 507 performs a spatial filtering process. Typical examples of the spatial filtering process may include, but are not limited to, an edge-enhancement filtering process and a noise-reduction filtering process. The edge-enhancement filtering process recovers a deteriorated resolution or definition, wherein the deterioration has been caused by decompression of a peripheral portion of the image, the decompression being caused by the correction to the distortion. The noise-reduction filtering process reduces a noise level difference between the peripheral and center portions of the image, wherein the center portion of the image has a reduced noise, the reduction of noise being caused by the first filter unit 503 or by the compression by the distortion correction.

It is preferable to selectively apply the last-mentioned process to only the peripheral region 1002 shown in FIG. 10, wherein, in the peripheral region, the image outputted from the image sensor is decompressed, and the peripheral region 1002 depends on the angle of view or zooming position. The center portion of the image has been compressed without deteriorating the resolution. The above process prevents the peripheral portion of the image from blurring, while decompressing the image. The center portion of the image is compressed with reducing the noise of the center portion thereof. The above process prevents the peripheral portion of the image from having a remarkable noise. The center portion of the image does not need to be subjected to the same process as the edge-enhancement process or the noise reduction process that is applied to the peripheral portion of the image.

The second filter unit 507 can be realized by the same configuration of the first filter unit 503 as the low pass filter. Setting coefficients (C11-C33) permits the second filter unit 507 to perform as the edge-enhancement filter. The coefficients (C11-C33) are stored in the register. The coefficients (C11-C33) need to be changed depending upon coordinate positions of the image. In the center region 1001 of the image shown in FIG. 10, only the coefficient C2 is set "1" and the other coefficients are set "0" so as to inhibit the second filter unit 507 from performing as filter.

In accordance with the configuration shown in FIG. 11, each of the coefficients can be set independently in consideration of the influence of the distortion. It is possible that the add operation is made for pixel data sets of pixels that are positioned symmetrical in vertical and horizontal directions before a multiplication of a common coefficient is made, so as to reduce the number of multipliers and reduce the circuit scale, whereas the quality of image is deteriorated and the influence of the distortion is not removed. A large distortion and a large magnification ratio of the peripheral portion of the image need a large circuit scale of the filter unit. A large circuit scale of the filter unit such as the 4×4 scale or the 5×5 scale can improve the quality of image. The coefficients of the center portion 1001 and the peripheral portion 1002 may also be constant while allowing deterioration of the quality of image. A boundary between the center region 1001 of the image and the peripheral region 1002 thereof needs to be blurred. The second filter unit 507 should not be limited to the matrix filter illustrated in this embodiment.

The set of filtered data of the image including the quality-recovered peripheral portion is then inputted into the display conversion unit 510 shown in FIG. 5. The set of filtered data is converted into a data format that needs for an image display device such as a TFT liquid crystal panel. Examples of the conversion may include, but are not limited to, resizing the image or an interlace conversion for adaptation to the NTSC format. The converted set of data is then supplied to the image display unit 104 shown in FIG. 1. The set of filtered data is also supplied to the YC conversion unit 508 so that the set of filtered data is subjected to a conversion from the RGB color space into a YCbCr color space. The set of converted data is then supplied to the image compression unit 509 so that the set of converted data is then compressed. The set of compressed data is then supplied to the image display device 105 shown in FIG. 1.

In accordance with this embodiment shown in FIG. 5, the distortion correction process is independent from the magnification and reduction process. Both the distortion correction process and the magnification and reduction process are to generate new image data of a new coordinate position from the image data of the adjacent pixel data. Both a function of distortion correction and another function of magnification and reduction can be combined together.

Figure 16:
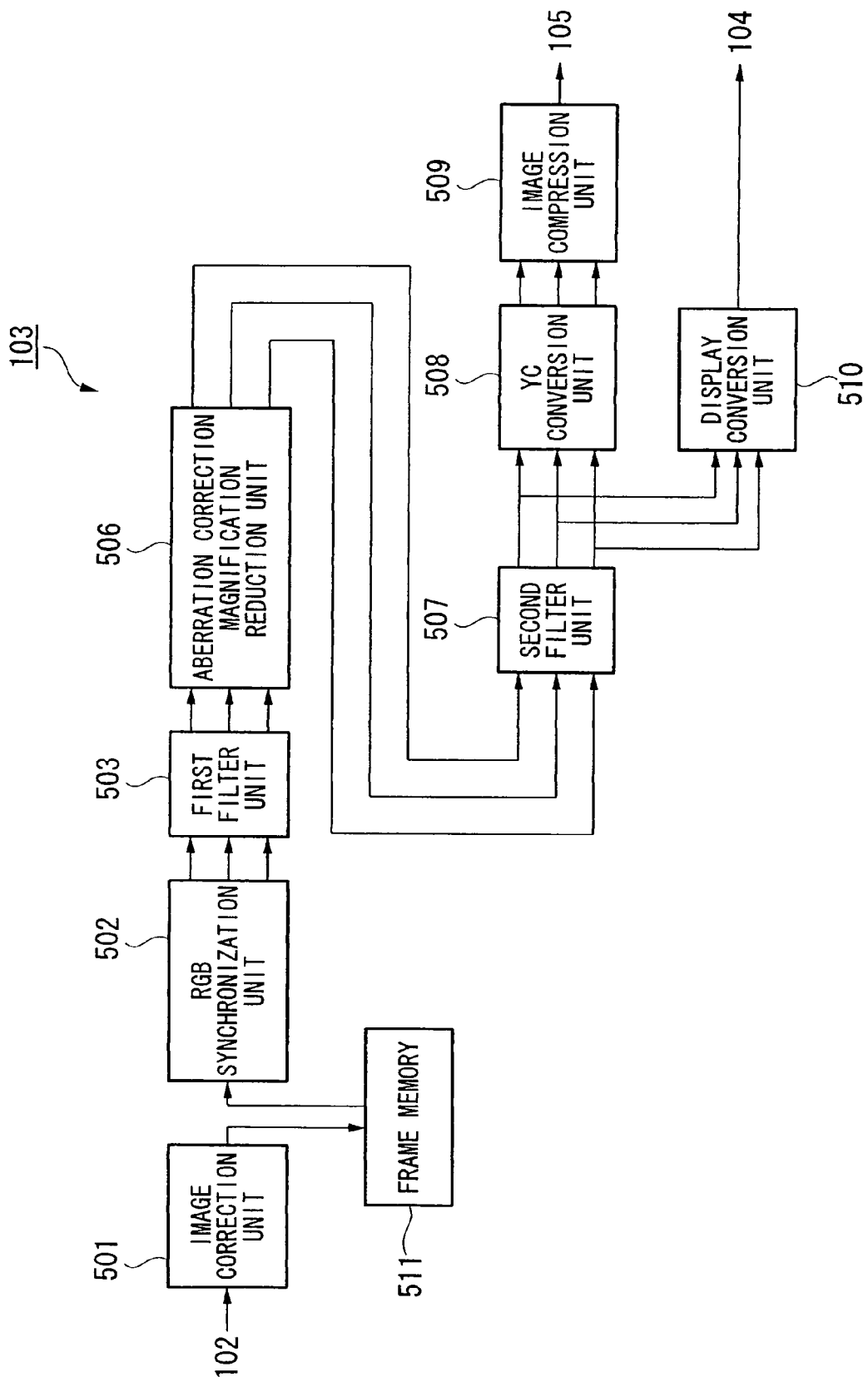
FIG. 16 is a block diagram illustrating another example of the configuration of the distortion correction image processor shown in FIG. 1.

FIG. 16 is a block diagram illustrating another example of the configuration of the distortion correction image processor 103 shown in FIG. 1. The distortion correction image processor 103 may typically include, but are not limited to, an image correction unit 501, an RGB synchronization unit 502, a first filter unit 503, an aberration correction magnification reduction unit 506, a second filter unit 507, a YC conversion unit 508, an image compression unit 509, a display conversion unit 510, and a frame memory 511. The image correction unit 501, the RGB synchronization unit 502, the first filter unit 503, the second filter unit 507, the YC conversion unit 508, the image compression unit 509, the display conversion unit 510, and the frame memory 511 shown in FIG. 16 are the same as those shown in FIG. 5. The aberration correction magnification reduction unit 506 shown in FIG. 16 corresponds to a combination of the aberration correction unit 504 and the magnification reduction unit 505 shown in FIG. 5. Use of the aberration correction magnification reduction unit 506 reduces the circuit scale of the distortion correction image processor 103.

Figure 17:
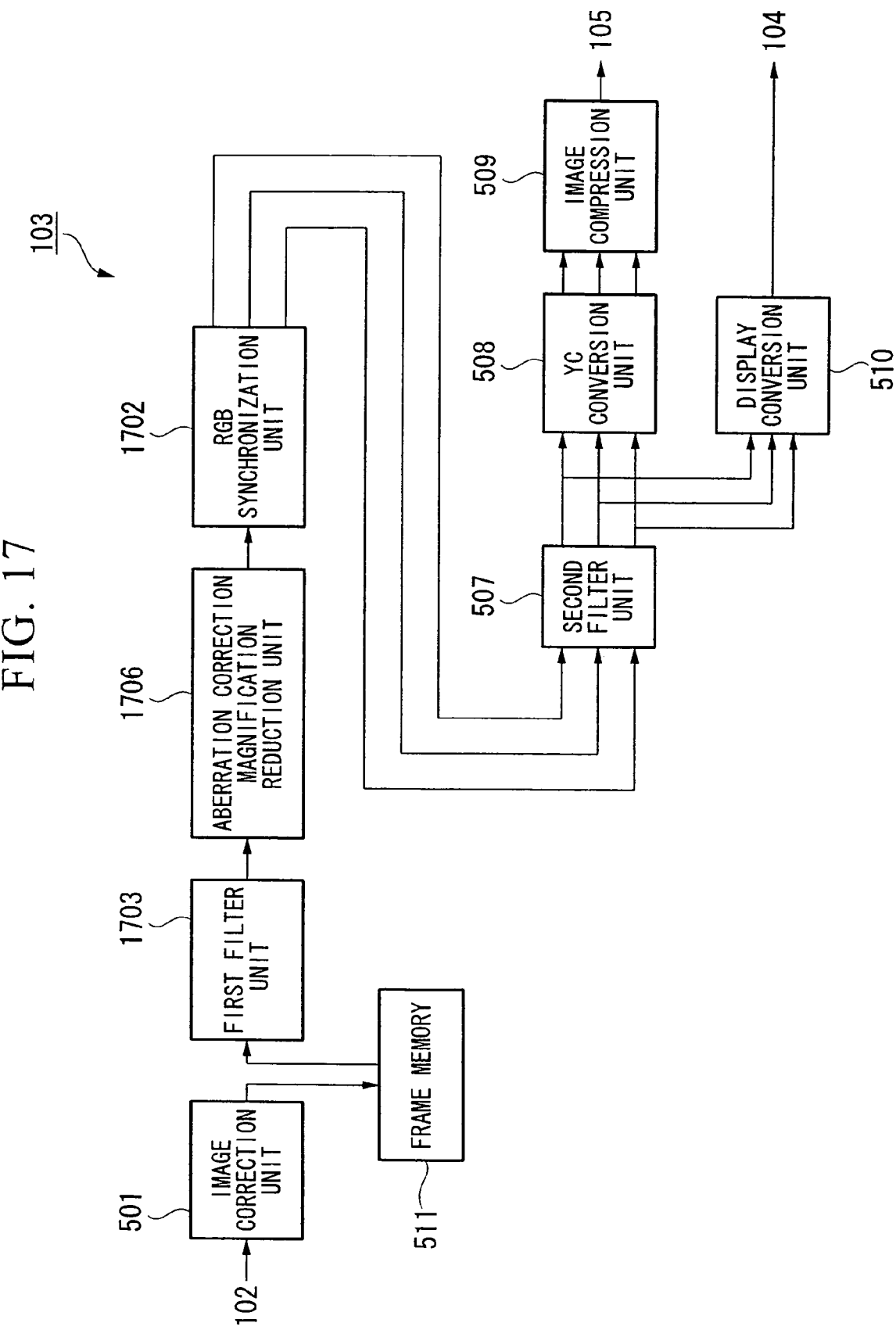
FIG. 17 is a block diagram illustrating still another example of the configuration of the distortion correction image processor shown in FIG. 1.

FIG. 17 is a block diagram illustrating still another example of the configuration of the distortion correction image processor 103 shown in FIG. 1. The distortion correction image processor 103 may typically include, but are not limited to, an image correction unit 501, a first filter unit 1703, an aberration correction magnification reduction unit 1706, an RGB synchronization unit 1702, a second filter unit 507, a YC conversion unit 508, an image compression unit 509, a display conversion unit 510, and a frame memory 511. The image correction unit 501, the second filter unit 507, the YC conversion unit 508, the image compression unit 509, the display conversion unit 510, and the frame memory 511 shown in FIG. 17 are the same in function and operation as those shown in FIG. 16.

In accordance with this configuration, the first filter unit 1703 reads out the image data in the Bayer array from the frame memory 511. The first filter unit 1703 applies the low pass filtering process to the center portion of the image. The aberration correction magnification reduction unit 1706 receives the filtered image data from the first filter unit 1703. The aberration correction magnification reduction unit 1706 performs both the distortion correction process and the magnification and reduction process to the filtered image data. The RGB synchronization unit 1702 receives, from the aberration correction magnification reduction unit 1706, the image data that have been subjected to the distortion correction process and the magnification and reduction process. The RGB synchronization unit 1702 performs the RGB synchronization process to the image data. The second filter unit 507 receives, from the RGB synchronization unit 1702, the image data that have been subjected to the RGB synchronization process. The second filter unit 507 performs the same process as described above to the image data. The YC conversion unit 508, the image compression unit 509, and the display conversion unit 510 perform the same processes as described above.

Similarly to the above-described configurations shown in FIGS. 5 and 16, the configuration shown in FIG. 17 permits the distortion correction independently for each color of RGB. This correction can be made for only the same color of the adjacent pixels to the target pixel. This configuration is not so suitable to correct the magnification chromatic aberration of a high quality of image. Simplifying the circuit can make it difficult to correct the magnification chromatic aberration.

Figure 18:
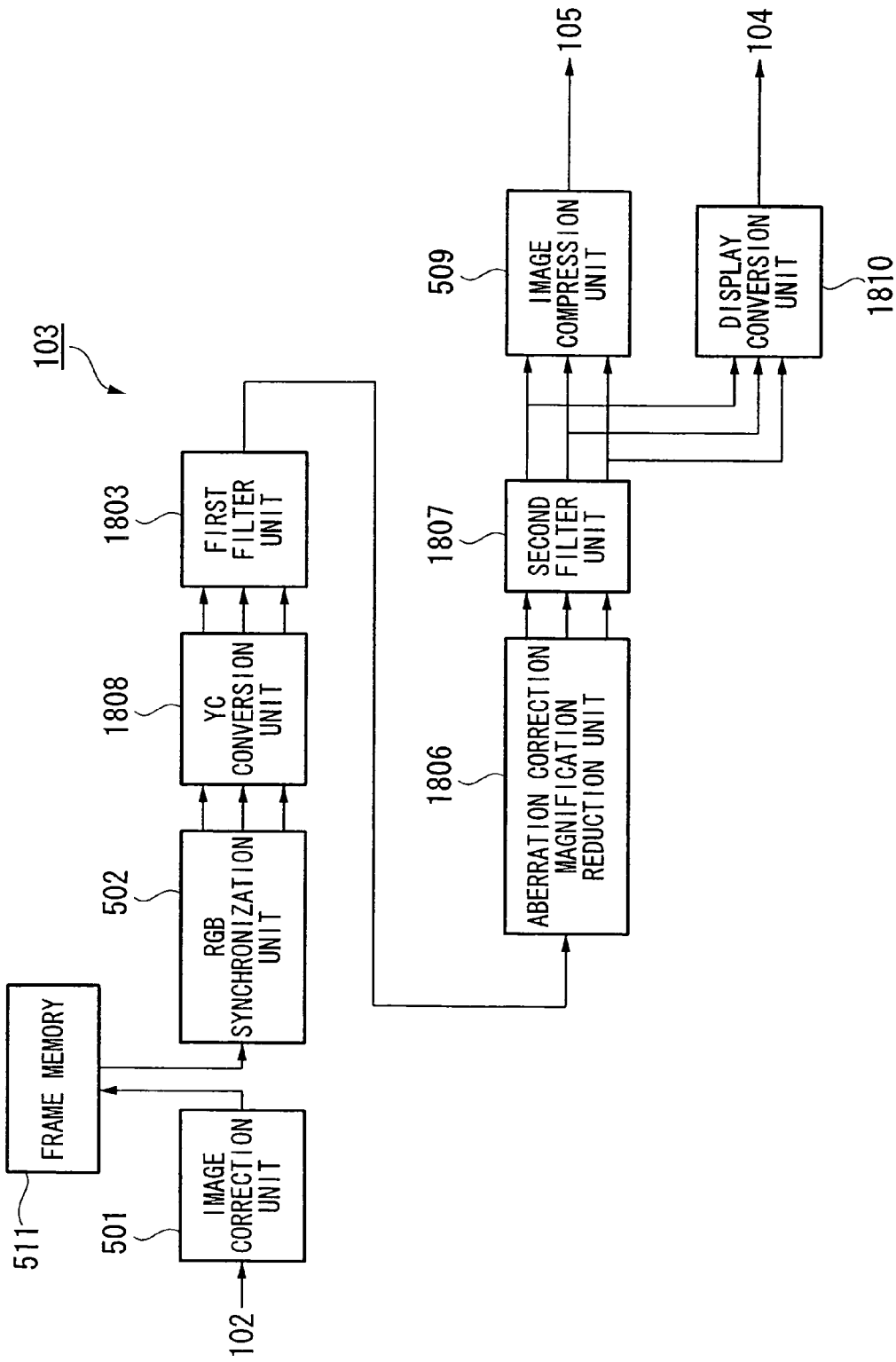
FIG. 18 is a block diagram illustrating yet another example of the configuration of the distortion correction image processor shown in FIG. 1.

FIG. 18 is a block diagram illustrating yet another example of the configuration of the distortion correction image processor 103 shown in FIG. 1. The distortion correction image processor 103 may typically include, but are not limited to, an image correction unit 501, an RGB synchronization unit 502, a YC conversion unit 1808, a first filter unit 1803, an aberration correction magnification reduction unit 1806, a second filter unit 1807, an image compression unit 509, a display conversion unit 1810, and a frame memory 511. The image correction unit 501, the RGB synchronization unit 502, the image compression unit 509, and the frame memory 511 shown in FIG. 18 are the same in view of function and operation as the functions and operations those shown in FIG. 5. The display conversion unit 1810 shown in FIG. 18 is the same in view of function and operation as the display conversion unit 510 shown in FIG. 5. The aberration correction magnification reduction unit 1806 shown in FIG. 18 corresponds to a combination of the aberration correction unit 504 and the magnification reduction unit 505 shown in FIG. 5.

In accordance with this configuration, the RGB synchronization unit 502 reads out the image data in the Bayer array from the frame memory 511. The RGB synchronization unit 502 performs the RGB synchronization process to the image data. The YC conversion unit 1808 receives the RGB synchronized image data from the RGB synchronization unit 502. The YC conversion unit 1808 converts the RGB synchronized image data into luminance and chrominance signals (YCbCr signals). The first filter unit 1803 receives the luminance and chrominance signals from the YC conversion unit 1808. The first filter unit 1803 applies a low pass filtering process to each of the luminance and chrominance signals for the center portion of the image. The aberration correction magnification reduction unit 1806 receives the filtered image data from the first filter unit 1803. The aberration correction magnification reduction unit 1806 applies both the aberration correction process and the magnification reduction process to the filtered image data. The second filter unit 1807 receives the image data from the aberration correction magnification reduction unit 1806. The second filter unit 1807 performs the edge-enhancement filtering process and the noise reduction filtering process of the image data.

As compared to the above-described configurations shown in FIGS. 5 and 16, the configuration shown in FIG. 18 is not so suitable to perform the correction to the magnification chromatic aberration because the aberration correction is made for each color of RGB independently. The configuration shown in FIG. 18 applies highly accurate processes to the luminance signal only, wherein the resolution largely depends on the luminance signal. The configuration shown in FIG. 18 can realize both the high quality image and the low cost.

Figure 19:
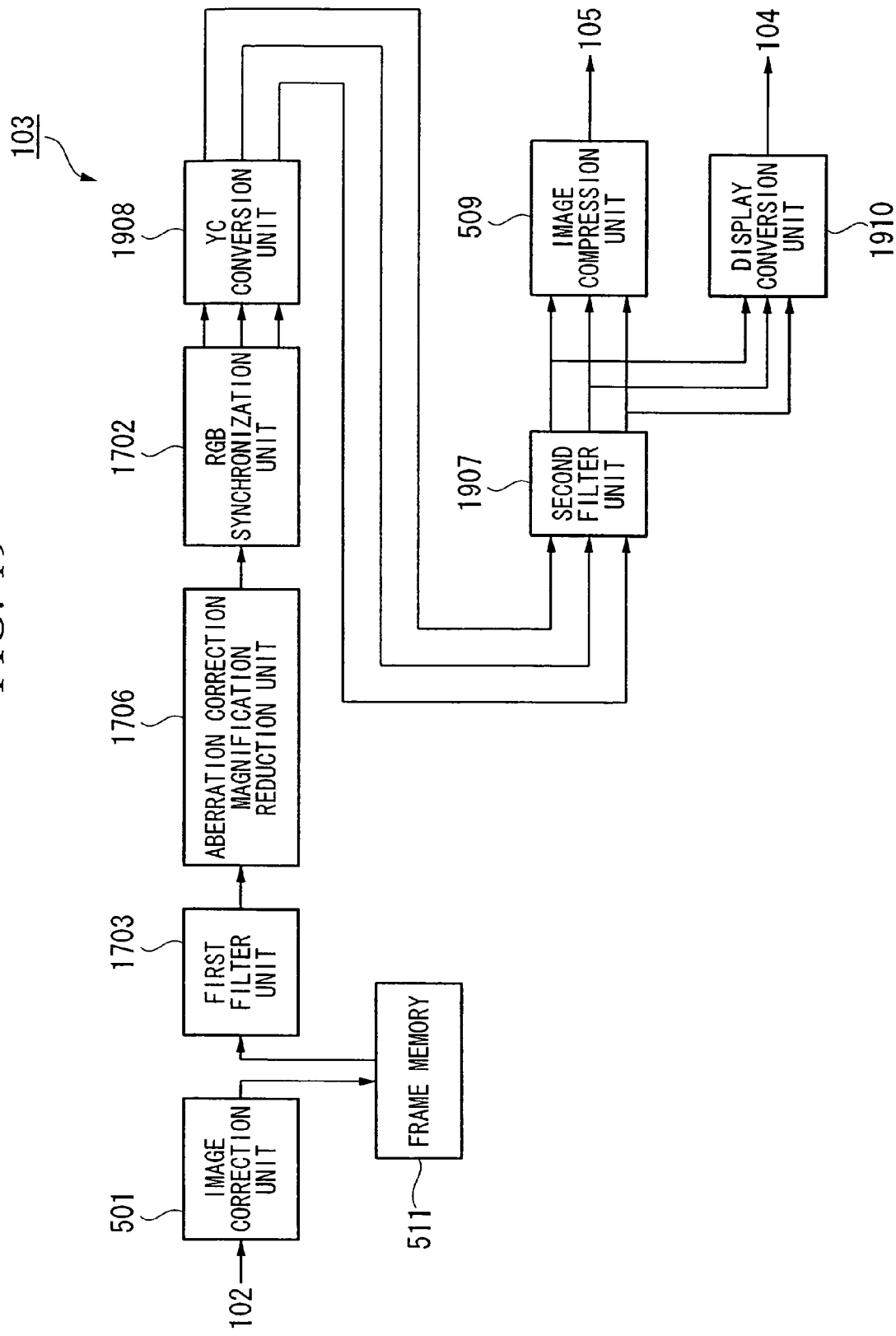
FIG. 19 is a block diagram illustrating a further example of the configuration of the distortion correction image processor shown in FIG. 1.

FIG. 19 is a block diagram illustrating a further example of the configuration of the distortion correction image processor 103 shown in FIG. 1. The distortion correction image processor 103 may typically include, but are not limited to, an image correction unit 501, a first filter unit 1703, an aberration correction magnification reduction unit 1706, an RGB synchronization unit 1702, a YC conversion unit 1908, a second filter unit 1907, an image compression unit 509, a display conversion unit 1910, and a frame memory 511. The image correction unit 501, the aberration correction magnification reduction unit 1706, the RGB synchronization unit 1702, the image compression unit 509, and the frame memory 511 shown in FIG. 19 are the same in view of function and operation as those shown in FIG. 17. The display conversion unit 1910 shown in FIG. 19 is the same in view of function and operation as the display conversion unit 510 shown in FIG. 17.

In accordance with this configuration, the first filter unit 1703 reads out the image data in the Bayer array from the frame memory 511. The first filter unit 1703 applies the low pass filtering process to the center portion of the image. The aberration correction magnification reduction unit 1706 receives the filtered image data from the first filter unit 1703. The aberration correction magnification reduction unit 1706 performs both the distortion correction process and the magnification and reduction process to the filtered image data. The RGB synchronization unit 1702 receives, from the aberration correction magnification reduction unit 1706, the image data that have been subjected to the distortion correction process and the magnification and reduction process. The RGB synchronization unit 1702 performs the RGB synchronization process to the image data. The YC conversion unit 1908 receives, from the RGB synchronization unit 1702, the image data that have been subjected to the RGB synchronization process. The YC conversion unit 1908 converts the image data into luminance and chrominance signals (YCbCr signals). The second filter unit 1907 receives the luminance and chrominance signals (YCbCr signals) from the YC conversion unit 1908. The second filter unit 1907 performs the edge-enhancement filtering process and the noise reduction filtering process of the image data.

As compared to the above-described configurations shown in FIGS. 5 and 16, the configuration shown in FIG. 19 is not so suitable to perform the correction to the magnification chromatic aberration because the aberration correction is made for each color of RGB independently. The configuration shown in FIG. 19 applies highly accurate processes to the luminance signal only, wherein the resolution largely depends on the luminance signal. The configuration shown in FIG. 19 can realize both the high quality image and the low cost.

In accordance with the present embodiments, the image pickup device can be realized by a digital camera. The following descriptions are directed to a user interface and a method of operating the user interface. The digital camera simultaneously can be configured to pickup both images, namely, a telescope image and a wide angle image from the original image data. The original image data has been captured by an optical system that has a distortion. The digital camera can also be configured to set three different types of image pickup modes, namely, a normal pickup mode, a wide angle and telescope simultaneous pickup mode, and a wide angle monitoring and telescope pickup mode. The wide angle and telescope simultaneous pickup mode is suitable for picking up simultaneously both the wide angle image and the telescope image that has a magnified center portion. The wide angle monitoring and telescope pickup mode is suitable for picking up a magnified image, while following to a rapidly moving object.

Figure 20:
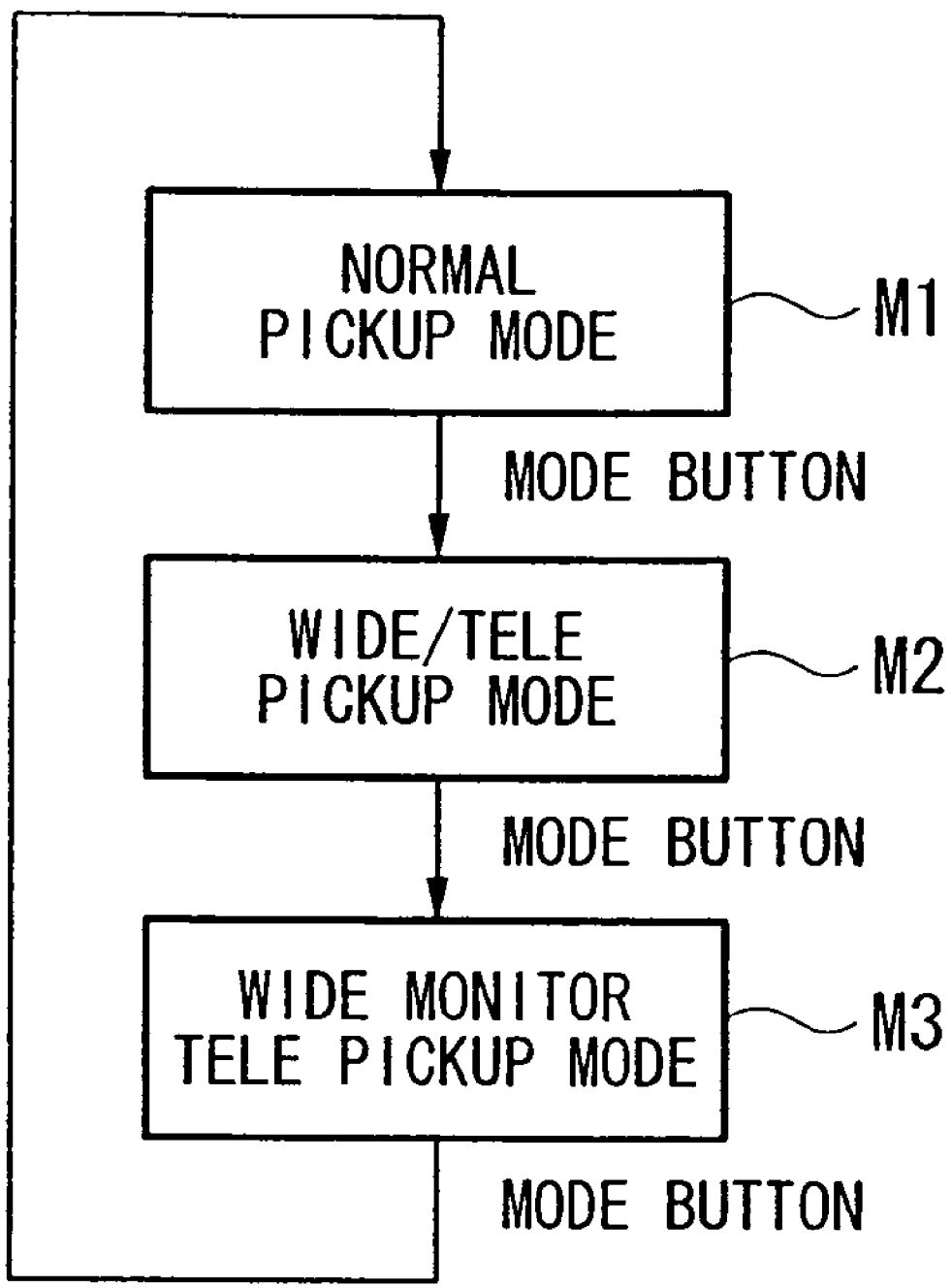
FIG. 20 is a view illustrating an example of a process flow of sequentially switching the three types of image pickup modes by using a switch.

FIG. 20 is a view illustrating an example of a process flow of sequentially switching the three types of image pickup modes by using a switch. The three types of image pickup modes can be switched in the sequence shown in FIG. 20. Switching the three types of image pickup modes using the switch needs to show the currently selected mode to a photographer.

Figure 21:
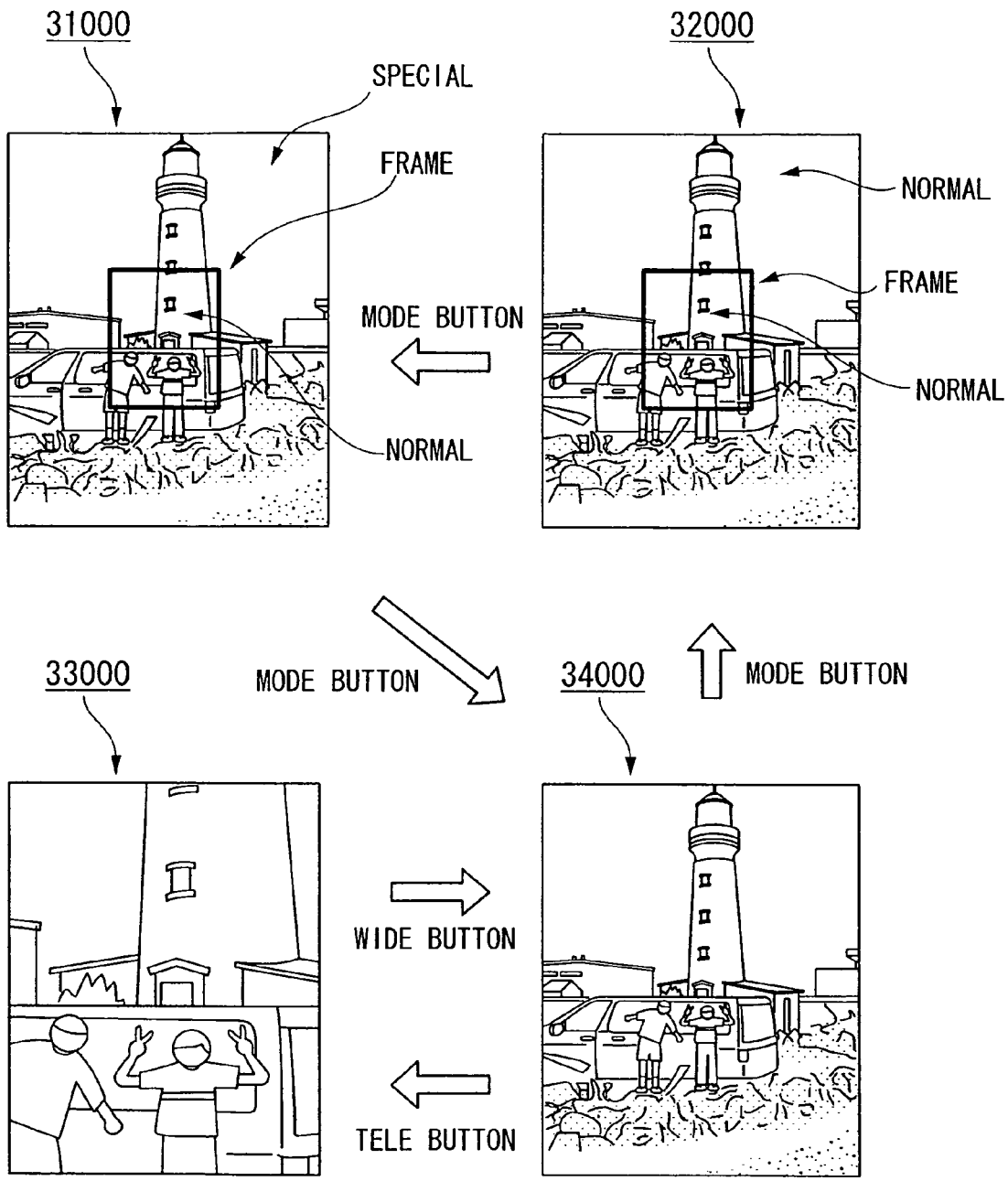
FIG. 21 is a view illustrating a process flow for switching among different images captured in different pickup modes.

FIG. 21 is a view illustrating a process flow for switching among an image 31000 captured in the wide monitoring and telescope pickup mode, another image 32000 captured in the wide angle and telescope simultaneous pickup mode, still another image 33000 captured in the telescope pickup mode, and yet another image 34000 captured in the wide angle pickup mode. The images 33000 and 34000 are captured in the telescope pickup mode and the wide angle pickup mode. The images 33000 and 34000 are displayed in the normal color display mode. The image 31000 is captured in the wide monitoring and telescope pickup mode. The image 31000 is displayed in the special display mode. The displayed image 31000 includes an actually captured image portion and a non-recorded image portion. The actually captured image portion is encompassed by a frame. The non-recorded image portion is positioned outside the frame. In one case, the actually captured image portion may be displayed in the normal color display mode, while the non-recorded image portion may be displayed in a monochrome display mode. In another case, the display is made to differentiate the luminance between the actually captured image portion and the non-recorded image portion. In still another case, the display is made to selectively enhance the color tone or to selectively lighten the color.

The image 32000 is captured in the wide angle and telescope simultaneous pickup mode. The image 32000 is displayed in the normal wide angle display mode, while a frame is further displayed to notify, to the photographer, that the current mode is the wide angle and telescope simultaneous pickup mode, wherein the image portion inside the frame is simultaneously captured in the telescope pickup mode. The photographer can recognize, from viewing a monitor such as a TFT liquid crystal display, that the current mode is the wide angle and telescope simultaneous pickup mode.

Figure 22A:
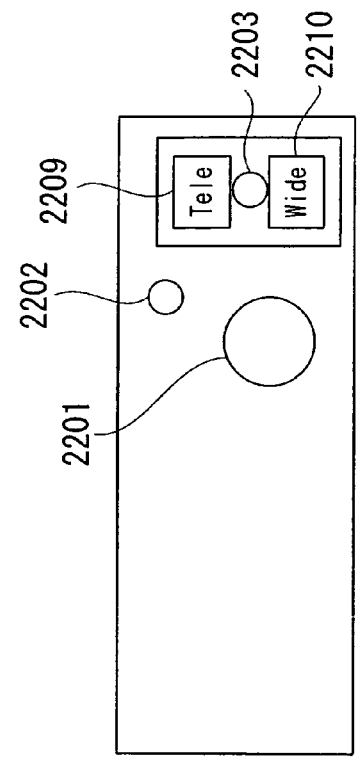
FIG. 22A is a view illustrating an example of a configuration of the operating unit shown in FIG. 1, the operating unit being used to switch among the image pickup modes shown in FIG. 21.
Figure 22B:
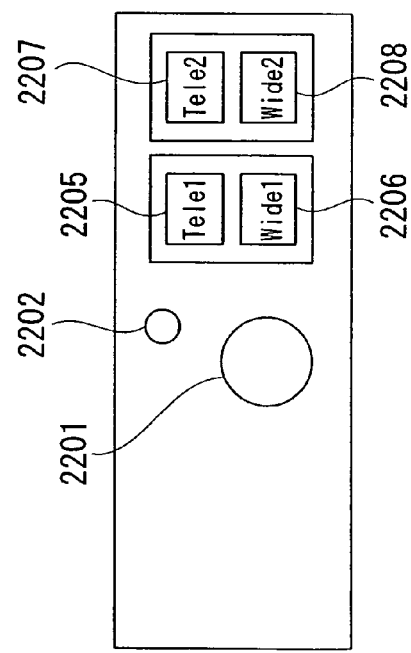
FIG. 22B is a view illustrating another example of the configuration of the operating unit shown in FIG. 1, the operating unit being used to switch among the image pickup modes shown in FIG. 21.
Figure 22C:
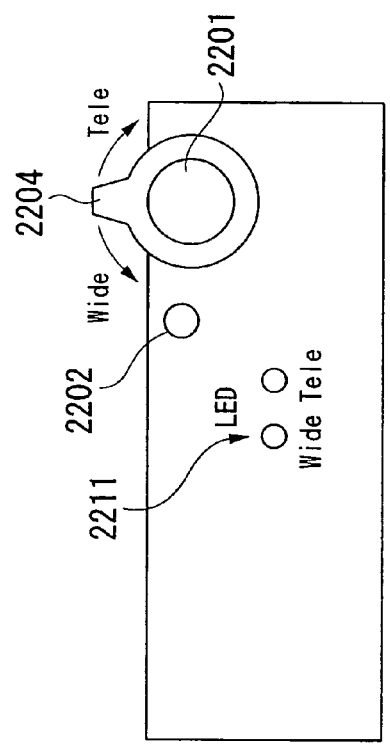
FIG. 22C is a view illustrating still another example of the configuration of the operating unit shown in FIG. 1, the operating unit being used to switch among the image pickup modes shown in FIG. 21.
Figure 22D:
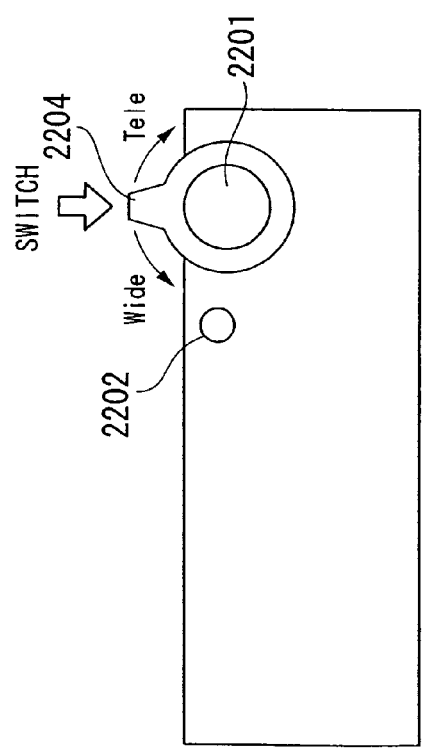
FIG. 22D is a view illustrating yet another example of the configuration of the operating unit shown in FIG. 1, the operating unit being used to switch among the image pickup modes shown in FIG. 21.

FIG. 22A is a view illustrating an example of a configuration of the operating unit 107 shown in FIG. 1, the operating unit 107 being used to switch among the image pickup modes shown in FIG. 21. FIG. 22B is a view illustrating another example of the configuration of the operating unit 107 shown in FIG. 1, the operating unit 107 being used to switch among the image pickup modes shown in FIG. 21. FIG. 22C is a view illustrating still another example of the configuration of the operating unit 107 shown in FIG. 1, the operating unit 107 being used to switch among the image pickup modes shown in FIG. 21. FIG. 22D is a view illustrating yet another example of the configuration of the operating unit 107 shown in FIG. 1, the operating unit 107 being used to switch among the image pickup modes shown in FIG. 21. Operations of the digital camera will be described with reference to FIG. 22A. A photographer operates a mode button 2202 to select a desired mode from the three different types of image pickup mode. When either one is selected of the wide angle and telescope simultaneous pickup mode and the wide monitoring and telescope pickup mode, it is necessary to permit the photographer to set zooming ratio for each of the telescope image pickup and the wide angle image pickup independently. In accordance with the example shown in FIG. 22A, the operating unit 107 has a first pair of a telescope button Tele1 2205 and a wide angle button Wide1 2206 for the wide angle image pickup and a second pair of a telescope button Tele2 2207 and a wide angle button Wide2 2208 for the telescope image pickup. Both angles of view can be set for the situation of an object. After the angle of view has been determined, a shutter button 2201 is pushed to capture an image.

It is not essential that two pairs of the zooming buttons, namely, wide angle and telescope buttons are provided for the wide angle image pickup and the telescope image pickup. It is possible as shown in FIG. 22B that a single pair of zooming buttons, namely, wide angle and telescope buttons 2209 and 2210 is provided in combination with a telescope/wide switching button 2203. In this case, it is preferable to provide the telescope/wide switching button 2203 adjacent to the single-paired wide angle and telescope buttons 2209 and 2210. The currently selected image pickup mode is represented by a character or characters or a symbol or symbols on a monitor, or a different color of the frame to permit the photographer to recognize the same. As shown in FIG. 22C, it is also possible that a switching lever 2204 is provided which acts as both the zooming buttons and the mode switch. As shown in FIG. 22D, it is also possible that display lumps 2211 are provided in addition to the switching lever 2204 shown in FIG. 22C. The display lumps 2211 can, for example, be realized by light emitting diodes. The digital camera is configured to switch the image pickup mode during the image pickup operation.

FIGS. 22A through 22D show simultaneously picking up two frames, namely, a wide angle frame and a telescope frame. The digital camera is configured to simultaneously pick up three or more frames of different angles of view from the original image that has been captured by the optical system having the distortion. In this case, the configuration of FIG. 22A needs to have an additional pair of telescope and wide buttons, while the other configurations shown in FIGS. 22B, 22C and 22D do not need to be modified.

With reference again to FIGS. 20 and 21, descriptions will be made which are directed to relationships between operating buttons and displays in the wide angle and telescope simultaneous pickup mode and the wide monitoring and telescope pickup mode.

As shown in FIG. 20, when the image 34000 captured in the wide angle pickup mode M1 is displayed, pushing the mode button switches the wide angle pickup mode M1 into the wide angle and telescope simultaneous pickup mode M2. When the image 32000 captured in the wide angle and telescope simultaneous pickup mode M2 is displayed, pushing the mode button switches the wide angle and telescope simultaneous pickup mode M2 into the wide monitoring and telescope pickup mode M3. When the image 31000 captured in the wide monitoring and telescope pickup mode M3 is displayed, pushing the mode button switches the wide monitoring and telescope pickup mode M3 into the wide angle pickup mode M1. When the image 34000 captured in the wide angle pickup mode M1 is displayed, pushing the telescope button switches the wide angle pickup mode into the telescope pickup mode to display the image 33000. When the image 33000 captured in the telescope pickup mode is displayed, pushing the wide angle button switches the telescope pickup mode into the wide angle pickup mode to display the image 34000 again.

FIG. 23 is a view illustrating first to sixth images that are switched by operating the telescope/wide witching button and adjusting the zooming ratio in either the wide angle and telescope simultaneous pickup mode or the wide monitoring and telescope pickup mode in the camera with the operating unit shown in FIG. 22C.

FIG. 23 shows first to sixth images 41000, 42000, 43000, 44000, 45000, and 46000, each of which includes a center portion and a peripheral portion. The center portion of the image is a telescope image portion that is captured in the telescope pickup mode. The peripheral portion of the image is a wide angle image portion that is captured in the wide angle pickup mode. For each of the first to third images 41000, 42000, and 43000, the peripheral image portion is encompassed by a broad real line, while the center image portion is encompassed by a narrow real line. This means that the peripheral image portion as the wide angle image portion is placed in condition for a zooming adjustment. For each of the fourth to sixth images 44000, 45000, and 46000, the peripheral image portion is encompassed by the narrow real line, while the center image portion is encompassed by the broad real line. This means that the center image portion as the telescope image portion is placed in condition for a zooming adjustment.

In FIG. 23, the second image 42000 is captured in the wide angle and telescope simultaneous pickup mode. The wide angle image portion as the peripheral image portion of the second image 42000 is activated for the zooming adjustment. The second image 42000 includes the zoom-adjustment effective portion as the wide angle image portion that is encompassed by the broad real line as a frame. Changing the width of the frame line, the color thereof, or the luminance thereof can notify a user that which portion of the image is currently activated for zooming adjustment.

The switch lever 2204 turns right to zoom up and magnify the entirety of the second image 42000 including the frame so that the second image 42000 is switched into the first image 41000. In contrast, the switch lever 2204 turns left to zoom down and reduce the entirety of the second image 42000 including the frame so that the second image 42000 is switched into the third image 43000. The switch lever 2204 is operated to change or switch between the first and second images 41000 and 42000 or between the second and third images 42000, and 43000, thereby notifying the user of the image pickup region.

While displaying the second image 42000, the switch lever 2204 is pushed to switch the zoom-adjustment effective region from the wide angle image portion as the peripheral image portion into the telescope image portion as the center image portion, so that the second image 42000 is switched into the fifth image 45000. The fifth image 45000 includes the telescope image portion as the center image portion and the wide angle image portion as the peripheral image portion. The telescope image portion as the center image portion is encompassed by the broad frame line, while the wide angle image portion as the peripheral image portion is encompassed by the narrow frame line. The zooming adjustment is effective to the center image portion as the telescope image portion. While displaying the fifth image 45000, the switch lever 2204 turns right to shrink or reduce the frame encompassing the center image portion as the telescope image portion, while the entirety of the image remains unchanged. The fifth image 45000 is switched into the fourth image 44000. Shrinkage or reduction of the frame makes narrow the image pickup portion that is subjected to the image pickup with magnification to obtain a more telescopic image.

In contrast, the switch lever 2204 turns left to enlarge or magnify the frame encompassing the center image portion as the telescope image portion, while the entirety of the image remains unchanged. The fifth image 45000 is switched into the sixth image 46000. The enlarged or magnified broad frame encompasses the image portion that is subjected to the image pickup with magnification. Enlargement or magnification of the frame makes wide the image pickup portion that is subjected to the image pickup with magnification. The switch lever 2204 is operated to change or switch between the fourth and fifth images 44000 and 45000 or between the fifth and sixth images 45000, and 46000, thereby notifying the user of the image pickup region.

While displaying the fifth image 45000, the switch lever 2204 is pushed again to switch the zoom-adjustment effective region from the telescope image portion as the center image portion into the wide angle image portion as the peripheral image portion, so that the fifth image 45000 is switched into the second image 42000. The second image 42000 includes the telescope image portion as the center image portion and the wide angle image portion as the peripheral image portion. The telescope image portion as the center image portion is encompassed by the narrow frame line, while the wide angle image portion as the peripheral image portion is encompassed by the broad frame line. The zooming adjustment effective region is switched from the center image portion as the telescope image portion into the peripheral image portion as the wide angle image portion.

While displaying either one of the first to sixth images 41000, 42000, 43000, 44000, 45000, and 46000, the switch lever 2204 can be operated or pushed to switch the zoom-adjustment effective region between the peripheral image portion as the wide angle image portion and the center image portion as the telescope image portion.

As described above, the broad frame that represents the zoom-adjustment effective region is superimposed over the captured image that is displayed by the image display unit 104 shown in FIG. 1. Instead of broadening the frame, as shown in FIG. 22D, the operating unit 107 shown in FIG. 1 can have a pair of light emitting diodes 2211 which represents either the wide angle image portion as the peripheral image portion or the telescope image portion as the center image portion is subjected to the zoom adjustment. A liquid crystal display panel may also be provided for representing either the wide angle image portion as the peripheral image portion or the telescope image portion as the center image portion is subjected to the zoom adjustment. A toggle switch may be used. Any combination of the above-described elements or configurations can be used to represent either the wide angle image portion as the peripheral image portion or the telescope image portion as the center image portion is subjected to the zoom adjustment.

When the wide angle and telescope simultaneous pickup mode is activated, an output signal from the image sensor 102 is once stored in a temporary storage medium such as a DRAM that is provided in the distortion correction image processing unit 103. The temporary storage medium is not illustrated. For the distortion correction image processing unit 103, a variety of parameters such as a coefficient of luminance correction, a coefficient of filtering, and magnification and reduction ratios are set in accordance with a wide angle setting value or values that have been set by a user. The above described image processing is performed to obtain the distortion-corrected wide angle image. The distortion-corrected wide angle image is then compressed. The compressed image is then stored in the image storage 105.

A set of image data is read out of the temporary storage medium such as the DRAM provided in the distortion correction image processing unit 103. For the distortion correction image processing unit 103, a variety of parameters such as a coefficient of luminance correction, a coefficient of filtering, and magnification and reduction ratios are set in accordance with a telescope setting value or values that have been set by the user. The above described image processing is performed to obtain the distortion-corrected telescope image.

The distortion-corrected telescope image is then compressed. The compressed image is then stored in the image storage 105.

Activating the wide angle and telescope simultaneous pickup mode permits capturing both the wide angle image and the telescope image simultaneously. A prefix may be used for a file name of the image that is stored. The prefix permits determining that the image has been captured in the wide angle and telescope simultaneous pickup mode. The recorded images are preview-displayed. The wide angle image portion and the telescope image portion can be displayed time-sequentially and automatically. Either one of the wide angle image portion and the telescope image portion can also be displayed, while representing that the displayed image has been captured in the wide angle and telescope simultaneous pickup mode. The displayed one can be switched to another one by operating the switching button. The sequence or order of generating the wide angle image and the telescope image from the distortion-containing original image should not be limited. Either one of the wide angle image and the telescope image can be generated prior to generating the remaining one.

In the normal image pickup mode or the wide monitoring and telescope pickup mode, a set of image data is read out of the temporary storage medium such as the DRAM provided in the distortion correction image processing unit 103. For the distortion correction image processing unit 103, a variety of parameters such as a coefficient of luminance correction, a coefficient of filtering, and magnification and reduction ratios are set in accordance with a view angle setting value or values that have been set by the user. The above described image processing is performed to obtain the distortion-corrected image. The distortion-corrected image is then compressed. The compressed image is then stored in the image storage 105. The recorded image is preview-displayed. The image can be displayed for a period of time, without switching the modes or the wide angle and telescope.

The digital camera can be configured to display the image that has been captured. The image captured in the wide angle and telescope simultaneous pickup mode can be displayed so that the wide angle image portion and the telescope image portion are displayed alternately and time-sequentially. Either one of the wide angle image portion and the telescope image portion is displayed with representing that the displayed one has been captured in the wide angle and telescope simultaneous pickup mode. In this case, a wide angle telescope switching button can be operated in addition to a frame-by-frame button so as to switch between the wide angle image portion and the telescope image portion. Operating the frame-by-frame button displays the image in a single angle of view.

Figure 24A:
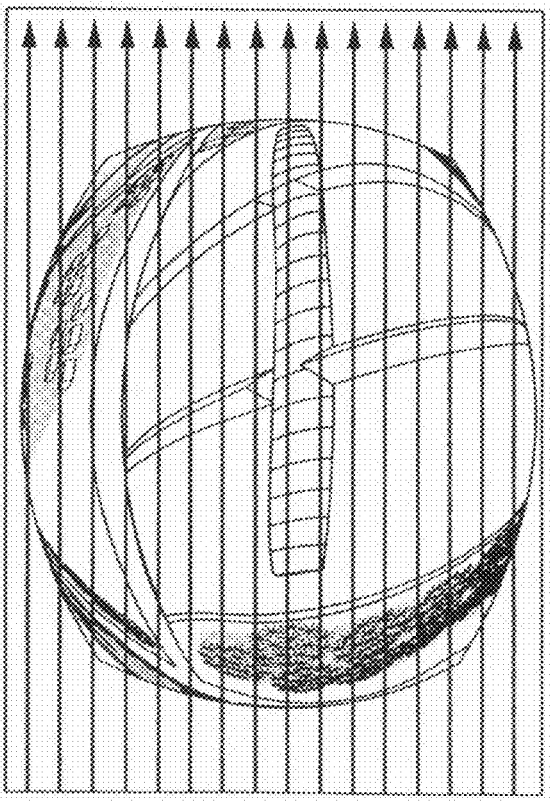
FIG. 24A is a view illustrating an example of an image that has been read out at a high frame rate, the image having been captured by an optical system having a distortion.
Figure 24B:
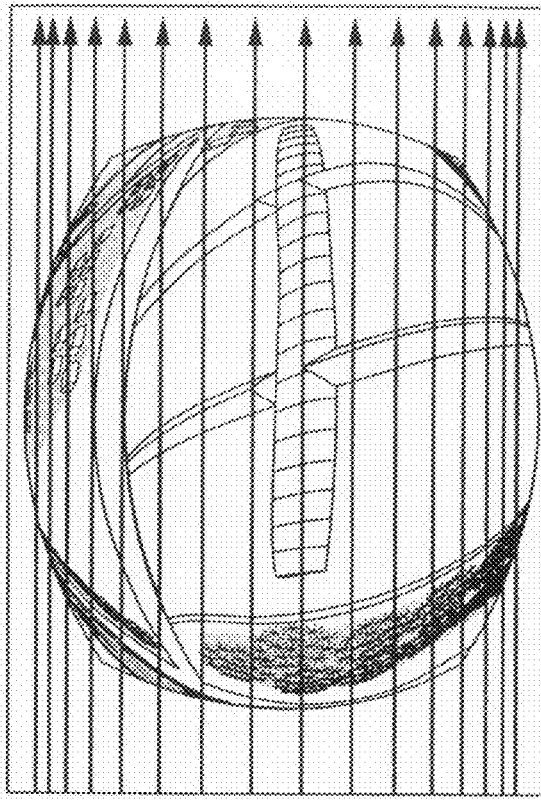
FIG. 24B is a view illustrating another example of an image that has been read out at a high frame rate, the image having been captured by an optical system having a distortion.

The digital camera is configured to correct the distortion of the optical system for displaying a through image as a finder in the image display unit 104. FIG. 24A is a view illustrating an example of an image that has been read out at a high frame rate, the image having been captured by an optical system having a distortion. FIG. 24B is a view illustrating another example of an image that has been read out at a high frame rate, the image having been captured by an optical system having a distortion. As shown in FIG. 24A, the image sensor can often have a finder mode that reads the image at a high frame rate while subsampling vertical lines of the image. The image has the distortion that compresses the peripheral portion thereof. This image is subjected to a uniform subsampling. The uniformly subsampled image is then subjected to the distortion correction. The distortion-corrected image is further subjected to an interpolation to interpolate necessary lines. The interpolated image has a large variation in line density that causes a remarkably deteriorated quality. As shown in FIG. 24B, the image can also be subsampled so that the peripheral portion of the image is subjected to a high density subsampling, while the center portion of the image is subjected to a low density subsampling. The subsampled image is then subjected to the distortion correction. The distortion-corrected image is further subjected to an interpolation to obtain an image that has a uniform density of lines. The above-described modified subsampling process can obtain a high quality through image.

Plural sets of information related to the distortion and lens frame of the lens can be stored together with a focusing distance and an F-value in an information storage unit such as a ROM provided in a lens unit that includes one or more optical lenses. The sets of information are read out of the lens unit so as to convert the coordinates for performing filtering process, shading-correction process, and distortion-correction process. This technique is applicable to the lens-exchangeable camera. Exchanging the lens unit can perform a variety of the distortion correction.

Figure 25:
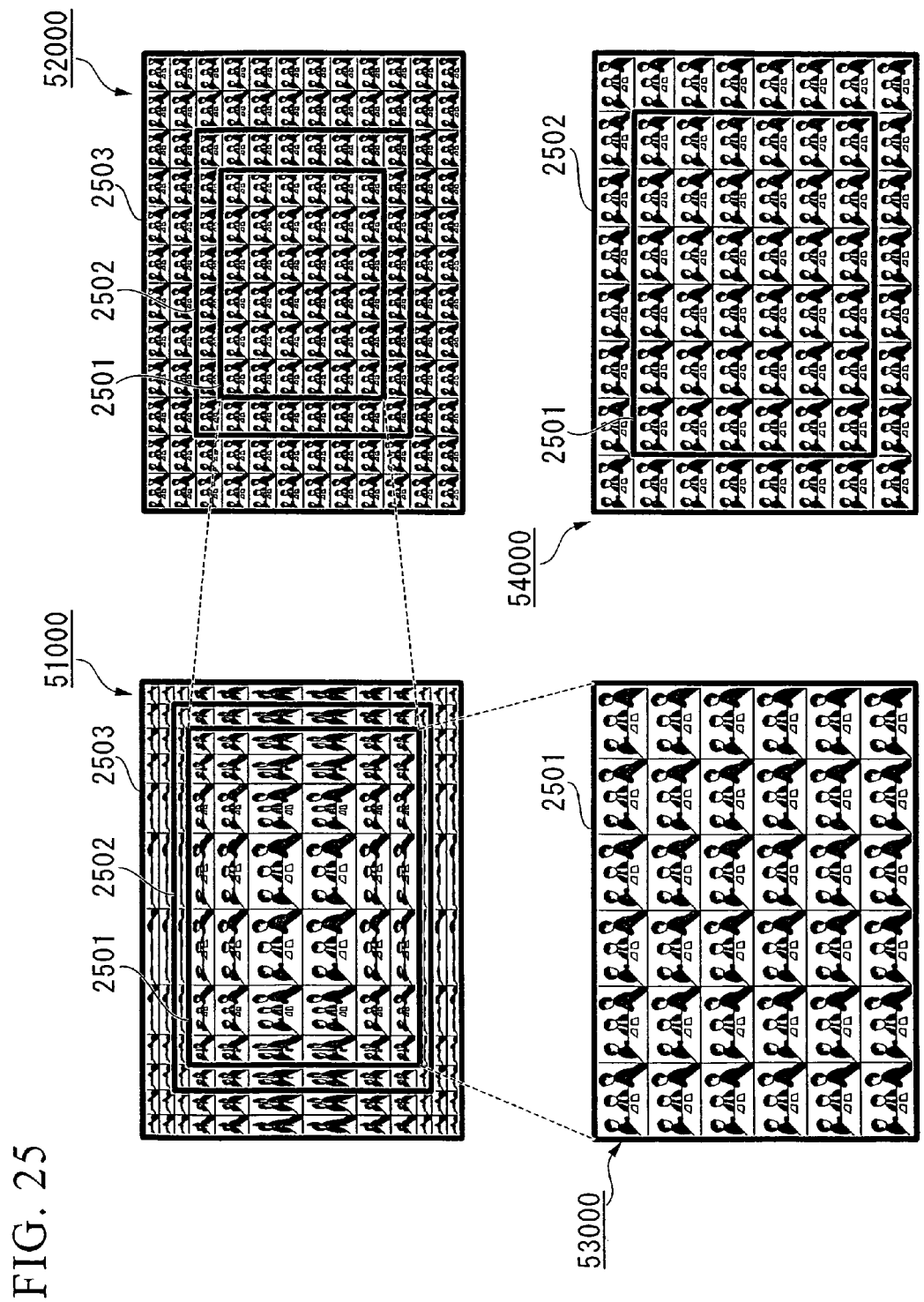
FIG. 25 is a view illustrating different images for showing a zoom function of the digital camera.

The outline of the zoom function of the digital camera will be described. FIG. 25 is a view illustrating different images for showing a zoom function of the digital camera. A first image 51000 is an image that has been picked up by the optical system 101 having the distortion shown in FIG. 1. The first image 51000 has a distortion so that the first image 51000 includes a magnified center portion and a compressed peripheral portion. The first image 51000 has a first closing line 2501, a second closing line 2502 and a third closing line 2503. The first closing line 2501 is the innermost closing line. The third closing line 2503 is an outermost closing line. The second closing line 2502 is an intermediate closing line. When the image pickup device can be used to capture a wide angle image, all of pixels encompassed by the third closing line 2503 are used to perform the distortion correction, while compressing the enter portion of the image and decompressing the peripheral portion of the image, thereby obtaining a distortion-corrected second image 52000 that has the original size.

When the telescope image is obtained, all of pixels encompassed by the first closing line 2501 in the first image 51000 are used to perform the distortion correction, while unchanging the enter portion of the image and decompressing the peripheral portion of the image, thereby obtaining a distortion-corrected third image 53000 that has the original size.

When an intermediate image is obtained at the intermediate angle of view, all of pixels encompassed by the second closing line 2502 in the first image 51000 are used to perform the distortion correction, while compressing the enter portion of the image and decompressing the peripheral portion of the image, thereby obtaining a distortion-corrected fourth image 54000 that has the original size. Each of the first, second and third closing lines 2501, 2502, and 2503 represents the same angle of view among the first to fourth images 51000, 52000, 53000, and 54000. The zooming function can be realized without using any driving mechanism. As compared to an electronically zoomed image that has been captured by a distortion-free optical system, the telescope image obtained in the above manner has a higher quality due to a large cutting extent and also due to no need to magnify the center portion of the image.

The following descriptions will be directed to that the digital camera shown in FIG. 5 captures object in the wide angle and telescope simultaneous pickup mode. A user uses the digital camera in the wide angle and telescope simultaneous pickup mode while viewing or observing an object displayed on a display monitor. At this time, the digital camera drives the image sensor 102 in a finder mode and obtains continuously subsampled images that have a reduced number of lines, for example, 200. The image is inputted into the image correction unit 501, wherein the image is subjected to the pixel defect correction, the white balance correction, the shading correction (the correction of the quality of light). As described above, the correction is made taking into account the effect by the distortion. The corrected image data sets are sequentially stored in the frame memory 511.

When the user is operating to determine the wide angle of view, the image data sets are re-ordered and read out of the frame memory 511. The image data sets are included in the wide angle image portion that is defined by the wide angle of view, the wide angle image portion being displayed on the display monitor and being also observed by the user. The RGB synchronization unit 502 receives the Bayer array of the read image data and applies the RGB synchronization process to the Bayer array of the read image data. As described above, the correction is made taking into account the effect by the distortion.

The RGB synchronized image data is then inputted into the first filter unit 503. The RGB synchronized image data is filtered by the first filter unit 503. The filtering process is performed tanking into account the effect by the distortion. The center portion of the image is subjected to a strong filtering. The filtering coefficient is selected so as to reduce or shrink the image into an appropriate size for displaying the image on the display monitor. The peripheral portion of the image is compressed by the distortion. The peripheral portion of the image can not be reduced, depending on the target image size and the size of the peripheral image portion. Unreduced portion of the image is made free from the low pass filter while the coefficient of the center portion of the matrix filter is made 1 and other coefficients are made 0.

The filtered image data set is inputted into the aberration correction unit 504 so that the filtered image data is subjected to the coordinate conversion process for correcting the distortion. The image data is then inputted into the magnification reduction unit 505 to reduce the image size into an appropriate size to be displayed on the display monitor. If the image includes a magnified portion, the magnified portion is subjected to the edge-enhancement process and the noise reduction process, both of which are performed by the second filter unit 507.

The image data is outputted from the second filter unit 507. The image data is then inputted into the display conversion unit 510. The image data is converted into a format, for example, data formats, size or scanning formats that needs displaying the image on the display monitor. The converted image data is then stored in a frame memory for display that is provided in the display conversion unit 510. The display conversion unit 510 reads out the image data from the frame memory for display that is provided therein. The display conversion unit 510 supplies the display monitor with the converted image data.

While the wide angle image portion is activated for zooming adjustment, a user can operate the telescope button 2209 or the wide angle button 2210 shown in FIG. 22 so as to switch or change the angle of view. The angle of view of the image data to be read out of the frame memory 511 is changed in accordance with the angle of view of the image that is displayed on the display monitor and observed by the user. This operation changes the degree of distortion and the angle of view or the number of image data sets that are outputted from the frame memory 511. In response thereto, the process by the RGB synchronization unit 502, and parameters of the first filter unit 503, the aberration correction unit 504, the magnification reduction unit 505, and the second filter unit 507 are also changed.

A user can operate the telescope wide switching button 2203 shown in FIG. 22B to fix an angle of view of zoom-adjusted one of the wide angle image portion and the telescope image portion, while another one being activated for a new zoom-adjustment. If the user operates the telescope button 2209 or the wide angle button 2210 to switch the angle of view, the angle of view remains unchanged, which is displayed on the display monitor and observed by the user. The display monitor continues to display the image at the unchanged angle of view. The angle of view of the image data to be read out of the frame memory 511 is the fixed angle of view. The process by the RGB synchronization unit 502, and parameters of the first filter unit 503, the aberration correction unit 504, the magnification reduction unit 505, and the second filter unit 507 are selected for the fixed angle of view.

Operating the telescope button 2209 and the wide angle button 2210 shown in FIG. 22B changes the frame that represents the telescope image portion displayed on the display monitor. The frame is reduced by pushing the telescope button 2209. The frame is enlarged by pushing the wide angle button 2210.

When the user determines the angle of view of the telescope image portion and operates the shutter button 2201 shown in FIG. 22B, the processes such as AE/AF are performed before the image sensor 102 is driven in the normal image pickup mode, wherein all pixel data are output in a progressive or interlace format. The image is inputted into the image correction unit 501. The image is thus subjected to the pixel defect correction, the white balance correction, and the shading correction or correction of the quantity of light. The corrections are made taking into account the effect by the distortion.

The corrected image data is then stored by one frame in the frame memory 511. In order to generate the wide angle image portion firstly, the image data sets are re-ordered and read out of the frame memory 511. The image data sets are included in the wide angle image portion that is defined by the wide angle of view, the wide angle image portion being set by the user.

The RGB synchronization unit 502 receives the Bayer array of the read image data and applies the RGB synchronization process to the Bayer array of the read image data. As described above, the correction is made taking into account the effect by the distortion. The RGB synchronized image data is then inputted into the first filter unit 503. The RGB synchronized image data is subjected to the low pass filter process that is performed by the first filter unit 503. The filtering process is performed tanking into account the effect by the distortion. The center portion of the image is subjected to a strong filtering. The filtering coefficient is selected depending on the degree of reduction of the reduced portion, the reduction being made to reduce or shrink the image into an appropriate size that is set by the user. The peripheral portion of the image is compressed by the distortion. The peripheral portion of the image can not be reduced, depending on the recording image size and the size of the peripheral image portion. In this case, a coefficient C22 positioned at the center of the space filter shown in FIG. 11 is set 1, while the other coefficients C11, C12, C13, C21, C23, C31, C32, and C33 are set 0. Unreduced portion of the image is made free from the low pass filter while the all coefficients of the matrix filter are set 0.

The filtered image data set is inputted into the aberration correction unit 504 so that the filtered image data is subjected to the coordinate conversion process for correcting the distortion. The image data is then inputted into the magnification reduction unit 505 to reduce or magnify the image size into an appropriate size to be stored. If the image includes a magnified portion, the magnified portion is subjected to the edge-enhancement process and the noise reduction process, both of which are performed by the second filter unit 507.

The image data is outputted from the second filter unit 507. The image data is then inputted into the display conversion unit 510. The image data is converted into a format, for example, data formats, size or scanning formats that needs displaying the image on the display monitor. The converted image data is then stored in a frame memory for display that is provided in the display conversion unit 510. The display conversion unit 510 reads out the image data from the frame memory for display that is provided therein. The display conversion unit 510 supplies the display monitor with the converted image data.

The image data that is outputted from the second filter unit 507 is also supplied to the YC conversion unit 508. The YC conversion unit 508 converts the RGB signal to a color space to obtain luminance and chrominance signals (YCbCr signals). In accordance with the JPEG compression mode, the luminance and chrominance signals are subsampled to match it to the JPEG 422. The luminance and chrominance signals in the color space are then supplied from the YC conversion unit 508 to the image compression unit 509. The image compression unit 509 performs the JPEG compression of the signals. The JPEG-compressed signals are stored as a wide angle image in an image storage unit such as a memory card.

In order to generate the telescope image portion after the generation of the wide angle image portion, the image data sets are re-ordered and read out of the frame memory 511. The image data sets are included in the telescope image portion that is defined by the narrow angle of view, the narrow angle image portion being set by the user. The RGB synchronization unit 502 receives the Bayer array of the read image data and applies the RGB synchronization process to the Bayer array of the read image data. As described above, the correction is made taking into account the effect by the distortion.

The RGB synchronized image data is then inputted into the first filter unit 503. The RGB synchronized image data is subjected to the low pass filter process that is performed by the first filter unit 503. The filtering process is performed tanking into account the effect by the distortion. The center portion of the image is subjected to a strong filtering. The filtering coefficient is selected depending on the degree of reduction of the reduced portion, the reduction being made to reduce or shrink the image into an appropriate size that is set by the user. The peripheral portion of the image is compressed by the distortion. The peripheral portion of the image can not be reduced, depending on the recording image size and the size of the peripheral image portion. In this case, a coefficient C22 positioned at the center of the space filter shown in FIG. 11 is set 1, while the other coefficients C11, C12, C13, C21, C23, C31, C32, and C33 are set 0. Unreduced portion of the image is made free from the low pass filter by activating the center portion of coefficients of the matrix filter. If no portion of the image is compressed, all the coefficients of the space filter are set 0 to prevent the image from being subjected to the low pass filter.

The filtered image data set is inputted into the aberration correction unit 504 so that the filtered image data is subjected to the coordinate conversion process for correcting the distortion. The image data is then inputted into the magnification reduction unit 505 to reduce or magnify the image size into an appropriate size to be stored. If the image includes a magnified portion, the magnified portion is subjected to the edge-enhancement process and the noise reduction process, both of which are performed by the second filter unit 507.

The image data is outputted from the second filter unit 507. The image data is then inputted into the display conversion unit 510. The image data is converted into a format, for example, data formats, size or scanning formats that needs displaying the image on the display monitor. The converted image data is then stored in a frame memory for display that is provided in the display conversion unit 510. The display conversion unit 510 reads out the image data from the frame memory for display that is provided therein. The display conversion unit 510 supplies the display monitor with the converted image data. Upon receipt of the converted image data, the display conversion unit 510 switches the current wide angle image display into a telescope image display.

The image data that is outputted from the second filter unit 507 is also supplied to the YC conversion unit 508. The YC conversion unit 508 converts the RGB signal to a color space to obtain luminance and chrominance signals (YCbCr signals). In accordance with the JPEG compression mode, the luminance and chrominance signals are subsampled to match it to the JPEG 422. The luminance and chrominance signals in the color space are then supplied from the YC conversion unit 508 to the image compression unit 509. The image compression unit 509 performs the JPEG compression of the signals. The JPEG-compressed signals are stored as a wide angle image in an image storage unit such as a memory card.

The following descriptions will be directed to that the digital camera shown in FIG. 16 captures object in the wide angle and telescope simultaneous pickup mode. The processes by the digital camera shown in FIG. 16 are almost the same as the above described processes of the digital camera shown in FIG. 5. The digital camera shown in FIG. 16 has the following differences in processes from the digital camera shown in FIG. 5. The coordinate conversion process for correcting the distortion is performed by interpolating a target pixel data set from the adjacent pixel data set or sets. The magnification and reduction processes for magnifying and reducing the image into an appropriate size to be displayed or stored are also performed by the interpolation. Namely, both processes need the interpolation. Thus, a calculation is made to find a coordinate position on the original image, the coordinate position corresponding to a target coordinate position on the corrected image. The aberration correction and the magnification reduction process are performed together.

The following descriptions will be directed to that the digital camera shown in FIG. 17 captures object in the wide angle and telescope simultaneous pickup mode. A user uses the digital camera in the wide angle and telescope simultaneous pickup mode while viewing or observing an object displayed on a display monitor. At this time, the digital camera drives the image sensor 102 in a finder mode and obtains continuously subsampled images that have a reduced number of lines, for example, 200. The image is inputted into the image correction unit 501, wherein the image is subjected to the pixel defect correction, the white balance correction, the shading correction (the correction of the quality of light). As described above, the correction is made taking into account the effect by the distortion. The corrected image data sets are sequentially stored in the frame memory 511.

When the user is operating to determine the wide angle of view, the image data sets are re-ordered and read out of the frame memory 511. The image data sets are included in the wide angle image portion that is defined by the wide angle of view, the wide angle image portion being displayed on the display monitor and being also observed by the user.

The Bayer array of image data is then inputted into the first filter unit 1703. The Bayer array of image data is filtered by the first filter unit 1703. The filtering process is performed tanking into account the effect by the distortion. The center portion of the image is subjected to a strong filtering. The filtering coefficient is selected so as to reduce or shrink the image into an appropriate size for displaying the image on the display monitor. The peripheral portion of the image is compressed by the distortion. The peripheral portion of the image can not be reduced, depending on the target image size and the size of the peripheral image portion. In this case, a coefficient C22 positioned at the center of the space filter shown in FIG. 1 is set 1, while the other coefficients C11, C12, C13, C21, C23, C31, C32, and C33 are set 0. Since the Bayer array of image data is filtered, a single system circuit can be used. Notwithstanding, the adjacent same color pixels are used and the coefficients are set for each color independently.

The Bayer array of the filtered image data is inputted into the aberration correction magnification reduction unit 1706. The aberration correction magnification reduction unit 1706 performs both the aberration correction process and the magnification and reduction process. The coordinate conversion process for correcting the distortion uses interpolating the target pixel data from the adjacent pixel data. The reduction process for reducing the image to be displayed on the display monitor also uses interpolating the target pixel data from the adjacent pixel data. Thus, a calculation is made to find a coordinate position on the original image, the coordinate position corresponding to a target coordinate position on the corrected image. The aberration correction and the magnification reduction process are performed together by the aberration correction magnification reduction unit 1706 for each color using the same color pixels.

The Bayer array of the image data that has been subjected to the aberration correction process and the magnification and reduction process is supplied from the aberration correction magnification reduction unit 1706 into the RGB synchronization unit 1702. The Bayer array of the image data is thus RGB-synchronized by the RGB synchronization unit 1702. If the RGB-synchronized image data includes a magnified portion, the magnified portion is subjected to the edge-enhancement process and the noise reduction process, both of which are performed by the second filter unit 507.

The image data is outputted from the second filter unit 507. The image data is then inputted into the display conversion unit 510. The image data is converted into a format, for example, data formats, size or scanning formats that needs displaying the image on the display monitor. The converted image data is then stored in a frame memory for display that is provided in the display conversion unit 510. The display conversion unit 510 reads out the image data from the frame memory for display that is provided therein. The display conversion unit 510 supplies the display monitor with the converted image data.

While the wide angle image portion is activated for zooming adjustment, a user can operate the switch lever 2204 shown in FIG. 22C so as to switch or change the angle of view. The angle of view of the image data to be read out of the frame memory 511 is changed in accordance with the angle of view of the image that is displayed on the display monitor and observed by the user. This operation changes the degree of distortion and the angle of view or the number of image data sets that are outputted from the frame memory 511. In response thereto, the process by the RGB synchronization unit 502, and parameters of the first filter unit 1703, the aberration correction magnification reduction unit 1706, and the second filter unit 507 are also changed.

A user can operate or push the switching lever 2204 shown in FIG. 22C to fix an angle of view of an adjusted one of the wide angle image portion and the telescope image portion, while another one being activated for a view angle adjustment. If the user operates the switching lever 2204 shown in FIG. 22C for zoom adjustment, the angle of view remains unchanged, which is displayed on the display monitor and observed by the user. The display monitor continues to display the image at the unchanged angle of view. The angle of view of the image data to be read out of the frame memory 511 is the fixed angle of view. The process by the RGB synchronization unit 502, and parameters of the first filter unit 1703, the aberration correction magnification reduction unit 1706, and the second filter unit 507 are selected for the fixed angle of view.

Operating the switching lever 2204 shown in FIG. 22C changes the frame that represents the telescope image portion displayed on the display monitor. The frame is reduced by having the switching lever 2204 turn right to telescope. The frame is enlarged by having the switching lever 2204 turn left to wide.

When the user determines the angle of view of the telescope image portion and operates the shutter button 2201 shown in FIG. 22C, the processes such as AE/AF are performed before the image sensor 102 is driven in the normal image pickup mode, wherein all pixel data are output in a progressive or interlace format. The image is inputted into the image correction unit 501. The image is thus subjected to the pixel defect correction, the white balance correction, and the shading correction or correction of the quantity of light. The corrections are made taking into account the effect by the distortion.

The corrected image data is then stored by one frame in the frame memory 511. In order to generate the wide angle image portion firstly, the image data sets are re-ordered and read out of the frame memory 511. The image data sets are included in the wide angle image portion that is defined by the wide angle of view, the wide angle image portion being set by the user.

The read image data is then inputted into the first filter unit 1703. The image data is subjected to the low pass filter process that is performed by the first filter unit 1703. The filtering process is performed tanking into account the effect by the distortion. The center portion of the image is subjected to a strong filtering. The filtering coefficient is selected depending on the degree of reduction of the reduced portion, the reduction being made to reduce or shrink the image into an appropriate size that is set by the user. The peripheral portion of the image is compressed by the distortion. The peripheral portion of the image can not be reduced, depending on the target image size and the size of the peripheral image portion. In this case, a coefficient C22 positioned at the center of the space filter shown in FIG. 11 is set 1, while the other coefficients C11, C12, C13, C21, C23, C31, C32, and C33 are set 0. Unreduced portion of the image is made free from the low pass filter by activating the center portion of coefficients of the matrix filter. Since the Bayer array of the image data is filtered, the adjacent same color pixels are used and the coefficients are set for each color independently.

The Bayer array of the filtered image data is inputted into the aberration correction magnification reduction unit 1706. The aberration correction magnification reduction unit 1706 performs both the aberration correction process and the magnification and reduction process. The coordinate conversion process for correcting the distortion uses interpolating the target pixel data from the adjacent pixel data. The reduction process for reducing the image to be displayed on the display monitor also uses interpolating the target pixel data from the adjacent pixel data. Thus, a calculation is made to find a coordinate position on the original image, the coordinate position corresponding to a target coordinate position on the corrected image. The aberration correction and the magnification reduction process are performed together by the aberration correction magnification reduction unit 1706 for each color using the same color pixels.

The Bayer array of the image data that has been subjected to the aberration correction process and the magnification and reduction process is supplied from the aberration correction magnification reduction unit 1706 into the RGB synchronization unit 1702. The Bayer array of the image data is thus RGB-synchronized by the RGB synchronization unit 1702. If the RGB-synchronized image data includes a magnified portion, the magnified portion is subjected to the edge-enhancement process and the noise reduction process, both of which are performed by the second filter unit 507.

The image data is outputted from the second filter unit 507. The image data is then inputted into the display conversion unit 510. The image data is converted into a format, for example, data formats, size or scanning formats that needs displaying the image on the display monitor. The converted image data is then stored in a frame memory for display that is provided in the display conversion unit 510. The display conversion unit 510 reads out the image data from the frame memory for display that is provided therein. The display conversion unit 510 supplies the display monitor with the converted image data.

The image data that is outputted from the second filter unit 507 is also supplied to the YC conversion unit 508. The YC conversion unit 508 converts the RGB signal to a color space to obtain luminance and chrominance signals (YCbCr signals). In accordance with the JPEG compression mode, the luminance and chrominance signals are subsampled to match it to the JPEG 422. The luminance and chrominance signals in the color space are then supplied from the YC conversion unit 508 to the image compression unit 509. The image compression unit 509 performs the JPEG compression of the signals. The JPEG-compressed signals are stored as a wide angle image in an image storage unit such as a memory card.

In order to generate the telescope image portion after the generation of the wide angle image portion, the image data sets are re-ordered and read out of the frame memory 511. The image data sets are included in the telescope image portion that is defined by the narrow angle of view, the narrow angle image portion being set by the user. The read image data is then inputted into the first filter unit 1703. The image data is subjected to the low pass filter process that is performed by the first filter unit 1703. The filtering process is performed tanking into account the effect by the distortion. The center portion of the image is subjected to a strong filtering. The filtering coefficient is selected depending on the degree of reduction of the reduced portion, the reduction being made to reduce or shrink the image into an appropriate size that is set by the user. The peripheral portion of the image is compressed by the distortion. The peripheral portion of the image can not be reduced, depending on the recording image size and the size of the peripheral image portion. In this case, a coefficient C22 positioned at the center of the space filter shown in FIG. 11 is set 1, while the other coefficients C11, C12, C13, C21, C23, C31, C32, and C33 are set 0. Unreduced portion of the image is made free from the low pass filter by activating the center portion of coefficients of the matrix filter. Since the Bayer array of the image data is filtered, the adjacent same color pixels are used and the coefficients are set for each color independently.

The Bayer array of the filtered image data is inputted into the aberration correction magnification reduction unit 1706. The aberration correction magnification reduction unit 1706 performs both the aberration correction process and the magnification and reduction process. The coordinate conversion process for correcting the distortion uses interpolating the target pixel data from the adjacent pixel data. The reduction process for reducing the image to be displayed on the display monitor also uses interpolating the target pixel data from the adjacent pixel data. Thus, a calculation is made to find a coordinate position on the original image, the coordinate position corresponding to a target coordinate position on the corrected image. The aberration correction and the magnification reduction process are performed together by the aberration correction magnification reduction unit 1706 for each color using the same color pixels.

The Bayer array of the image data that has been subjected to the aberration correction process and the magnification and reduction process is supplied from the aberration correction magnification reduction unit 1706 into the RGB synchronization unit 1702. The Bayer array of the image data is thus RGB-synchronized by the RGB synchronization unit 1702. If the RGB-synchronized image data includes a magnified portion, the magnified portion is subjected to the edge-enhancement process and the noise reduction process, both of which are performed by the second filter unit 507.

The image data is outputted from the second filter unit 507. The image data is then inputted into the display conversion unit 510. The image data is converted into a format, for example, data formats, size or scanning formats that needs displaying the image on the display monitor. The converted image data is then stored in a frame memory for display that is provided in the display conversion unit 510. The display conversion unit 510 reads out the image data from the frame memory for display that is provided therein. The display conversion unit 510 supplies the display monitor with the converted image data. Upon receipt of the converted image data, the display conversion unit 510 switches the current wide angle image display into a telescope image display.

The image data that is outputted from the second filter unit 507 is also supplied to the YC conversion unit 508. The YC conversion unit 508 converts the RGB signal to a color space to obtain luminance and chrominance signals (YCbCr signals). In accordance with the JPEG compression mode, the luminance and chrominance signals are subsampled to match it to the JPEG 422. The luminance and chrominance signals in the color space are then supplied from the YC conversion unit 508 to the image compression unit 509. The image compression unit 509 performs the JPEG compression of the signals. The JPEG-compressed signals are stored as a wide angle image in an image storage unit such as a memory card.

The following descriptions will be directed to that the digital camera shown in FIG. 18 captures object in the wide angle and telescope simultaneous pickup mode. A user uses the digital camera in the wide angle and telescope simultaneous pickup mode while viewing or observing an object displayed on a display monitor. At this time, the digital camera drives the image sensor 102 in a finder mode and obtains continuously subsampled images that have a reduced number of lines, for example, 200. The image is inputted into the image correction unit 501, wherein the image is subjected to the pixel defect correction, the white balance correction, the shading correction (the correction of the quality of light). As described above, the correction is made taking into account the effect by the distortion. The corrected image data sets are sequentially stored in the frame memory 511.

When the user is operating to determine the wide angle of view, the image data sets are re-ordered and read out of the frame memory 511. The image data sets are included in the wide angle image portion that is defined by the wide angle of view, the wide angle image portion being displayed on the display monitor and being also observed by the user. The RGB synchronization unit 502 receives the Bayer array of the read image data and applies the RGB synchronization process to the Bayer array of the read image data. As described above, the correction is made taking into account the effect by the distortion.

The RGB synchronized image data is then inputted into the YC conversion unit 1808. The YC conversion unit 1808 converts the RGB signal to a color space to obtain luminance and chrominance signals (YCbCr signals). The luminance and chrominance signals in the color space are then supplied from the YC conversion unit 1808 to the first filter unit 1803. The luminance and chrominance signals are low-pass filtered by the first filter unit 1803. The filtering process is performed tanking into account the effect by the distortion. The center portion of the image is subjected to a strong filtering. The filtering coefficient is selected so as to reduce or shrink the image into an appropriate size for displaying the image on the display monitor. The peripheral portion of the image is compressed by the distortion. The peripheral portion of the image can not be reduced, depending on the target image size and the size of the peripheral image portion. In this case, a coefficient C22 positioned at the center of the space filter shown in FIG. 11 is set 1, while the other coefficients C11, C12, C13, C21, C23, C31, C32, and C33 are set 0.

The filtered luminance and chrominance signals are inputted into the aberration correction magnification reduction unit 1806. The aberration correction magnification reduction unit 1806 performs both the aberration correction process and the magnification and reduction process. The coordinate conversion process for correcting the distortion uses interpolating the target pixel data from the adjacent pixel data. The reduction process for reducing the image to be displayed on the display monitor also uses interpolating the target pixel data from the adjacent pixel data. Thus, a calculation is made to find a coordinate position on the original image, the coordinate position corresponding to a target coordinate position on the corrected image. The aberration correction and the magnification reduction process are performed together by the aberration correction magnification reduction unit 1806 for each color using the same color pixels. If the luminance and chrominance signals include a magnified portion, the magnified portion is subjected to the edge-enhancement process and the noise reduction process, both of which are performed by the second filter unit 1807.

The luminance and chrominance signals are supplied from the second filter unit 1807 into the display conversion unit 1810. The image data is converted into a format, for example, data formats, size or scanning formats that needs displaying the image on the display monitor. The converted image data is then stored in a frame memory for display that is provided in the display conversion unit 1810. The display conversion unit 1810 reads out the image data from the frame memory for display that is provided therein. The display conversion unit 1810 supplies the display monitor with the converted image data.

While the wide angle image portion is activated for zooming adjustment, a user can operate the telescope button 2205 or the wide button 2206 shown in FIG. 22A so as to switch or change the angle of view. The angle of view of the image data to be read out of the frame memory 511 is changed in accordance with the angle of view of the image that is displayed on the display monitor and observed by the user. This operation changes the degree of distortion and the angle of view or the number of image data sets that are outputted from the frame memory 511. In response thereto, the process by the RGB synchronization unit 502, and parameters of the YC conversion unit 1808, the first filter unit 1803, the aberration correction magnification reduction unit 1806, and the second filter unit 1807 are also changed.

While the telescope image portion is activated for zooming adjustment, a user can operate or push the telescope button 2207 or the wide button 2208 shown in FIG. 22A to fix an angle of view of the image data to be read out of the frame memory 511, while continuing to read out the angle of view of the wide angle image portion. Since the degree of distortion and the angle of view (the number of pixel data sets) to be outputted from the frame memory 511 remain unchanged, the process by the RBG synchronization unit 502 and parameters of the YC conversion unit 1808, the first filter unit 1803, the aberration correction magnification reduction unit 1806 and the second filter unit 1807 are also unchanged.

Operating the telescope button 2207 or the wide button 2208 shown in FIG. 22A changes the frame that represents the telescope image portion displayed on the display monitor. The frame is reduced by pushing the telescope button 2207. The frame is enlarged by pushing the wide button 2208. A user can also operate to change both the telescope angle of view and the wide angle of view simultaneously.

When the user determines the angle of view of the telescope image portion and operates the shutter button 2201 shown in FIG. 22A, the processes such as AE/AF are performed before the image sensor 102 is driven in the normal image pickup mode, wherein all pixel data are output in a progressive or interlace format. The image is inputted into the image correction unit 501. The image is thus subjected to the pixel defect correction, the white balance correction, and the shading correction or correction of the quantity of light. The corrections are made taking into account the effect by the distortion.

The corrected image data is then stored by one frame in the frame memory 511. In order to generate the wide angle image portion firstly, the image data sets are re-ordered and read out of the frame memory 511. The image data sets are included in the wide angle image portion that is defined by the wide angle of view, the wide angle image portion being set by the user.

The read image data is then inputted into the RGB synchronization unit 502. The RGB synchronization unit 502 performs the RGB synchronization of the Bayer array of image data. The RGB-synchronized image data is performed tanking into account the effect by the distortion. The RGB-synchronized image data is also supplied to the YC conversion unit 1808. The YC conversion unit 1808 converts the RGB synchronized image data into luminance and chrominance signals (YCbCr signals).

The first filter unit 1803 receives the luminance and chrominance signals from the YC conversion unit 1808. The first filter unit 1803 applies a low pass filtering process to each of the luminance and chrominance signals for the center portion of the image. The center portion of the image is subjected to a strong filtering. The filtering coefficient is selected depending on the degree of reduction of the reduced portion, the reduction being made to reduce or shrink the image into an appropriate size that is set by the user. The peripheral portion of the image is compressed by the distortion. The peripheral portion of the image can not be reduced, depending on the target image size and the size of the peripheral image portion. In this case, a coefficient C22 positioned at the center of the space filter shown in FIG. 11 is set 1, while inactivating the other coefficients C11, C12, C13, C21, C23, C31, C32, and C33 are set 0. Unreduced portion of the image is made free from the low pass filter by activating the center portion of coefficients of the matrix filter.

The low-pass filtered luminance and chrominance signals are inputted into the aberration correction magnification reduction unit 1806. The aberration correction magnification reduction unit 1806 performs both the aberration correction process and the magnification and reduction process. The coordinate conversion process for correcting the distortion uses interpolating the target pixel data from the adjacent pixel data. The reduction process for reducing the image to be displayed on the display monitor also uses interpolating the target pixel data from the adjacent pixel data. Thus, a calculation is made to find a coordinate position on the original image, the coordinate position corresponding to a target coordinate position on the corrected image. The aberration correction and the magnification reduction process are performed together by the aberration correction magnification reduction unit 1806 for each color using the same color pixels.

The luminance and chrominance signals that have been subjected to the aberration correction process and the magnification and reduction process is supplied from the aberration correction magnification reduction unit 1806 into the second filter unit 1807. If the luminance and chrominance signals include a magnified portion, the magnified portion is subjected to the edge-enhancement process and the noise reduction process, both of which are performed by the second filter unit 1807. The luminance and chrominance signals are outputted from the second filter unit 1807. The luminance and chrominance signals are then inputted into the display conversion unit 1810. The luminance and chrominance signals are converted into a format, for example, data formats, size or scanning formats that needs displaying the image on the display monitor. The converted image data is then stored in a frame memory for display that is provided in the display conversion unit 1810. The display conversion unit 1810 reads out the image data from the frame memory for display that is provided therein. The display conversion unit 1810 supplies the display monitor with the converted image data.

The image data that is outputted from the second filter unit 1807 is also supplied to the image compression unit 509. The image compression unit 509 performs the JPEG compression of the signals. The JPEG compression is made by subsampling CbCr signals so as to match to the JPEG-422 format. The JPEG-compressed signals are stored as a wide angle image in an image storage unit such as a memory card.

In order to generate the telescope image portion after the generation of the wide angle image portion, the image data sets are re-ordered and read out of the frame memory 511. The image data sets are re-ordered and read out of the frame memory 511. The image data sets are included in the wide angle image portion that is defined by the wide angle of view, the wide angle image portion being displayed on the display monitor and being also observed by the user. The RGB synchronization unit 502 receives the Bayer array of the read image data and applies the RGB synchronization process to the Bayer array of the read image data. As described above, the correction is made taking into account the effect by the distortion.

The RGB synchronized image data is then inputted into the YC conversion unit 1808. The YC conversion unit 1808 converts the RGB signal to a color space to obtain luminance and chrominance signals (YCbCr signals). The luminance and chrominance signals in the color space are then supplied from the YC conversion unit 1808 to the first filter unit 1803. The luminance and chrominance signals are low-pass filtered by the first filter unit 1803. The filtering process is performed tanking into account the effect by the distortion. The center portion of the image is subjected to a strong filtering. The filtering coefficient is selected so as to reduce or shrink the image into an appropriate size for displaying the image on the display monitor. The peripheral portion of the image is compressed by the distortion. The peripheral portion of the image can not be reduced, depending on the target image size and the size of the peripheral image portion. In this case, a coefficient C22 positioned at the center of the space filter shown in FIG. 11 is set 1, while the other coefficients C11, C12, C13, C21, C23, C31, C32, and C33 are set 0.

The filtered luminance and chrominance signals are inputted into the aberration correction magnification reduction unit 1806. The aberration correction magnification reduction unit 1806 performs both the aberration correction process and the magnification and reduction process. The coordinate conversion process for correcting the distortion uses interpolating the target pixel data from the adjacent pixel data. The reduction process for reducing the image to be displayed on the display monitor also uses interpolating the target pixel data from the adjacent pixel data. Thus, a calculation is made to find a coordinate position on the original image, the coordinate position corresponding to a target coordinate position on the corrected image. The aberration correction and the magnification reduction process are performed together by the aberration correction magnification reduction unit 1806 for each color using the same color pixels.

If the luminance and chrominance signals include a magnified portion, the magnified portion is subjected to the edge-enhancement process and the noise reduction process, both of which are performed by the second filter unit 1807. The luminance and chrominance signals are supplied from the second filter unit 1807 into the display conversion unit 1810. The image data is converted into a format, for example, data formats, size or scanning formats that needs displaying the image on the display monitor. The converted image data is then stored in a frame memory for display that is provided in the display conversion unit 1810. The display conversion unit 1810 reads out the image data from the frame memory for display that is provided therein. The display conversion unit 1810 supplies the display monitor with the converted image data.

The image data that is outputted from the second filter unit 1807 is also supplied to the image compression unit 509. The image compression unit 509 performs the JPEG compression of the signals. The JPEG compression is made by subsampling CbCr signals so as to match to the JPEG-422 format. The JPEG-compressed signals are stored as a wide angle image in an image storage unit such as a memory card.

The following descriptions will be directed to that the digital camera shown in FIG. 19 captures object in the wide angle and telescope simultaneous pickup mode. A user uses the digital camera in the wide angle and telescope simultaneous pickup mode while viewing or observing an object displayed on a display monitor. At this time, the digital camera drives the image sensor 102 in a finder mode and obtains continuously subsampled images that have a reduced number of lines, for example, 200. The image is inputted into the image correction unit 501, wherein the image is subjected to the pixel defect correction, the white balance correction, the shading correction (the correction of the quality of light). As described above, the correction is made taking into account the effect by the distortion. The corrected image data sets are sequentially stored in the frame memory 511.

When the user is operating to determine the wide angle of view, the image data sets are re-ordered and read out of the frame memory 511. The image data sets are included in the wide angle image portion that is defined by the wide angle of view, the wide angle image portion being displayed on the display monitor and being also observed by the user.

The Bayer array of image data is then inputted into the first filter unit 1703. The Bayer array of image data is filtered by the first filter unit 1703. The filtering process is performed tanking into account the effect by the distortion. The center portion of the image is subjected to a strong filtering. The filtering coefficient is selected so as to reduce or shrink the image into an appropriate size for displaying the image on the display monitor. The peripheral portion of the image is compressed by the distortion. The peripheral portion of the image can not be reduced, depending on the target image size and the size of the peripheral image portion. In this case, a coefficient C22 positioned at the center of the space filter shown in FIG. 11 is set 1, while the other coefficients C11, C12, C13, C21, C23, C31, C32, and C33 are set 0. Since the Bayer array of image data is filtered, a single system circuit can be used. Notwithstanding, the adjacent same color pixels are used and the coefficients are set for each color independently.

The Bayer array of the filtered image data is inputted into the aberration correction magnification reduction unit 1706. The aberration correction magnification reduction unit 1706 performs both the aberration correction process and the magnification and reduction process. The coordinate conversion process for correcting the distortion uses interpolating the target pixel data from the adjacent pixel data. The reduction process for reducing the image to be recorded also uses interpolating the target pixel data from the adjacent pixel data. Thus, a calculation is made to find a coordinate position on the original image, the coordinate position corresponding to a target coordinate position on the corrected image. The aberration correction and the magnification reduction process are performed together by the aberration correction magnification reduction unit 1706 for each color using the same color pixels.

The Bayer array of the image data that has been subjected to the aberration correction process and the magnification and reduction process is supplied from the aberration correction magnification reduction unit 1706 into the RGB synchronization unit 1702. The Bayer array of the image data is thus RGB-synchronized by the RGB synchronization unit 1702. The RGB-synchronized image data is then supplied to the YC conversion unit 1908. The YC conversion unit 1908 converts the RGB signal to a color space to obtain luminance and chrominance signals (YCbCr signals). In accordance with the JPEG compression mode, the luminance and chrominance signals are subsampled to match it to the JPEG 422. The luminance and chrominance signals in the color space are then supplied from the YC conversion unit 1908 to the second filter unit 1907. If the RGB-synchronized image data includes a magnified portion, the magnified portion is subjected to the edge-enhancement process and the noise reduction process, both of which are performed by the second filter unit 1907.

The image data is outputted from the second filter unit 1907. The image data is then inputted into the display conversion unit 1910. The image data is converted into a format, for example, data formats, size or scanning formats that needs displaying the image on the display monitor. The converted image data is then stored in a frame memory for display that is provided in the display conversion unit 1910. The display conversion unit 1910 reads out the image data from the frame memory for display that is provided therein. The display conversion unit 1910 supplies the display monitor with the converted image data.

While the wide angle image portion is activated for zooming adjustment, a user can operate the switch lever 2204 shown in FIG. 22C so as to switch or change the angle of view. The angle of view of the image data to be read out of the frame memory 511 is changed in accordance with the angle of view of the image that is displayed on the display monitor and observed by the user. This operation changes the degree of distortion and the angle of view or the number of image data sets that are outputted from the frame memory 511. In response thereto, the process by the RGB synchronization unit 1702, and parameters of the first filter unit 1703, the aberration correction magnification reduction unit 1706, and the second filter unit 507 are also changed.

Operating the switching lever 2204 shown in FIG. 22C changes the frame that represents the telescope image portion displayed on the display monitor. The frame is reduced by having the switching lever 2204 turn right to telescope. The frame is enlarged by having the switching lever 2204 turn left to wide.

A user can operate or push the switching lever 2204 shown in FIG. 22C to fix an angle of view of an adjusted one of the wide angle image portion and the telescope image portion, while another one being activated for a view angle adjustment. If the user operates the switching lever 2204 shown in FIG. 22C for zoom adjustment, the angle of view remains unchanged, which is displayed on the display monitor and observed by the user. The display monitor continues to display the image at the unchanged angle of view. The angle of view of the image data to be read out of the frame memory 511 is the fixed angle of view. The process by the RGB synchronization unit 1702, and parameters of the first filter unit 1703, the aberration correction magnification reduction unit 1706, and the second filter unit 1907 are selected for the fixed angle of view.

When the user determines the angle of view of the telescope image portion and operates the shutter button 2201 shown in FIG. 22C, the processes such as AE/AF are performed before the image sensor 102 is driven in the normal image pickup mode, wherein all pixel data are output in a progressive or interlace format. The image is inputted into the image correction unit 501. The image is thus subjected to the pixel defect correction, the white balance correction, and the shading correction or correction of the quantity of light. The corrections are made taking into account the effect by the distortion.

The corrected image data is then stored by one frame in the frame memory 511. In order to generate the wide angle image portion firstly, the image data sets are re-ordered and read out of the frame memory 511. The image data sets are included in the wide angle image portion that is defined by the wide angle of view, the wide angle image portion being set by the user.

The Bayer array of the read image data is then inputted into the first filter unit 1703. The image data is subjected to the low pass filter process that is performed by the first filter unit 1703. The filtering process is performed tanking into account the effect by the distortion. The center portion of the image is subjected to a strong filtering. The filtering coefficient is selected depending on the degree of reduction of the reduced portion, the reduction being made to reduce or shrink the image into an appropriate size that is recorded. The peripheral portion of the image is compressed by the distortion. The peripheral portion of the image can not be reduced, depending on the target image size and the size of the peripheral image portion. In this case, a coefficient C22 positioned at the center of the space filter shown in FIG. 11 is set 1, while the other coefficients C11, C12, C13, C21, C23, C31, C32, and C33 are set 0. Unreduced portion of the image is made free from the low pass filter by activating the center portion of coefficients of the matrix filter. Since the Bayer array of the image data is filtered, the adjacent same color pixels are used and the coefficients are set for each color independently. If the center portion and the peripheral portion of the image are not compressed, only the coefficient C22 positioned at the center of the space filter is set 1 to prevent the entirety of the image from being low-pass filtered.

The Bayer array of the low-pass filtered image data is inputted into the aberration correction magnification reduction unit 1706. The aberration correction magnification reduction unit 1706 performs both the aberration correction process and the magnification and reduction process. The coordinate conversion process for correcting the distortion uses interpolating the target pixel data from the adjacent pixel data. The reduction process for reducing the image to be recorded also uses interpolating the target pixel data from the adjacent pixel data. Thus, a calculation is made to find a coordinate position on the original image, the coordinate position corresponding to a target coordinate position on the corrected image. The aberration correction and the magnification reduction process are performed together by the aberration correction magnification reduction unit 1706 for each color using the same color pixels.

The Bayer array of the image data that has been subjected to the aberration correction process and the magnification and reduction process is supplied from the aberration correction magnification reduction unit 1706 into the RGB synchronization unit 1702. The Bayer array of the image data is thus RGB-synchronized by the RGB synchronization unit 1702. The RGB-synchronized image data is supplied to the YC conversion unit 1908. The YC conversion unit 1908 converts the RGB-synchronized image data to a color space to obtain luminance and chrominance signals (YCbCr signals). In accordance with the JPEG compression mode, the luminance and chrominance signals are subsampled to match it to the JPEG 422. If the luminance and chrominance signals include a magnified portion, the magnified portion is subjected to the edge-enhancement process and the noise reduction process, both of which are performed by the second filter unit 1907.

The luminance and chrominance signals are outputted from the second filter unit 1907. The luminance and chrominance signals are then inputted into the display conversion unit 1910. The luminance and chrominance signals are converted into a format, for example, data formats, size or scanning formats that needs displaying the image on the display monitor. The converted image data is then stored in a frame memory for display that is provided in the display conversion unit 1910. The display conversion unit 1910 reads out the image data from the frame memory for display that is provided therein. The display conversion unit 1910 supplies the display monitor with the converted image data.

The image data that is outputted from the second filter unit 1907 is also supplied to the image compression unit 509. The image compression unit 509 performs the JPEG compression of the image data. The JPEG-compressed signals are stored as a wide angle image in an image storage unit such as a memory card.

In order to generate the telescope image portion after the generation of the wide angle image portion, the image data sets are re-ordered and read out of the frame memory 511. The image data sets are included in the wide angle image portion that is defined by the wide angle of view, the wide angle image portion being displayed on the display monitor and being also observed by the user. The Bayer array of image data is then inputted into the first filter unit 1703. The Bayer array of image data is filtered by the first filter unit 1703. The filtering process is performed tanking into account the effect by the distortion. The center portion of the image is subjected to a strong filtering. The filtering coefficient is selected so as to reduce or shrink the image into an appropriate size for displaying the image on the display monitor. The peripheral portion of the image is compressed by the distortion. The peripheral portion of the image can not be reduced, depending on the target image size and the size of the peripheral image portion. In this case, a coefficient C22 positioned at the center of the space filter shown in FIG. 11 is set 1, while the other coefficients C11, C12, C13, C21, C23, C31, C32, and C33 are set 0. Since the Bayer array of image data is filtered, a single system circuit can be used. The adjacent same color pixels are used and the coefficients are set for each color independently.

The Bayer array of the low-pass filtered image data is inputted into the aberration correction magnification reduction unit 1706. The aberration correction magnification reduction unit 1706 performs both the aberration correction process and the magnification and reduction process. The coordinate conversion process for correcting the distortion uses interpolating the target pixel data from the adjacent pixel data. The reduction process for reducing the image to be recorded also uses interpolating the target pixel data from the adjacent pixel data. Thus, a calculation is made to find a coordinate position on the original image, the coordinate position corresponding to a target coordinate position on the corrected image. The aberration correction and the magnification reduction process are performed together by the aberration correction magnification reduction unit 1706 for each color using the same color pixels.

The Bayer array of the image data that has been subjected to the aberration correction process and the magnification and reduction process is supplied from the aberration correction magnification reduction unit 1706 into the RGB synchronization unit 1702. The Bayer array of the image data is thus RGB-synchronized by the RGB synchronization unit 1702. The RGB-synchronized image data is then supplied to the YC conversion unit 1908. The YC conversion unit 1908 converts the RGB signal to a color space to obtain luminance and chrominance signals (YCbCr signals). In accordance with the JPEG compression mode, the luminance and chrominance signals are subsampled to match it to the JPEG 422. The luminance and chrominance signals in the color space are then supplied from the YC conversion unit 1908 to the second filter unit 1907. If the RGB-synchronized image data includes a magnified portion, the magnified portion is subjected to the edge-enhancement process and the noise reduction process, both of which are performed by the second filter unit 1907.

The image data is outputted from the second filter unit 1907. The image data is then inputted into the display conversion unit 1910. The image data is converted into a format, for example, data formats, size or scanning formats that needs displaying the image on the display monitor. The converted image data is then stored in a frame memory for display that is provided in the display conversion unit 1910. The display conversion unit 1910 reads out the image data from the frame memory for display that is provided therein. The display conversion unit 1910 supplies the display monitor with the converted image data.

At this time, the display monitor switches the wide angle image display into the telescope image display. The luminance and chrominance signals outputted from the second filter unit 1907 are also inputted into the image compression unit 509. The image compression unit 509 performs the JPEG compression. The compressed image data is then stored as a telescope image in the image storage 105 such as a memory card. The wide angle image and the telescope image are generated from the single image data. The same prefix can be attached to the file name so as to represent that the wide angle image and the telescope image have been generated from the single image data. A relationship between the images can be confirmed.

Second Embodiment

Figure 26:
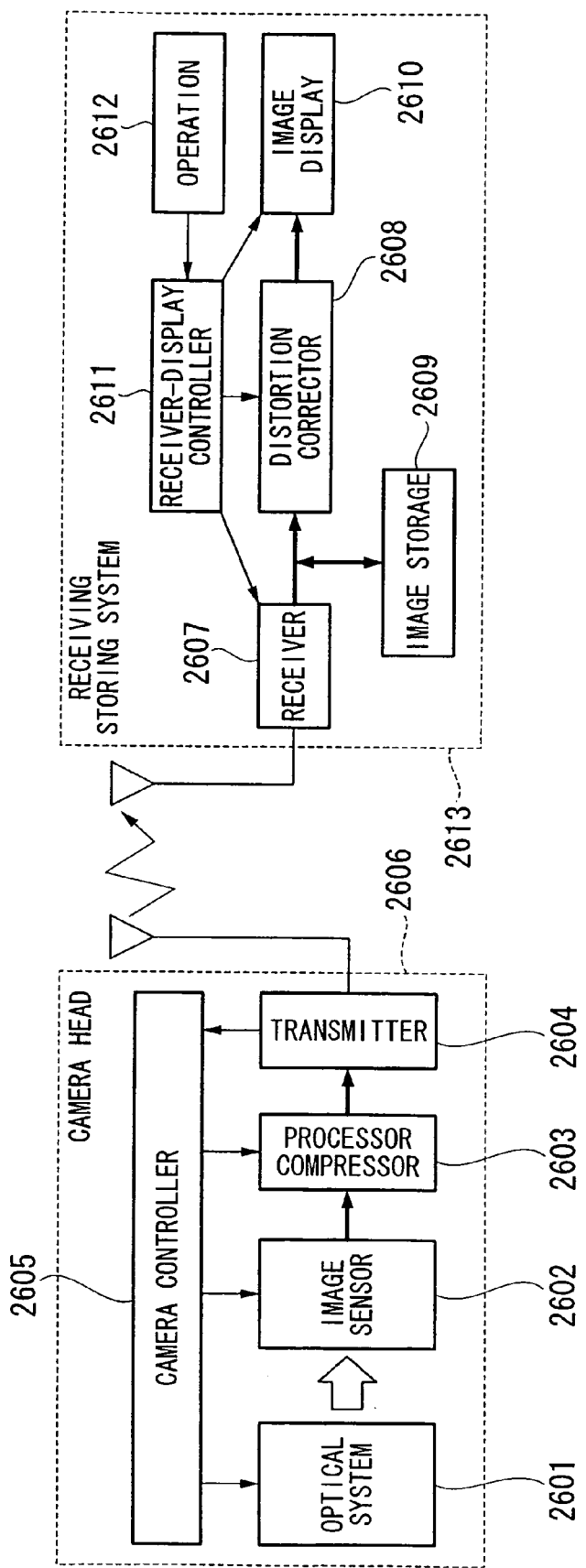
FIG. 26 is a block diagram illustrating a configuration of an image pickup device that serves as a monitoring camera in accordance with a second embodiment of the present invention.

FIG. 26 is a block diagram illustrating a configuration of an image pickup device that serves as a monitoring camera in accordance with a second embodiment of the present invention. As shown in FIG. 26, the monitoring camera may include, but is not limited to, a camera head 2606 and a receiving storing system 2613. The camera head 2606 may include, but is not limited to, an optical system 2601 having a distortion, an image sensor 2602, an image processor-compressor 2603, an image transmitter 2604, and a camera controller 2605. The receiving storing system 2613 may include, but is not limited to, an image receiver 2607, a distortion corrector 2608, an image storage 2609, an image display 2610, a receiver-display controller 2611, and an operation unit 2612.

The optical system 2601 has a distortion characteristic that decompresses a center portion of the image but compress a peripheral portion of the image. The image sensor 2602 may include a photoelectric conversion element that converts an optical image into an electrical image signal, wherein the optical image has been captured by the optical system 2601 with the distortion. Typical examples of the image sensor 102 may include, but are not limited to, a CCD or a CMOS sensor.

The image processor-compressor 2603 is configured to perform a compression process of the image signal which has been subjected to a correction of a pixel defect of the image signal that has been supplied from the image sensor 2602. The image processor-compressor 2603 is also configured to perform a compression process of the image signal which has been subjected to a shading correction of the image signal that has been supplied from the image sensor 2602. The compression process may be reversible or non-reversible. The image transmitter 2604 is configured to perform a communication to the image receiver 2607 of the receiving storing system 2613. The communication may be a wired-communication or a wireless communication. The image transmitter 2604 is configured to convert the image signal in accordance with the communication protocol. The image transmitter 2604 is further configured to add an error correction code to the converted image signal. The camera controller 2605 controls the camera head 2606 in accordance with a predetermined control program.

The image receiver 2607 is configured to receive the image signal from the image transmitter 2607 of the camera head 2606. The image receiver 2607 stores the image signal in the image storage 2609. The distortion corrector 2608 is configured to read the image data out of the image storage 2609. The distortion corrector 2608 is also configured to decompress the read image data and then converts the image data into a format that allows the converted image data to be displayed by the image display 2610. The image storage 2609 stores the compressed original image data that has the distortion that has been supplied from the image receiver 2607. The image display 2610 is configured to receive the image data from the distortion corrector 2608. The image display 2610 is configured to display the received image data. The image display 2610 can be realized by any available display such as a liquid crystal display.

The operation unit 2612 is configured to allow an operator of the monitoring camera system to designate a display state of the image display 2610 and also designate the state of the camera head 2606. The operation unit 2612 sends the receiver-display control unit 2611 operation signals that correspond to the designated states. The receiver-display control unit 2611 is configured to control, based on the operation signals, the image receiver 2607, the distortion corrector 2608, and the image display 2610 of the receiving storing system 2613. The receiver-display control unit 2611 is also configured to send additional control signals to the image receiver 2607 so that the additional control signals are further transmitted to the camera head 2606. As long as the present embodiment is directed to the monitoring camera system, it is possible that the camera head 2606 is configured separately from the receiving storing system 2613. The monitoring camera system may include the single receiving storing system 2613 and a plurality of the camera heads 2606, each communicating with the single receiving storing system 2613 so that the single receiving storing system 2613 stores the image signals from the plurality of the camera heads 2606.

Figure 27:
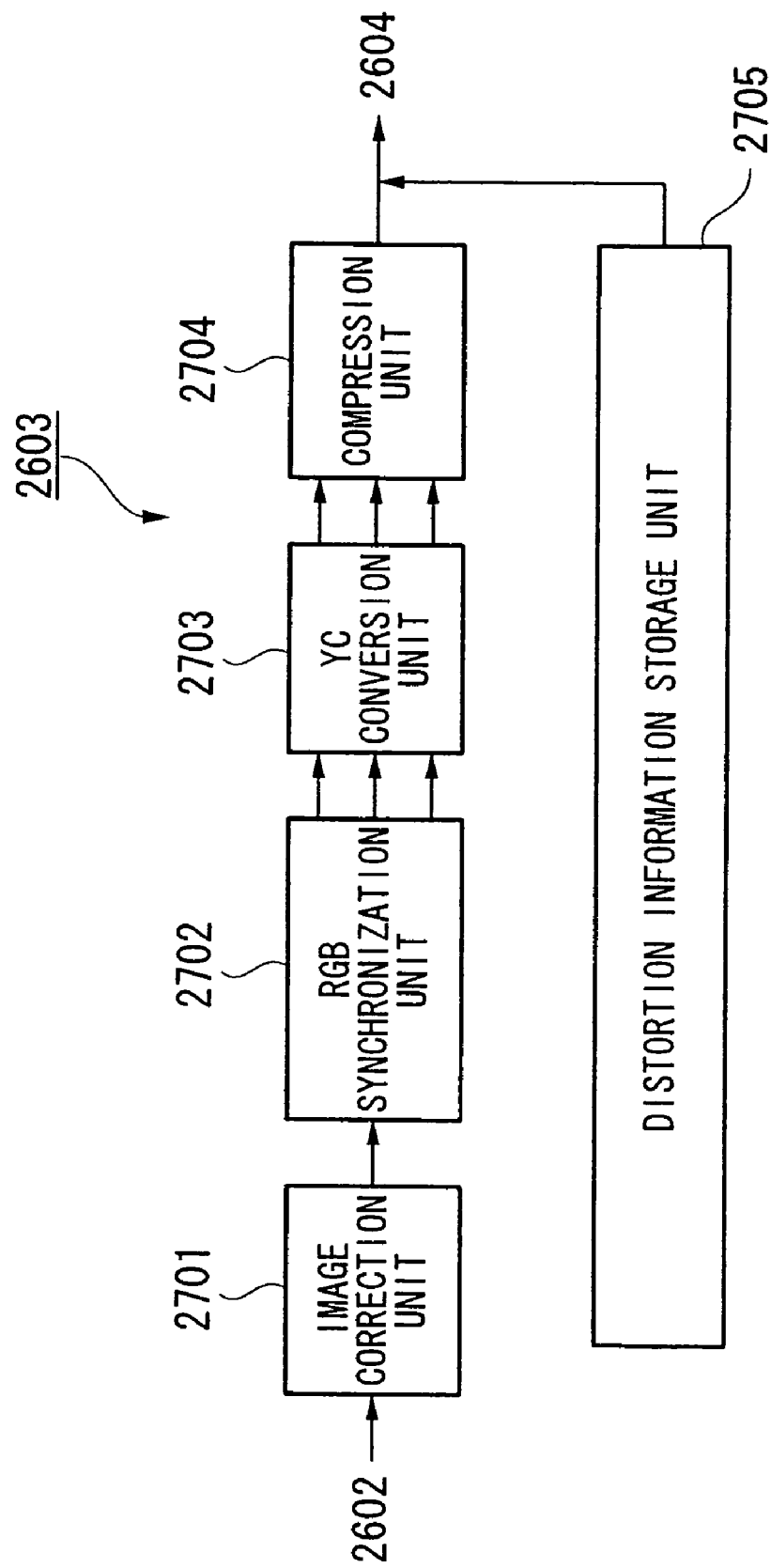
FIG. 27 is a block diagram illustrating an example of a configuration of the image processor-compressor shown in FIG. 26.

FIG. 27 is a block diagram illustrating an example of a configuration of the image processor-compressor 2603 shown in FIG. 26. The image processor-compressor 2603 may include, but is not limited to, an image correction unit 2701, an RGB synchronization unit 2702, a YC conversion unit 2703, an image compression unit 2704, and a distortion information storage unit 2705. The image correction unit 2701 is configured to receive the Bayer array of the image signals from the image sensor 2602. The image correction unit 2701 is also configured to perform a pixel defect correction of the Bayer array of image signals. The image correction unit 2701 is also configured to perform a simple while balance correction of the Bayer array of image signals, wherein the simple while balance correction makes uniform sizes of RGB signals of the Bayer array of image signals.

The RGB synchronization unit 2702 is configured to receive the Bayer array of the corrected image data from the image correction unit 2701. The RGB synchronization unit 2702 is also configured to interpolate RGB signals of each pixel from the Bayer array of the corrected image signals. The YC conversion unit 2703 is configured to receive the RGB signals from the RGB synchronization unit 2702. The YC conversion unit 2703 is also configured to convert the RGB signals into luminance chrominance signals. The image compression unit 2704 is configured to receive the luminance chrominance signals from the YC conversion unit 2703. The image compression unit 2704 is also configured to compress the luminance chrominance signals. The compression may be a JPEG compression.

The distortion information storage unit 2705 is configured to store a first set of information that relates to optical characteristics for correcting a distortion of an optical system. The distortion information storage unit 2705 is also configured to store a second set of information that relates to shading. The shading is caused by brightening and darkening of a peripheral portion of the image. The brightening is caused by the distortion. The darkening is caused by the lens frame. The distortion information storage unit 2705 is also configured to store a third set of information that needs to perform an accurate white balance correction and a simple while balance correction. The first, second and third sets of information may be stored as a table that contains characteristic values and parameters. The first, second and third sets of information may be stored as another table that contains pairs of indexes that represent the characteristics values and the parameters.

Figure 28:
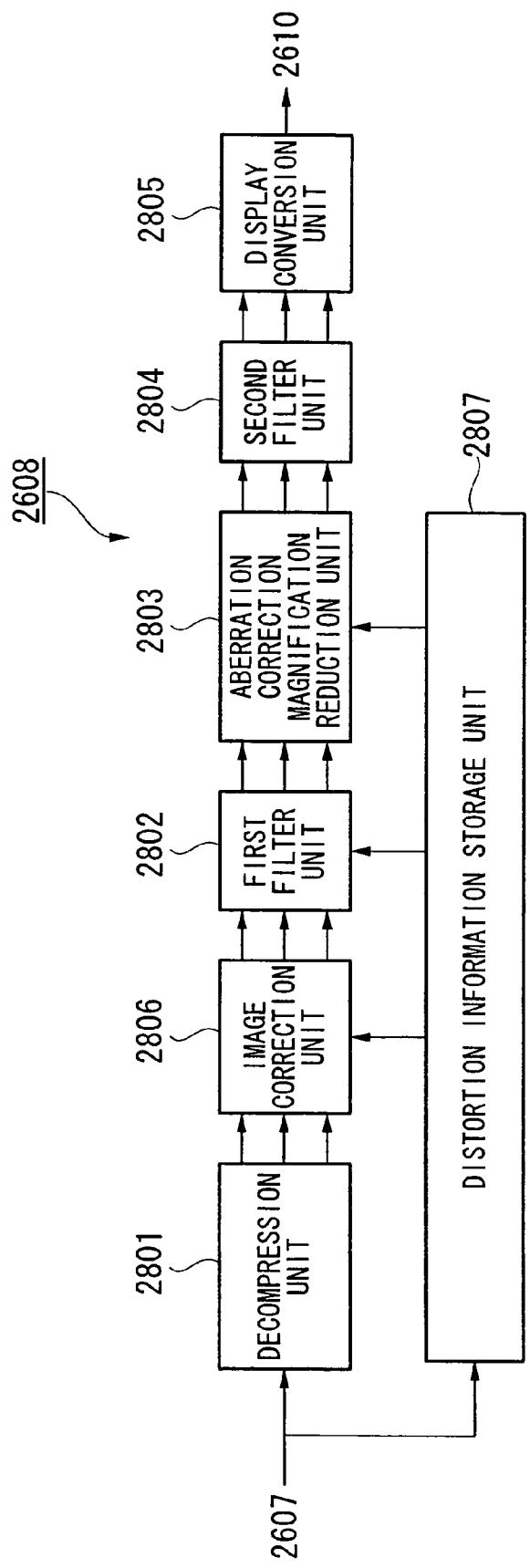
FIG. 28 is a block diagram illustrating an example of a configuration of the distortion corrector shown in FIG. 26.

FIG. 28 is a block diagram illustrating an example of a configuration of the distortion corrector 2608 shown in FIG. 26. The distortion corrector 2608 may include, but is not limited to, a decompression unit 2801, an image correction unit 2806, a first filter unit 2802, an aberration correction magnification reduction unit 2803, a second filter unit 2804, a display conversion unit 2805, and a distortion information storage unit 2807.

The decompression unit 2801 is configured to receive the compressed image signals from the image receiver 2607. The decompression unit 2801 is also configured to decompress the compressed image signals. The image correction unit 2806 is configured to receive the decompressed image signals from the decompression unit 2801. The image correction unit 2806 is also configured to perform an accurate while balance correction of the image signals. The image correction unit 2806 is also configured to perform a shading correction of the image signals. The first filter unit 2802 is configured to receive the corrected image signals from the image correction unit 2806. The first filter unit 2802 is also configured to apply a low pass filtering to a center portion of the image, the center portion of the image being to be reduced.

The aberration correction magnification reduction unit 2803 is configured to receive the low-pass filtered image data from the first filter unit 2802. The aberration correction magnification reduction unit 2803 is also configured to perform a distortion correction of the image data. The aberration correction magnification reduction unit 2803 is further configured to resize the distortion-corrected image data into a proper size. The second filter unit 2804 is configured to receive the resized image data from the aberration correction magnification reduction unit 2803. The second filter unit 2804 is also configured to apply an edge enhancement process to the peripheral portion of the image data. The second filter unit 2804 is further configured to apply a noise reduction process to the peripheral portion of the image data. The display conversion unit 2805 is configured to receive the image data from the second filter unit 2804. The display conversion unit 2805 is also configured to interlace the image data and to encode the image data into NTSC. The display conversion unit 2805 is further configured to supply the image data to the image display 2610.

Operations of the monitoring camera shown in FIG. 26 will be described with reference to FIGS. 27 and 28. With reference to FIG. 27, an optical image is captured by the optical system 2601 with a distortion. The optical image is then supplied to the image sensor 2602. The optical image is converted by the image sensor 2602 into a Bayer array of electrical image signals. The Bayer array of the image signals is supplied from the image sensor 2602 to the image correction unit 2701. The Bayer array of image signals is subjected to the pixel defect correction that is performed by the image correction unit 2701. The Bayer array of image signals is further subjected to the simple while balance correction, wherein the simple while balance correction makes uniform sizes of RGB signals of the Bayer array of image signals.

The Bayer array of the corrected image data is supplied from the image correction unit 2701 to the RGB synchronization unit 2702. RGB signals of each pixel are interpolated from the Bayer array of the corrected image signals by the RGB synchronization unit 2702. The RGB signals are supplied from the RGB synchronization unit 2702 to the YC conversion unit 2703. The RGB signals are converted into luminance chrominance signals by the YC conversion unit 2703. The luminance chrominance signals are supplied from the YC conversion unit 2703 to the image compression unit 2704. The luminance chrominance signals are compressed by the image compression unit 2704. The compression may be a JPEG compression.

The first set of information that relates to optical characteristics for correcting a distortion of an optical system is stored in the distortion information storage unit 2705. The second set of information that relates to shading is also stored in the distortion information storage unit 2705. The shading is caused by brightening and darkening of a peripheral portion of the image. The brightening is caused by the distortion. The darkening is caused by the lens frame. The third set of information that needs to perform an accurate white balance correction and a simple while balance correction is also stored in the distortion information storage unit 2705. The first, second and third sets of information may be stored as a table that contains characteristic values and parameters. The first, second and third sets of information may be stored as another table that contains pairs of indexes that represent the characteristics values and the parameters.

The processor-compressor 2603 stores the characteristic values and the parameters or the indexes in a header of a JPEG file. In case of storing the indexes in the header of the JPEG file, an index table as another file is transmitted to the receiving storing system 2613 or linked indexes are transmitted together with the JPEG file. Transmission of the indexes for the corrections can advantageously prevent any undesirable increase of the JPEG file capacity.

In the present embodiment, the accurate white balance correction and the shading correction can be made in the receiving storing system 2613. In other case, the image correction unit 2701 of the processor-compressor 2603 in the camera head can be modified to perform the accurate white balance correction and the shading correction. In addition, it is also possible as a modification for the camera head 2606 to perform an encryption process before or after the compression is made by the processor-compressor 2603.

The compressed image signals that have been generated by the processor-compressor 2603 are then supplied to the image transmitter 2604. The image signals are converted by the image transmitter 2604 in accordance with the communication protocol. The image signals are also added with the error correction codes by the image transmitter 2604. The image transmitter 2604 performs a wireless or wired communication with the receiving storing system 2613 to transmit the image data to the receiving storing system 2613.

The image transmitter 2604 is further configured to receive the camera control signals that have been transmitted from the receiving storing system 2613. The image transmitter 2604 is further more configured to transmit the camera control signals to the camera controller 2605. The camera controller 2605 is configured to receive the camera control signals from the image transmitter 2604. The camera controller 2605 is also configured to control shutter or aperture of the optical system 2601. The camera controller 2605 is also configured to control driving modes of the image sensor 2602. The camera controller 2605 is further configured to set parameters for the processor-compressor 2603. The image signals having the distortion are compressed. The compressed image signals with the distortion are thus generated by the camera head 2606.

The distortion-containing image signal is transmitted from the camera head 2606 to the receiving storing system 2613 so that the image receiver 2607 receives the distortion-containing image signal. The image receiver 2607 is configured to decode the image signals. The image receiver 2607 is also configured to perform the error correction. The image signals are then supplied from the image receiver 2607 to the distortion corrector 2608 and the image storage 2609.

The image storage 2609 can be realized by a storage of large capacity. Typical examples of the large capacity storage may include, but are not limited to, a semiconductor memory, a magnetic disk drive, and a magneto-optical disk drive. The image storage 2609 can be configured to store a dynamic image that has been transmitted from the camera head 2606. The image storage 2609 can also be configured to store a static image periodically. The image storage 2609 can also be configured to store the static image every time when a predetermined condition is satisfied or a predetermined event occurs. A typical example of the predetermined event may include, but is not limited to any change of the displayed image.

The image signals stored in the image storage 2609 are the compressed image signals that have the optical distortion of the optical system 2601. The compressed image signals accompany the characteristic values, the parameters, or the indexes representing the sets of information that need to perform a plurality of corrections. The plurality of correction may include, but are not limited to, the distortion correction of the optical system 2601, the accurate while balance correction, and the shading correction. In case of the indexes, a correspondence table is also stored. The correspondence table gives the indexes correspondences to the characteristic values or parameters.

As shown in FIG. 28, the decompression unit 2801 receives the compressed image signals from the image receiver 2607. The compressed image signals are decompressed by the decompression unit 2801. The decompressed image signals are then subjected to the accurate while balance correction and the shading correction, both of which are performed by the image corrector 2806. The first filter unit 2802 receives the corrected image signals from the image correction unit 2806. The first filter unit 2802 applies a low pass filtering to a center portion of the image, the center portion of the image being to be reduced. The aberration correction magnification reduction unit 2803 receives the low-pass filtered image data from the first filter unit 2802. The aberration correction magnification reduction unit 2803 performs a distortion correction of the image data. The aberration correction magnification reduction unit 2803 further resizes the distortion-corrected image data into a proper size that is suitable to be displayed. The second filter unit 2804 receives the resized image data from the aberration correction magnification reduction unit 2803. The second filter unit 2804 applies an edge enhancement process and a noise reduction process to the peripheral portion of the image data. The display conversion unit 2805 receives the image data from the second filter unit 2804. The display conversion unit 2805 interlaces the image data and encodes the image data into NTSC.

The sets of information that need to perform the accurate white balance correction and the shading correction are stored together with the image data in the image storage 2609. The sets of information are supplied together with the image data to the distortion corrector 2608. The sets of information are then stored or held in the distortion information storage unit 2807. The image corrector 2806 performs, based on the sets of information, the accurate while balance correction and the shading correction. The shading correction process can be performed using one of the reference table 701 and the arithmetic circuit 702 that are shown in FIGS. 7A and 7B, respectively. The corrected image data is then supplied to the first filter unit 2802. Further, a marker representing that the image data has been corrected is stored in the header of the file. The corrected image data is further compressed again. The compressed image data is then stored again in the image storage 2609. The image data is then read out of the image storage 2609. The image data is further supplied to the image decompression unit 2801. The decompressed image data is further supplied from the image decompression unit 2801 to the first filter unit 2802 with by-passing the image correction unit 2806. The reason for by-passing the image correction unit 2806 is that the image signal has already been corrected by the image correction unit 2806. By passing the image correction unit 2806 is decided depending on the marker that is stored in the header.

The first filter unit 2801 can apply the low-pass filter to the center portion 1001 of the image shown in FIG. 10. The configuration of the first filter unit 2801 may be the same as shown in FIG. 11. The configuration of the aberration correction magnification reduction unit 2803 can be a combination of the configuration shown in FIG. 12 and the other configuration shown in FIG. 14. The corresponding coordinate calculation unit 1401 shown in FIG. 14 converts the coordinate positions on the broken line grid 1519 shown in FIG. 15 into the other coordinate positions on the real line grid 1518 shown in FIG. 15. The corresponding coordinate calculation unit 1401 calculates the corresponding coordinate values on the original image that has not yet been subjected to the optical distortion correction and to the magnification chromatic aberration correction. The calculation of the corrected pixel values can be made by the cubit interpolation from adjacent sixteen points or the linear interpolation from the adjacent four points. The second filter unit 2804 applies the edge-enhancement filter and the noise reduction filter to the peripheral portion of the image. The configuration of the second filter unit 2804 can be the same as that shown in FIG. 11.

As shown in FIG. 26, the receiving storing system 2613 includes the operation unit 2612. An operator of the monitoring camera can operate the operation unit 107 so that the operation unit 2612 generates camera control signals. The camera control signals are then transmitted through the receiver-display controller 2611 to the image receiver 2607. The camera control signals are further transmitted from the image receiver 2607 to the camera head 2606. The receiver-display controller 2611 also controls the distortion corrector 2608 and the image display 2610 based on the camera control signals. The angle of view of the image can be changed. The stored image is replayed.

As described above, the image storage 2609 stores the original image that has not yet been distortion-corrected. The image storage 2609 further stores the sets of information of the optical system that need to perform the correction processes. In replaying the image, the angle of view of the image can be changed to magnify the center portion of the image or to display the entirety of the image. The presence of the image storage 2609 permits the replayed image to be free from any substantive deterioration of the image quality even the conventional electronic zooming causes a substantive deterioration of the image quality.

The additional sets of information related to the distortion of the optical system and to the lens frame are stored together with the focusing distance or the F-value in an additional information storage such as a ROM. The additional information storage is provided in the lens frame. These additional sets of information are read out of a camera body. The read additional sets of information are stored in the distortion information storage unit 2705 so as to perform the filtering processes, and the coordinate conversion process for the shading correction and the distortion correction. The above configuration is applicable to a lens-exchangeable camera, wherein the distortion correction can be adjusted for each lens unit.

Moreover, the term "unit" is used to describe a component, section or part of a hardware and/or software that is constructed and/or programmed to carry out the desired function. Typical examples of the hardware may include, but are not limited to, a device and a circuit.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image pickup device comprising:
    an optical system having a distortion characteristic, the optical system capturing an optical image of an object, the distortion characteristic magnifying a center portion of the optical image and reducing a peripheral portion of the optical image;
    an image sensor that converts the optical image into image data;
    a frame memory that stores the image data;
    a frame memory output control unit that reads a first selected portion of the image data out of the frame memory, the first selected portion being defined by an angle of view, the angle of view being externally defined;
    a first filter unit that applies a first filtering process to a second selected portion of the image data to generate first-filtered image data, the second selected portion being included in the first selected portion, the second selected portion having a first range of distortion that is smaller than a first threshold value; and
    a distortion correction unit that performs a distortion correction of the first-filtered image data to generate distortion-corrected image data;
    wherein the image sensor has a color filter array of Red (R) color filters, Green (G) color filters, and Blue (B) color filters, and
    wherein the image pickup device further comprises:
        an RGB synchronization unit that calculates an addition of color image data sets of adjacent pixels to a target pixel to generate different color image data of the target pixel, the adjacent pixels having a color different from a target color of the target pixels, the calculation of the addition being made with weighting the adjacent pixels based on distances of the adjacent pixels to target pixels, the distances being defined under a condition that the distortion correction has been made.

2. The image pickup device according to claim 1, further comprising:
    a second filter unit that applies a second filtering process to a third portion of the distortion-corrected image data to generate second-filtered image data, the second filtering process being different from the first filtering process, the third selected portion having a second range of distortion that is greater than a second threshold value.

3. The image pickup device according to claim 2, wherein the second filter unit enhances an edge of the third portion of the distortion-corrected image data.

4. The image pickup device according to claim 2, wherein the second filter unit reduces noise of the third portion of the distortion-corrected image data.

5. The image pickup device according to claim 1, further comprising:
    an image data correction unit that comprises at least one of a pixel defect correction unit that corrects a pixel defect of the image data, a white balance correction unit that corrects a white balance of the image data, and a shading correction unit that corrects a shading of the image data, and
    wherein the frame memory stores the image data that is outputted from the image data correction unit.

6. The image pickup device according to claim 5, wherein the shading correction unit corrects the shading based on the distortion characteristic and a peripheral darkening characteristic that is caused by a lens frame holding the optical system.

7. The image pickup device according to claim 6, wherein the shading correction unit comprises an optical filter that is placed on an optical axis of the optical system.

8. The image pickup device according to claim 6, wherein the shading correction unit comprises an array of micro lenses provided on the image sensor, each of the micro lenses being provided for each pixel.

9. The image pickup device according to claim 1, wherein the optical system is held by a lens frame, the lens frame further holding a storage that stores the distortion characteristic, and
    wherein the distortion correction unit performs the distortion correction based on the distortion characteristic that has been read out of the storage.

10. The image pickup device according to claim 1, wherein the first filter unit performs a low-pass filtering process to the second selected portion of the image data.

11. The image pickup device according to claim 1, wherein the image sensor changes a line-subsampling rate for the image data depending on the distortion characteristic.

12. The image pickup device according to claim 1, wherein the RGB synchronization unit calculates the different color image data "DX" of the target pixel "DX" by using one of the following first to third equations:

$$D_{image} = (\text{image data of } D1 \times (T2/(T1+T2))) + (\text{image data of } D2 \times (T1/(T1+T2)))/2 + (\text{image data of } D3 \times (T4/(T3+T4))) + (\text{image data of } D4 \times (T3/(T3+T4)))/2; \quad \text{Equation 1}$$

$$D_{image} = (\text{image data of } D1 \times (T2/(T1+T2))) + (\text{image data of } D2 \times (T1/(T1+T2))); \text{ and} \quad \text{Equation 2}$$

$$D_{image} = (\text{image data of } D3 \times (T4/(T3+T4))) + (\text{image data of } D4 \times (T3/(T3+T4))), \quad \text{Equation 3}$$

where DX is the target pixel, D1 and D2 are adjacent pixels positioned in first-opposing sides of the target pixel DX, D3 and D4 are other adjacent pixels positioned in second-opposing sides of the target pixel DX, T1 is a first distance between the adjacent pixel D1 and the target pixel DX, T2 is a second distance between the adjacent pixel D2 and the target pixel DX, T3 is a third distance between the adjacent pixel D3 and the target pixel DX, and T4 is a fourth distance between the adjacent pixel D4 and the target pixel DX, the first to fourth distances T1, T2, T3 and T4 are defined under a condition that the distortion correction has been made.

* * * * *